United States Patent
Loveland et al.

(10) Patent No.: US 11,532,116 B2
(45) Date of Patent: Dec. 20, 2022

(54) GRAPHICAL USER INTERFACE FOR CONTROLLING A SOLAR RAY MAPPING

(71) Applicant: Loveland Innovations, Inc., Pleasant Grove, UT (US)

(72) Inventors: Jim Loveland, Alpine, UT (US); Leif Larson, Orem, UT (US); Dan Christiansen, Orem, UT (US); Tad Christiansen, Lehi, UT (US); Daniel Gerszewski, Lehi, UT (US)

(73) Assignee: Loveland Innovations, Inc., Pleasant Grove, UT (US)

( * ) Notice: Subject to any disclaimer, the term of this patent is extended or adjusted under 35 U.S.C. 154(b) by 0 days.

(21) Appl. No.: 17/453,152

(22) Filed: Nov. 1, 2021

(65) Prior Publication Data
US 2022/0139024 A1 May 5, 2022

Related U.S. Application Data

(60) Provisional application No. 63/107,585, filed on Oct. 30, 2020.

(51) Int. Cl.
| | | |
|---|---|---|
| G06T 15/06 | (2011.01) | |
| G06F 3/0482 | (2013.01) | |
| G06F 3/04815 | (2022.01) | |
| G06T 15/50 | (2011.01) | |
| G06T 15/20 | (2011.01) | |
| G06T 19/00 | (2011.01) | |
| G06F 30/13 | (2020.01) | |
| G06T 17/05 | (2011.01) | |

(52) U.S. Cl.
CPC ............ *G06T 15/06* (2013.01); *G06F 3/0482* (2013.01); *G06F 3/04815* (2013.01); *G06F 30/13* (2020.01); *G06T 15/20* (2013.01); *G06T 15/506* (2013.01); *G06T 17/05* (2013.01); *G06T 19/003* (2013.01); *G06T 2200/24* (2013.01)

(58) Field of Classification Search
None
See application file for complete search history.

(56) References Cited

U.S. PATENT DOCUMENTS

| | | |
|---|---|---|
| 5,721,691 A | 2/1998 | Wuller |
| 6,037,945 A | 3/2000 | Loveland |
| (Continued) | | |

FOREIGN PATENT DOCUMENTS

| | | |
|---|---|---|
| WO | 2016/053438 | 4/2016 |
| WO | 2018/089268 | 5/2018 |

OTHER PUBLICATIONS

USPTO Non-final Office Action; U.S. Appl. No. 15/388,754; dated May 26, 2017.

(Continued)

*Primary Examiner* — Nurun Flora
(74) *Attorney, Agent, or Firm* — PCFB, LLC; Justin K. Flanagan

(57) ABSTRACT

Systems, methods, and computer-readable media are described herein to model divergent beam ray paths between locations on a roof (e.g., of a structure) and modeled locations of the sun at different times of the day and different days during a week, month, year, or another time period. A graphical user interface allows for visualization of the modeled ray paths and graphical manipulation of the resolution and parameters of the modeling process.

17 Claims, 30 Drawing Sheets

(56) References Cited

U.S. PATENT DOCUMENTS

| | | | |
|---|---|---|---|
| 6,137,896 | A | 10/2000 | Chang |
| 6,292,575 | B1 | 9/2001 | Bortolussi et al. |
| 6,333,749 | B1 | 12/2001 | Reinhardt et al. |
| 6,563,023 | B2 | 5/2003 | Liu et al. |
| 6,810,383 | B1 | 10/2004 | Loveland |
| 6,816,819 | B1 | 11/2004 | Loveland |
| 6,826,539 | B2 | 11/2004 | Loveland |
| 6,829,584 | B2 | 12/2004 | Loveland |
| 7,363,157 | B1 | 4/2008 | Hanna |
| 7,447,564 | B2 | 11/2008 | Yasukawa |
| 7,868,812 | B2 | 1/2011 | Huthoefer |
| 7,884,308 | B1* | 2/2011 | Mejia ............... F24S 50/20 136/246 |
| 8,078,436 | B2 | 12/2011 | Pershing |
| 8,159,662 | B2 | 4/2012 | Rezac |
| 8,170,840 | B2 | 5/2012 | Pershing |
| 8,209,152 | B2* | 6/2012 | Pershing ............ G06T 7/593 703/1 |
| 8,229,768 | B1 | 7/2012 | Hopkins, III |
| 8,345,578 | B2 | 1/2013 | Thoumy |
| 8,346,578 | B1 | 1/2013 | Hopkins, III et al. |
| 8,380,349 | B1 | 2/2013 | Hickman |
| 8,473,125 | B2 | 6/2013 | Rischmuller |
| 8,542,880 | B2 | 9/2013 | Thornberry |
| 8,577,616 | B2 | 11/2013 | Dunlap |
| 8,718,838 | B2 | 5/2014 | Kokkeby |
| 8,818,572 | B1 | 8/2014 | Tofte |
| 8,818,770 | B2 | 8/2014 | Pershing |
| 8,823,732 | B2 | 9/2014 | Adams |
| 8,825,454 | B2 | 9/2014 | Pershing |
| 9,036,861 | B2 | 5/2015 | Chen |
| 9,075,415 | B2 | 7/2015 | Kugelmass |
| 9,098,655 | B2 | 8/2015 | Plummer |
| 9,116,003 | B2 | 8/2015 | Khorashadi |
| 9,129,376 | B2 | 9/2015 | Pershing |
| 9,135,737 | B2 | 9/2015 | Pershing |
| 9,152,863 | B1 | 10/2015 | Grant |
| 9,162,753 | B1 | 10/2015 | Panto |
| 9,201,422 | B2 | 12/2015 | Ohtomo |
| 9,251,417 | B1 | 2/2016 | Xu |
| 9,501,061 | B2 | 11/2016 | Canoy |
| 9,501,700 | B2 | 11/2016 | Loveland |
| 9,505,494 | B1 | 11/2016 | Marlow |
| 9,513,635 | B1 | 12/2016 | Bethke |
| 9,563,201 | B1 | 2/2017 | Tofte |
| 9,609,288 | B1 | 3/2017 | Richman |
| 9,613,538 | B1 | 4/2017 | Poole |
| 9,618,940 | B1 | 4/2017 | Michini |
| 9,639,960 | B1 | 5/2017 | Loveland |
| 9,734,397 | B1 | 8/2017 | Larson |
| 9,805,261 | B1 | 10/2017 | Loveland |
| 9,805,489 | B2 | 10/2017 | Schultz |
| 9,823,658 | B1 | 11/2017 | Loveland |
| 9,836,882 | B2 | 12/2017 | Freund |
| 9,881,163 | B2 | 1/2018 | Schultz |
| 10,032,078 | B2 | 1/2018 | Schultz |
| 9,898,802 | B2 | 2/2018 | Giuffrida |
| 9,933,254 | B2 | 4/2018 | Thornberry |
| 9,953,112 | B2 | 4/2018 | Schultz |
| 9,959,609 | B2 | 5/2018 | Giuffrida |
| 9,959,653 | B2 | 5/2018 | Schultz |
| 9,959,667 | B2 | 5/2018 | Schultz |
| 9,972,126 | B2 | 5/2018 | Freund |
| 9,978,149 | B1 | 5/2018 | Zhang |
| 10,037,463 | B2 | 7/2018 | Schultz |
| 10,037,464 | B2 | 7/2018 | Schultz |
| 10,366,287 | B1 | 7/2019 | Loveland |
| 10,733,443 | B2 | 8/2020 | Loveland |
| 11,188,751 | B2 | 11/2021 | Loveland |
| 11,205,072 | B2 | 12/2021 | Loveland |
| 2002/0013644 | A1 | 1/2002 | Mekemson |
| 2002/0169664 | A1 | 11/2002 | Walker |
| 2003/0033242 | A1 | 2/2003 | Lynch |
| 2003/0123713 | A1 | 7/2003 | Geng |
| 2003/0210168 | A1 | 11/2003 | Ruszkowski, Jr. |
| 2004/0066917 | A1 | 4/2004 | Yasukawa |
| 2004/0167667 | A1 | 8/2004 | Goncalves |
| 2004/0167861 | A1 | 8/2004 | Hedley |
| 2004/0177373 | A1 | 9/2004 | Kawabe et al. |
| 2005/0267657 | A1 | 12/2005 | Devdhar |
| 2006/0133661 | A1 | 6/2006 | Takeda |
| 2006/0137736 | A1 | 6/2006 | Nishitani et al. |
| 2007/0233367 | A1 | 10/2007 | Chen |
| 2007/0240755 | A1 | 10/2007 | Lichy |
| 2009/0201190 | A1 | 8/2009 | Huthoefer |
| 2009/0265193 | A1 | 10/2009 | Collins |
| 2010/0215212 | A1 | 8/2010 | Flakes |
| 2010/0277588 | A1 | 11/2010 | Ellsworth |
| 2010/0277723 | A1 | 11/2010 | Rezac |
| 2012/0237083 | A1 | 9/2012 | Lange |
| 2013/0216089 | A1 | 8/2013 | Chen |
| 2013/0325244 | A1 | 12/2013 | Wang |
| 2014/0153773 | A1 | 6/2014 | Gupta |
| 2014/0168420 | A1 | 6/2014 | Naderhirn |
| 2014/0176543 | A1* | 6/2014 | MacDonald ......... G01S 3/7868 345/420 |
| 2014/0316614 | A1 | 10/2014 | Newman |
| 2014/0316616 | A1 | 10/2014 | Kugelmass |
| 2014/0324405 | A1 | 10/2014 | Plummer |
| 2014/0336928 | A1 | 11/2014 | Scott |
| 2015/0019267 | A1 | 1/2015 | Prieto |
| 2015/0125841 | A1* | 5/2015 | Folk ...................... G09B 23/00 434/276 |
| 2015/0148955 | A1 | 5/2015 | Chin |
| 2015/0207327 | A1* | 7/2015 | Ferrer ................... G06Q 50/06 703/18 |
| 2015/0220085 | A1 | 8/2015 | Ohtomo |
| 2015/0225081 | A1 | 8/2015 | Kespry |
| 2015/0234943 | A1* | 8/2015 | Brier ..................... G06Q 50/06 703/1 |
| 2015/0348204 | A1 | 12/2015 | Daues |
| 2015/0371346 | A1 | 12/2015 | Frendling |
| 2015/0377405 | A1 | 12/2015 | Down |
| 2016/0004795 | A1* | 1/2016 | Novak ................ B64C 39/024 703/1 |
| 2016/0148363 | A1 | 5/2016 | Phan |
| 2016/0246304 | A1 | 8/2016 | Canoy |
| 2016/0247115 | A1 | 8/2016 | Pons |
| 2016/0253808 | A1 | 9/2016 | Metzler |
| 2016/0257424 | A1 | 9/2016 | Kespry |
| 2016/0272308 | A1 | 9/2016 | Gentry |
| 2016/0292872 | A1 | 10/2016 | Hammond |
| 2016/0301859 | A1 | 10/2016 | Tebay |
| 2016/0307447 | A1 | 10/2016 | Johnson |
| 2016/0321503 | A1 | 11/2016 | Zhou |
| 2016/0327959 | A1 | 11/2016 | Brown |
| 2016/0347462 | A1 | 12/2016 | Kespry |
| 2016/0363929 | A1 | 12/2016 | Kespry |
| 2016/0365825 | A1 | 12/2016 | Poivet |
| 2016/0377424 | A1 | 12/2016 | Clark |
| 2017/0053169 | A1 | 2/2017 | Cuban |
| 2017/0090481 | A1 | 3/2017 | Kespry |
| 2017/0091578 | A1* | 3/2017 | Ananthakrishnan ... G06V 10/60 |
| 2017/0115119 | A1* | 4/2017 | Chapman ............... G01C 21/20 |
| 2017/0123035 | A1 | 5/2017 | Kespry |
| 2017/0146344 | A1 | 5/2017 | Kespry |
| 2017/0193829 | A1 | 7/2017 | Bauer |
| 2017/0249510 | A1 | 8/2017 | Labrie |
| 2017/0270612 | A1 | 9/2017 | Howe |
| 2017/0270650 | A1 | 9/2017 | Howe |
| 2020/0065583 | A1 | 2/2020 | Loveland |
| 2020/0293773 | A1 | 9/2020 | Loveland |
| 2021/0117677 | A1 | 4/2021 | Loveland |
| 2021/0156151 | A1* | 5/2021 | Blundo ................. F21S 11/002 |

OTHER PUBLICATIONS

USPTO Non-final Office Action; U.S. Appl. No. 15/360,630; dated Apr. 13, 2017.

USPTO Non-final Office Action; U.S. Appl. No. 15/480,310; dated May 15, 2017.

USPTO Final Office Action; U.S. Appl. No. 15/444,164; dated Jul. 14, 2017.

(56) References Cited

OTHER PUBLICATIONS

USPTO Notice of Allowance; U.S. Appl. No. 15/360,630; dated Jun. 21, 2017.
USPTO Notice of Allowance; U.S. Appl. No. 15/360,641; dated Mar. 17, 2017.
USPTO Notice of Allowance; U.S. Appl. No. 15/388,754; dated Oct. 5, 2017.
Autonomous MAV—Cues, Cooper Bills et al., IEEE, 978-1-61284-385-8, 2011, pp. 5776-5783.
Unmanned—Monitoring, C. Eschmann et al., ResearchGate, 2012, pp. 1-8.
USPTO Final Office Action; U.S. Appl. No. 15/446,202; dated Nov. 8, 2017.
USPTO Non-final Office Action; U.S. Appl. No. 15/444,164; dated Apr. 21, 2017.
USPTO Non-final Office Action; U.S. Appl. No. 15/446,202; dated Jun. 28, 2017.
PCT Application No. PCT/US2017/059990, International Search Report dated Jan. 29, 2018.
PCT Application No. PCT/US2017/059990, Written Opinion dated Jan. 29, 2018.
U.S. Appl. No. 15/796,672, Non-Final Office Action dated Dec. 14, 2017.
U.S. Appl. No. 15/708,471, Non-Final Office Action dated Jan. 5, 2018.
U.S. Appl. No. 15/796,672, Final Office Action dated Jun. 25, 2018.
U.S. Appl. No. 15/446,202, Notice of Allowance dated Jul. 5, 2018.
U.S. Appl. No. 15/446,202, Non-Final Office Action dated Feb. 22, 2018.
U.S. Appl. No. 15/708,471, Notice of Allowance dated Apr. 16, 2018, 9 pp.

\* cited by examiner

| Panel Size | Qty. | Watts | Price |
|---|---|---|---|
| 2'X4' Panels = $235.00 | 4 | 600 | $940.00 |
| 3'X6' Panels = $270.00 | 2 | 400 | $540.00 |
| 4'X6' Panels = $350.00 | 0 | 0 | 0 |
| 4'X8' Panels = $525.00 | 0 | 0 | 0 |
| Subtotals: | 6 | 1000 | $1480.00 |

Number of Months: 60

= $24.66 per Mo.

FIG. 17

GRAPHICAL USER INTERFACE FOR CONTROLLING A SOLAR RAY MAPPING

RELATED APPLICATIONS

This application claims benefit of and priority to U.S. Provisional Patent Application No. 63/107,585, filed on Oct. 30, 2020, titled "Solar Ray Mapping And Associated Visualization Interface," which application is hereby incorporated by reference in its entirety. This application is also related to U.S. patent application Ser. No. 16/865,158, filed on May 1, 2020, titled "Image Analysis and Estimation of Rooftop Solar Exposure Via Solar Ray Mapping;" U.S. Provisional Patent Application No. 62/842,961, filed on May 3, 2019, titled "Image Analysis and Estimation of Rooftop Solar Exposure;" U.S. patent application Ser. No. 16/522,948, filed on Jul. 26, 2019, also titled "Image Analysis and Estimation of Rooftop Solar Exposure;" U.S. patent application Ser. No. 16/228,019, filed on Dec. 20, 2018, titled "Image Analysis and Estimation of Rooftop Solar Exposure;" and U.S. Provisional Patent Application No. 62/722,714, filed on Aug. 24, 2018, titled "Systems and Methods for Imaging and Reporting the Solar Irradiance of a Structure," each of which is hereby incorporated by reference in its entirety.

TECHNICAL FIELD

This disclosure relates to systems and methods for determining spatial and temporal solar irradiance values of a roof of a structure.

BRIEF DESCRIPTION OF THE DRAWINGS

Non-limiting and non-exhaustive embodiments of the disclosure are described herein, including various embodiments of the disclosure with reference to the figures listed below.

FIG. 17 illustrates an example of a graphical user interface of a system enabling an operator to select sizes, quantities, power, and/or prices of a plurality of solar panels for installation.

DETAILED DESCRIPTION

Figure 1:
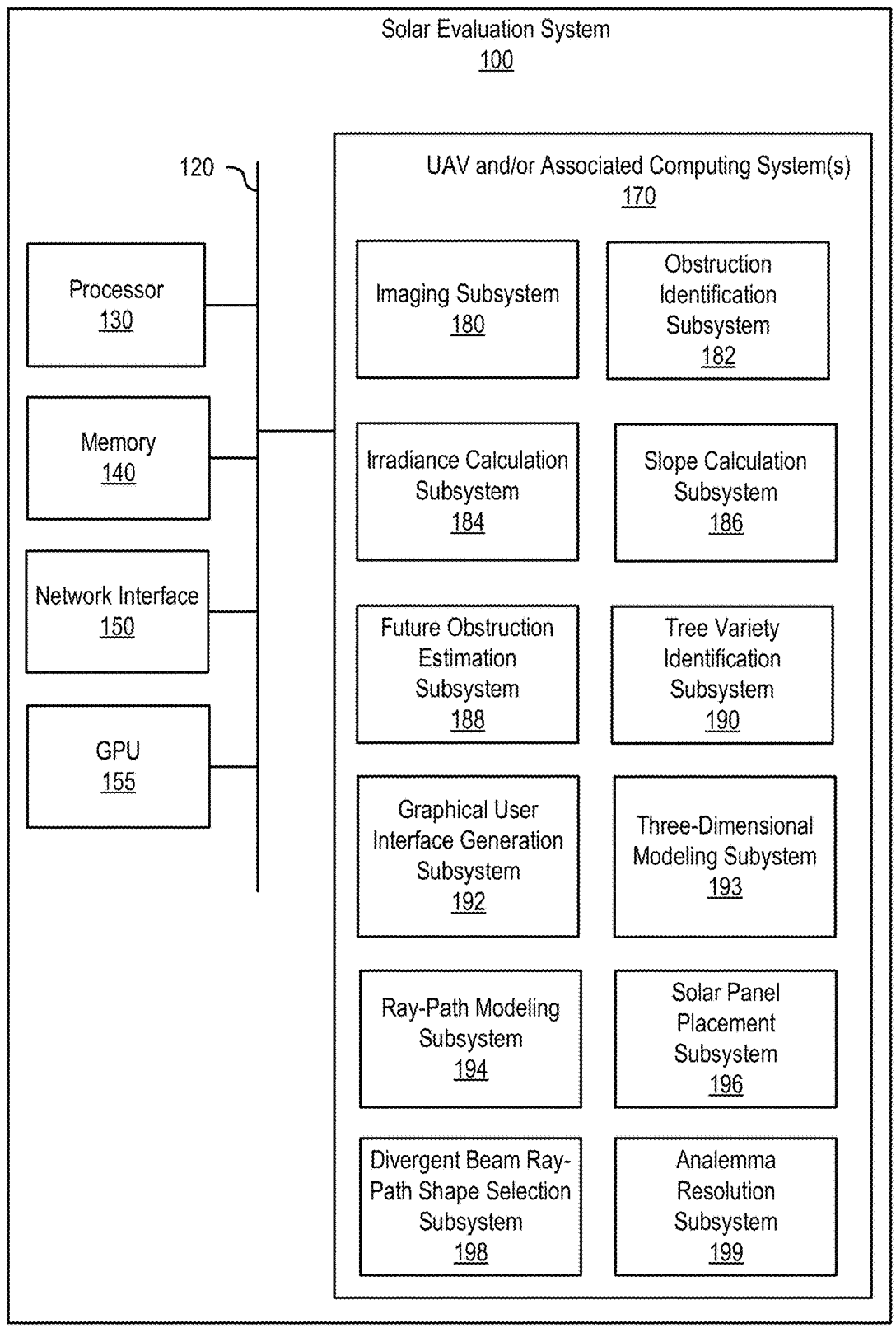
FIG. 1 illustrates a UAV-based solar power design system, according to one embodiment.

This disclosure provides methods and systems for assessing structures and/or other real property using an unmanned aerial vehicle (UAV). A UAV may carry an optical imaging or another sensing system to capture a sequence of images of a target object, such as a structure. The UAV may position itself above the location of interest to allow the imaging system to capture a nadir image of an area of interest (e.g., a target structure). The UAV may follow a boustrophedonic flight path while the imaging system captures a series of images and/or collects non-image scan information. The UAV may position itself around the structure to collect oblique images at one or more heights on each side of the structure and/or one or more corners of the structure. To collect partial or full structural information, the UAV may perform a loop scan while the imaging system captures a set of oblique images. For additional detailed images of the area of interest, the UAV and imaging system may perform a series of microscans. Using the collection of images, a rendering system or subsystem (e.g., as part of a modeling subsystem) may generate interactive models of the target structure, the roof, surrounding objects, or other objects. In some embodiments, the system may utilize images captured using a handheld digital camera, an aircraft, a satellite, or a combination thereof.

According to various embodiments, the system accurately models solar irradiance via ray-trace modeling of sunlight incident on the roof of a structure. In some embodiments, additional scanning, such as loop scans, microscans, boustrophedonic scans, and/or crisscross boustrophedonic scans may be utilized to enhance the modeling accuracy of the structure on which solar panels are to be installed. Similarly, additional scanning, such as loop scans, microscans, boustrophedonic scans, and/or crisscross boustrophedonic scans may be utilized to enhance the modeling accuracy of the surrounding trees, neighboring structures, and/or other nearby objects that may be obstacles to solar irradiance.

This disclosure also provides systems and methods for post image and data collection processing, visualization, annotation, and reporting. This disclosure provides some examples of how images (including optical images, infrared images, moisture sensor data images, ultraviolet images, ultrasonic images, and false-color representations thereof) and other data may be collected as full-subject views, oblique images, perpendicular images, and microscan surface and subsurface views.

Ultimately, a context-rich visualization of the target location may create one or more markers identifying solar irradiance values at target locations. For example, microscan images of target locations on a roof of a structure may include an estimate of annual solar irradiance (e.g., measured in cumulative $kWh/m^2$). The operator may select a target location, such as the roof of a structure, a planar section of a roof, or a portion of a roof. The system may then render a graphical user interface with a context-rich visualization of the annual solar irradiation associated with the selected target location. The solar irradiation for various locations on the roof may be calculated using a ray-based approach, as described below.

In some embodiments, the system may generate a detailed finite element model, or heatmap, of the solar irradiance. For example, a graphical user interface may include a visual display of the portions of the roof with the highest solar irradiance. The graphical user interface may additionally, or alternatively, display a highest average solar irradiance as an overlay on the roof using a blackbody radiation color mapping. The system may calculate the solar irradiance for one or more portions of the roof.

The system may utilize images captured by any of a wide variety of imaging devices to generate a three-dimensional model that includes the structure, obstacles on the structure, and obstacles proximate to the structure (e.g., via a rendering or modeling system or subsystem). The level of detail, the accuracy of the scan, and the newness of the scan all contribute to more accurate solar irradiance calculations. In some embodiments, the system may identify and conceptually divide the roof surfaces into a plurality of polygons. Each polygon may be approximated as a planar surface, the normal to which represents the ideal angle from which to receive solar radiation. National services and databases can be used to look up the maximum solar irradiation possible for a given geolocation (e.g., based on the longitude and latitude of the structure). Additionally, or alternatively, a maximum possible solar irradiation level may be measured at the location. Similarly, publicly available databases and calculators may be used to model the relative location of the sun at any given time, past or future.

The system may model ray paths between each polygon on the roof and the modeled location of the sun. The system may determine an angle between the normal to each polygon on the roof and the ray between the polygon and the modeled location of the sun. The solar irradiance decreases as a function of the cosine of the angle. Accordingly, the solar irradiance is maximized when the ray from the sun is normal to the approximated planar surface of the polygon.

A solar panel installed parallel with, or in the same plane as, the modeled polygon or set of polygons may have a protective cover, such as tempered glass or a polytetrafluoroethylene ("PTFE"). At angles in excess of the glancing angle of the protective cover, most or all the solar radiation is reflected and not available for energy production. The system may approximate the solar irradiance as zero for each polygon for which the ray path between the polygon and the modeled location of the sun is at an angle in excess of the glancing angle.

The system may calculate a total solar irradiance for a period of time (e.g., a day, month, year, or another period of time) at each target location. The system may calculate the solar irradiance for different seasons, for each of a plurality of days, for only weekdays when a business is in operation, monthly, a yearly total, or an average over a time period. In some embodiments, an operator may toggle, select, or slide an element in a graphical user interface to select a time or time period for visualizing the solar irradiance as a heatmap. In some embodiments, the system may calculate, and the operator may select to view solar irradiance values for a one-year, five-year, or ten-year average. The three-dimensional model includes other objects in the space that may obstruct a ray path between the modeled location of the sun and a polygon on the roof, depending on the modeled location of the sun for a given day and time. The system may model the ray path between each polygon on the roof surface and the modeled location of the sun at different times of the day and for different days each week.

Increasing the number of polygons or locations used to model the roof surface(s) may increase the resolution and accuracy of the solar irradiance calculations but increase the complexity of the calculations. The system may calculate the solar irradiance associated with each polygon in time increments selected by the user via a graphical user interface. For example, the user may utilize the graphical user interface to calculate the solar irradiation values every second of every day of every year. As another example, to reduce the computational load (e.g., to decrease the time it takes to render a visualization and/or compute the values), the user may utilize the graphical user interface to calculate the solar irradiation values of each polygon every fifteen minutes of one day each week for a year.

The system calculates the decrease in solar irradiation based on ray paths being blocked by obstructions and/or at an angle to the normal of each respective polygon for the various time increments. For various modeled locations of the sun, the ray paths to some polygons may be blocked by obstacles proximate to the house (e.g., trees or other buildings) or by obstacles on the roof of the house (e.g., swamp coolers, vent pipes, satellite dishes, air conditioning (AC) units, other portions of the roof, etc.). Effectively, the ray paths that are blocked correspond to the shadows that would be present for different locations of the sun at various times of the day and various days during the year.

For instance, at noon, the sun may be modeled as being nearly directly overhead, and so the ray paths may be relatively unobstructed. However, at other times of the day, an increasing number of ray paths may be blocked by, for example, vent pipes, AC units, other portions of the roof, or nearby trees. Again, blocked ray paths correspond to shadows. For example, a relatively large chimney may cast very little or no shadow (i.e., block relatively few ray paths) on a roof when the sun is directly overhead. However, during mid-morning, the chimney may cast a relatively large shadow on a first portion of the roof (i.e., block many ray paths).

The system identifies ray paths between locations on the roof and the modeled location of the sun that are obstructed by an object at various time increments throughout a time period. The blocked ray paths correspond to shadows that will be cast on the locations of the roof at various times of day, at all times, and/or on various days of the year.

In the various embodiments, a UAV may capture images (optical or otherwise), and the UAV or a remote system may perform imaging processing and/or utilize computer vision techniques to identify planar sections of the roof, relative pitches thereof, objects on the roof, and/or objects and structures proximate the roof. The polygonal modeling of the roof surface may facilitate dividing the roof surface into a discrete set of locations and facilitate the identification of a normal from each polygon surface corresponding to the ideal ray path for optimum solar irradiance. For example, the roof surface may be divided into a plurality of triangles. The three vertices of each triangle on the roof may be used to form a plane, the normal to which may be quickly calculated by the system. However, similar calculations can be done for other polygons, such as squares, hexagons, rhombi, and the like. For purposes of this disclosure, the term polygon can be expanded to encompass circles, ovals, and shapes having any combination of curved and straight edges. Moreover, as the area of the polygon approaches zero, the polygon may be represented as a location or spot on the roof from which solar rays may be mapped.

In some embodiments, the normal to the surface of the roof is calculated for a plurality of locations on the surface of the roof without necessarily dividing the roof into a plurality of polygons. For example, the thousands of points on the surface of the roof may be identified, and the solar irradiance ray-path tracing to various modeled locations of the sun at various time increments during a time period may be mapped. The solar irradiance to each location on the roof may be modeled based on the presence of an obstruction (i.e., blocking the ray path) and the angle of the ray path relative to the normal of the surface underlying each respective location. Again, the solar irradiance decreases as a function of the cosine of the angle between the normal and the ray path to the modeled location of the sun at each different time. Angles in excess of a glancing angle for a particular solar panel may be modeled as providing little or no solar irradiance due to the reflection of most of the received energy.

As an example of an obstruction, a tree may block ray paths between some locations (e.g., polygons, locations, spots, etc.) on the roof at some times during the day and on some days of the year. The same tree may block different ray paths, or block no ray paths at all, at different times of the day and on different days of the year. A graphical user interface may show a heatmap that uses various shades of gray or different colors (e.g., blackbody temperature modeling) to illustrate the relative impact or effect of various obstacles and obstructions. White or red may be used to show unshaded portions of the roof. Darker gray shading or darker shades of blue may be used to show the impact or effect of shadows (ray-blocking objects) on the roof that have a significant or relatively higher light-blocking effect over a period of time. Lighter gray shading or various shades of red may be used to show the impact or effect of shadows cast by obstacles that have less of an overall light-blocking effect over a period of time.

As previously described, the three-dimensional model may include a model of the structure, objects on the roof of the structure, objects proximate to the structure (e.g., trees, poles, other buildings, power lines, etc.), and may be augmented to include expected or possible future objects. That is, the three-dimensional model constructed using images captured by a UAV will include existing objects in the three-dimensional space at the time of the scan. Additional objects may be added based on an analysis of the space surrounding the roof of the structure. For example, expected tree growth may be used to augment the size of the trees in the three-dimensional space. Similarly, trees may be modeled as cut down or trimmed to illustrate the potential benefits of removing or trimming a tree. Expected or possible construction may be used to augment the model with additional buildings proximate to the structure imaged with the UAV.

In some embodiments, the system may recommend or suggest that vents, pipes, trees, AC units, swamp coolers, and/or other existing obstacles be relocated or removed to improve solar irradiance. For example, the system may render a graphical user interface that allows a user to selectively remove or relocate existing obstacles from the solar irradiance calculations. Thus, the system may selectively generate a solar irradiance map of the roof (or a portion thereof) with solar irradiances calculated with one or more existing obstacles simulated as having been removed or relocated.

In some instances, the ray-path modeling from locations on the roof to the modeled locations of the sun at various times during a time period may omit the future obstacle during some time periods and add the obstacle into the three-dimensional model for ray-path modeling during future time periods when the obstacle is reasonably expected to exist. A user may use a slider, selection icons, or other features in a graphical user interface to show the solar irradiation heatmap on the roof of a structure at various times during a multi-year time period. As the user moves, for example, the slider, to transition the image from a first day in a starting year to another day in a future year, the graphical user interface may augment the three-dimensional model to show tree growth, building construction, weather conditions (e.g., sunny days, cloudy days, snow, rain, etc.). The granularity of the slider or another selection icon in the graphical user interface may allow for average solar irradiance values to be displayed as a heatmap averaged over a period of minutes, hours, days, weeks, months, or years.

For instance, the graphical user interface may include a slider with an hourly granularity that allows the user to visualize an hour-by-hour change in solar irradiance as a heatmap on the surface of a roof every hour for any number of days, months, or years. Similarly, the graphical user interface may include a selection element with daily or weekly granularity options that allow a user to visualize a daily or weekly change in solar irradiance as a heatmap on the surface of the roof during an extended time period.

The average effect of a future obstacle may be displayed as having less of an effect than an existing obstacle simply because the future obstacle may affect the solar irradiance for a fewer number of years. For example, a tree may be estimated to block certain ray paths for only the last five years of a 20-year time period. In some embodiments, the system may include or interface with an external tree variety identification subsystem. The tree variety identification subsystem may identify the variety of a detected tree and estimate a mature-sized tree. The estimated mature-sized tree may then be used to identify future or potential shadows on the portion of the roof of the structure, which may be displayed and manipulated within the rendered graphical user interface.

The tree variety identification subsystem may utilize samples from the tree, user input manually identifying a tree variety, or images of the tree. For example, the system may utilize images of the foliage, tree shape, and/or bark to identify the tree variety. A wide variety of systems, methods, and techniques for identifying plant species, including identifying tree species, may be utilized and/or included within the presently described systems and methods. An example of such a system is described in U.S. Pat. No. 8,577,616 titled "System and Method for Plant Identification," which is hereby incorporated by reference in its entirety as it relates to the tree variety identification subsystem and is not inconsistent herewith.

In some embodiments, the system may determine whether an identified tree is a deciduous tree or an evergreen tree and modify the expected solar irradiance during summer and winter according to the expected difference in ray-path blocking during each season. Specifically, a deciduous tree may be expected to block less sunlight during the winter (when it has no leaves) and block more sunlight during the summer when it has foliage. Current systems that detect trees, and manual detection or identification of trees by human operators, may inaccurately estimate the impact of the tree if the analysis is done during the winter or early spring. Some embodiments of the presently described systems may identify ray paths blocked by a deciduous tree in the winter months and calculate or estimate the expected ray paths that will be blocked for various locations on the roof during the summer months when the tree is in full foliage. In such embodiments, the identification of the tree variety may be based on manual user selection or an automated identification system using, for example, bark or leaf image analysis. In some instances, a user may manually identify trees as being columnar or broad spread without further identification to provide a rough modeling (e.g., estimate) of future growth.

The system may identify portions of the roof where snow might be expected to accumulate on the roof during certain times of the year. These identified objects, and specifically the relative locations of these objects, may affect the annual or average solar irradiance on portions of the roof. The system may create a detailed finite element model of the irradiance at target locations on the structure or property. In some embodiments, the graphical user interface may allow the user to visualize the snow on the roof. Average annual snowfalls, temperatures, and other weather information may be used to modify the three-dimensional model to show the effect of the snow on the heatmap. In other embodiments, as a user navigates through the hours, days, or weeks of a wintertime period, the graphical user interface may display snow on the roof of the structure for a number of days corresponding to the average weather patterns for the location of the structure.

In various embodiments, UAV hardware, firmware, and/or software may be modified, upgraded, and/or programmed to perform the functions, methods, and behaviors described herein. In some embodiments, software, hardware, and/or firmware may be created to interface with pre-existing UAV interfaces. In other embodiments, modifications to one or more portions of a UAV may be made to accomplish the described systems and methods.

In some embodiments of the present disclosure, a technician may manually operate a UAV to perform one or more assessment tasks. For example, a technician may manually operate a drone to capture photographs that would otherwise have required the technician to scale a building. Some UAVs have semi-autonomous capabilities. These UAVs may be directed to capture photographs of an operator-identified location. However, semi-autonomous UAVs may not capture a comprehensive image collection of the entire site and may not provide adequate information to replace an on-site technician. Some UAVs are autonomous. A technician may program autonomous UAVs onsite or offsite to follow a boustrophedonic flight pattern and identify, pre-flight or during flight, one or more target areas for detailed microscans. In some embodiments, the technician turns on the UAV, selects a property, and the system autonomously performs the scan and determines solar irradiance values at various locations at the time of the scan and for future time increments during future time periods.

The UAV assessment and reporting systems described herein provide comprehensive, automatic (or at least semi-automatic), and methodical approaches for assessing a structure or other object for a particular purpose. The types of assessments, reports, and images collected may vary based on the specific application and intended use. Generally, the approaches obviate the need for an industry-specific trained technician to be present and/or change the relevant qualifications of a suitable technician. In some embodiments, the approach may significantly reduce the workload of a technician. Although this disclosure provides many examples in the context of a roof of a residential building, a person with ordinary skill in the art will recognize that the system is not confined to any particular type of structure. Any solar panel installation site may benefit from the systems and methods described. For example, the systems described in this application may be applied with some adaptation or modification to an empty field, a skyscraper, a house, an apartment complex, a commercial building or factory, and/or any other solar panel installation site.

The use of a UAV to provide detailed scan data greatly enhances the accuracy of the ray-path tracing as compared to using images available from satellites, low-altitude fixed-wing image capture, and manual ground-based image capture. Each of the foregoing suffers from relatively low resolution, image stitching errors, and out-of-date images. For instance, satellite or low-altitude fixed-wing images may be months or even years old. Changes in surrounding objects (e.g., trees or new construction) or even modifications to the structure itself may greatly impact the accuracy of solar irradiance modeling. UAV imaging (including optical, ultrasonic, LIDAR, and the like) provides highly accurate spatial data for building accurate three-dimensional models of the structure and surrounding space to allow for highly accurate ray-path modeling.

In one embodiment, a graphical user interface allows a user to provide operator input for a desired solar irradiance level and/or available or acceptable solar panel size(s). The UAV may identify objects that will present actual obstructions and/or future obstructions to solar exposure, as found during ray-path modeling. Solar exposure may be measured as a flux of energy, such as irradiance per unit area ($kW/m^2$). Solar exposure may be determined based, at least in part, on a historical average for a region, adjusted to compensate for the pitch of the roof, and reduced in locations calculated to have obstructions occluding solar exposure. To determine the location of relevant obstructions, an imaging system (e.g., a camera and/or a sensor) captures images/data and determines, based on the time of day, a solar angle of irradiance (i.e., the angle between the normal to each location on the roof and the ray path from the modeled locations of the sun to each respective location on the roof). Based on historical measurements and/or collected data, the system may calculate the total irradiance for a period of time. The period of time may be measured in seconds, minutes, hours, days, months, years, etc.

A solar evaluation system may determine the total irradiance at a target location. For example, the solar evaluation system may use historical data (e.g., known angles and locations of the sun day-by-day, expected number of sunny days and cloudy days, etc.) to determine the total solar irradiance expected at the target location for one year (or another period of time). In some embodiments, it may be useful to calculate a first solar irradiance value during hot months when air conditioners are in use and calculate a second solar irradiance value during colder months when electrical usage is lower.

In some embodiments, the solar evaluation system may determine the solar irradiance through a direct measurement either on the ground or via the UAV. The solar evaluation system may convert the direct measurement into an estimate at the target location based on the location of the ray-path blocking obstacles and the length of time they are expected to interfere with the solar exposure based on the angle of solar irradiance as the sun is modeled to move relative to the structure. The length of time an obstruction occludes solar exposure may be measured in seconds, minutes, hours, days, months, years, etc. The system (e.g., the UAV and/or associated remote computing system) may determine the angle of irradiance, a level of irradiance at the target location, and any obstructions to the irradiance at the target location. The solar evaluation system may use this information to determine an estimated total irradiance reaching a target location for a period of time and reduce the total irradiance based on the time the obstructions are calculated to occlude solar exposure.

In some embodiments, the system may determine a pitch of one or more planar surfaces making up the roof of a structure. The pitch information may be used to calculate the normal to each location on the roof. For example, in embodiments in which the roof is conceptually divided into a plurality of triangles, the pitch information may be used to determine the normal of each triangle. In other embodiments, the spatial location of the vertices of each triangle may be used to calculate the normal for each triangle without necessarily measuring or calculating the pitch of the underlying roof surface. Of course, it would be expected that the normal for triangles on the same planar portion of a roof surface will be the same or approximately the same.

In embodiments in which the pitch of each planar roof face is used, a UAV may utilize a sensor to make at least two distance measurements from at least two different locations relative to the roof (e.g., two different elevations or horizontal positions) and calculate the pitch of the roof. The system may include an electronic non-transitory computer-readable medium with instructions stored thereon that, when executed by a computing device, cause hardware components of the system to perform operations to calculate the total irradiance at the target location (e.g., a roof or surface of a roof) for a defined period of time.

In some embodiments, the solar evaluation system may include a site selection interface. The site selection interface may receive an electronic input from a user identifying the site or location of a structure. For example, the site selection interface may identify geographic boundaries of an area, an address, and/or the GPS coordinates of a structure. The solar evaluation system may include a hazard input selection system to receive electronic input identifying geographic hazards. Such hazards may include above-ground power lines, tall trees, neighboring structures, etc.

The UAV may include a camera, proximity sensor, and/or other sensors to identify navigational obstacles and/or solar irradiance obstructions. In many cases, navigational obstacles may also be obstructions. The terms "obstacle" and "obstruction" may be used interchangeably in some instances and understood as being relevant to UAV navigation and/or solar irradiance based on context. The camera or sensor may communicate with an imaging system to determine the angle of irradiance. For example, based on the time of day of the UAV scan, the system may estimate or calculate a total irradiance level.

The UAV may include an imaging system with sonar sensors, lidar sensors, infrared sensors, optical sensors, irradiance sensors, and/or radar sensors. In some embodiments, the imaging system includes one visible light imaging camera and any combination and number of other types of sensors. The imaging system may determine the angle of irradiance (e.g., the location of the sun) at a given time. The determined angle of irradiance may be used to calibrate the relative location of the structure with the sun. Known values of the angle of irradiance at other times of the day and during other days of the year may be used to calculate solar irradiance values for each portion of the roof of the structure using a ray-path tracing algorithm to account for blocked ray paths at various times of day during various days of the year. The system can calculate solar irradiance values at the specific location for a period of time (e.g., the system may estimate the irradiance for a month, year, or another period of time utilizing forecasted data).

As previously described, the UAV imaging system may identify locations of objects that will obstruct the ray path between the sun and various locations on the roof of the structure. The UAV may include an onboard processor and/or a communication interface to communicate with the controller and/or the interface's cloud-based processing. The UAV may conduct a structural assessment. The structural assessment may include a first boustrophedonic scan of the area defined by geographic boundaries that include the structure. The boustrophedonic scan may include capturing images and/or irradiance during a boustrophedonic flight pattern within a first altitude range. The boustrophedonic scan may include determining distances to a surface for each of a plurality of potential vertical approaches within the area defined by the geographic boundaries. The UAV assessment and reporting system may include identifying a structure on the site based on the identified geographic boundaries and/or the boustrophedonic scan of the area. The UAV assessment and reporting system may include a loop scan of the structure. The loop scan may include a second flight pattern for the UAV to travel around the perimeter of the structure. The second flight pattern may be at a second altitude range lower than the first altitude range. The UAV assessment and reporting system may include a target location scan of the structure in a third flight pattern that includes vertical approaches proximate the structure to capture detailed images at target locations on the structure.

The UAV may include one or more processors and/or a communication interface to communicate with the controller and/or the interface's cloud-based processing. The UAV may calculate solar irradiance values at the target location and/or supply data to remote processing devices in real-time or via a post-landing data transfer. Regardless of which portion of the system implements the algorithms, the system may calculate the total irradiance for the period of time (e.g., one day of irradiance) for each location on a roof of a structure.

In some embodiments, obstructions to portions of the surface of the roof may actually be reflective and increase solar irradiance on other portions of the surface of the roof at various times of the day. For example, a copper-clad chimney, aluminum sheeting, or a tourelle (e.g., a copper-coated decorative cone-shaped turret) may block solar irradiance relative to some portions of the planar surfaces of the roof but actually increase solar irradiance to other portions of the roof due to reflections. In such embodiments, the system may identify material types of the various obstructions and/or other portions of the roof to determine reflectivity properties. Solar irradiance values may be adjusted accordingly based on solar irradiance obstructions and reflections. Ray-path modeling may account for these reflective materials by modeling a ray path between the modeled location of the sun and a location on the roof surface that includes one or more intermediary reflections.

As previously noted, the UAV solar irradiation assessment system may include a site selection interface to receive electronic input from a user identifying a structure. In some embodiments, the operator may control the device through remote control. For example, the operator may direct the UAV to an operator-identified location and capture data. The operation may be semi-autonomous such that the operator directs the device to various locations for analysis. In other embodiments, the device may be fully autonomous. For example, the operator may begin the assessment by placing the UAV in a safe location for takeoff and selecting a "start" or "begin" icon on the computing device or UAV. The operator may select the nearest roof or one or more roofs for analysis by the UAV. The system may analyze the nearest roof or one or more roofs based on an operator selection. For example, the system may use satellite images, real-time nadir images, or satellite images aligned using nadir images to select a structure for analysis.

The operator may, for example, be an employee, contractor, or agent of a solar panel installation company, a roofing company, an inspector, an analyst, an owner of the structure, and/or another person involved with the design and installation of solar panels on a roof or structure. In some embodiments, the operator of the UAV may utilize a remote-control system such as a personal computer or personal electronic device. Examples of such devices include watches, tablets, laptops, smart glasses, wearable technology, and mobile phones. For example, an operator may use the computing device to initiate an assessment of solar irradiance via a software program on the computing device. In some embodiments, the computing device may comprise custom hardware designed specifically to implement the systems and methods described herein. In other embodiments, a computing device may be customized and made to perform new functions through the incorporation of additional hardware, software, and/or firmware. The autonomous or semi-autonomous processes may obviate the need for an industry-specific trained technician to be present and/or may substantially reduce the workload of a technician. In some embodiments, a salesperson may use the UAV system to perform an initial scan and capture the necessary data for the technician to begin a detailed design review at a remote location.

The UAV may perform a boustrophedonic scan to determine the irradiance of the site or a structure on the site. During the boustrophedonic scan, the UAV may follow a predetermined flight pattern. For example, the UAV may travel from one edge to the opposite edge of the site in alternating offset zones. One or more cameras and/or sensors on the UAV may obtain data, make measurements, and/or capture images of the site throughout the boustrophedonic flight pattern.

A UAV may carry an imaging system and/or one or more sensors to capture data and images of a roof. The UAV may capture relative solar irradiance, energy flux, and/or solar exposure in the visible light, ultraviolet, and/or infrared wavelengths as part of the scan. The relative values can be used to crosscheck calculations of surface pitch and the identification of obstructions. For example, the system may assume that two unobstructed surfaces, having the same angle relative to the sun, will have the same solar irradiance values at a given time. If sensors on the UAV (e.g., a camera) detect otherwise, the system may re-evaluate or attempt to identify the angles of the surfaces and/or identify any obstructions that may be causing the difference. Thus, the system may utilize real-time solar irradiance values to ensure an accurate model for calculating temporally averaged solar irradiance values.

The UAV may use other sensors, including moisture sensors, sonar sensors, optical sensors, ultrasonic sensors, LIDAR, RADAR, irradiance sensors, and/or other sensors to capture data. The UAV may capture images and/or video data in the visible, infrared, and/or ultraviolet spectrums. As used herein, the term "image" is used broadly to include visible-spectrum images, as well as "images" captured using alternative sensor types in the infrared, ultraviolet, and/or ultrasonic sensor systems. For example, some images may be visible spectrum images, some images may be infrared images presented in false color, and other images may be infrared presented in numerical values overlaid on a finite element model of the roof of the structure. Some images may correlate to a single numerical value, for example, the irradiance at a specified location.

Ultimately, the scan can be used to generate a context-rich report of solar irradiation at various locations along the roof of a structure (or at specific areas of the site). The operator may select a target location on the roof, and the system may display the solar energy flux, irradiation, exposure, and/or other data relevant to the installation of a solar panel at the specified location. The system may generate a report with a digital full subject image (e.g., a three-dimensional model of the structure, a three-dimensional model of the roof, and/or a model of a portion of the roof).

The UAV may perform a loop scan to analyze the angles of a structure. The loop scan may include a flight pattern that positions the UAV at the perimeter of the structure and/or the site. The loop scan may include the UAV traveling around the perimeter. As the UAV travels around the perimeter, the UAV may lower its altitude while the camera captures images of the structure at one or more angles. The angles may be oblique or perpendicular to the walls of the structure. The UAV assessment and reporting system may use these images to create a three-dimensional model of the structure. In one embodiment, the UAV may make multiple passes around the perimeter of the structure at different altitudes. For example, the UAV may fly around the perimeter at a first altitude to capture images of the structure at a first angle and then fly around the perimeter at a second altitude to capture additional images of the structure at a second angle. In other embodiments, a loop scan is not needed if sufficient data is captured during one or more boustrophedonic scans.

The UAV may perform a microscan for close-up, detailed images of a target location or another area of interest. In some embodiments, the UAV may perform a series of vertical approaches near the structure. In some embodiments, the vertical approaches may be simulated via digital or optical zooming of a camera. In other embodiments, the resolution of the camera may obviate the need for vertical approaches. The UAV may perform microscans by traversing the surface of a structure (including the roof surface, walls of the structure, surrounding objects such as trees and other buildings, telephone or power poles, and the like).

In various embodiments, the UAV may perform a 360-degree panoramic scan of a surrounding area and/or capture similar data via one or more nadir images. For example, a UAV may be positioned above a structure (e.g., a peak of a roof) and remain in approximately the same location relative to the structure while the UAV rotates 360 degrees to capture a panoramic image of the surrounding area. As a specific example, a UAV may fly to a height above the roof (e.g., 5' or 10' above the highest point on the roof or site) and scan the site for obstacles in the surrounding area as it rotates 360 degrees. A second 360-degree panoramic image of the surrounding area from a different elevation may be used to enhance the resolution and accuracy of the three-dimensional modeling of objects near the structure. The system may utilize the 360-degree scan of the surrounding area to calculate distance measurements and build the three-dimensional model of the structure that includes surrounding buildings, obstacles, trees, vacant lots, and/or other objects of interest for ray-path modeling.

The system may identify existing and/or potential obstructions to the solar irradiance received by the surfaces of the roof. For example, the system may identify a tree that will cast a shadow on a portion of the roof of the structure at some time of the day and/or time of year. Such an obstacle is considered an "existing obstruction" because as it currently exists, it is an obstruction during at least one time of day and/or for at least some of the days each year. The UAV does not necessarily measure or detect an existing shadow since the tree may not currently cast a shadow because of the location of the sun due to the time of day and/or time of year. Rather, the UAV identifies the relative location, shape, and/or height of an obstacle and calculates shadows at the various times of day on various days throughout a given month or year.

In contrast, a tree that is still small may not currently block ray paths at any time of day during any days of the year. Nevertheless, such an object may be identified as a "potential obstruction" or "future obstruction." The system may detect that the tree could grow, or is expected to grow, a certain amount, at which point it would begin to obstruct solar irradiation during at least some time periods during the day and on at least some days of each year. The owner of the structure planning to install solar panels may determine to cut down or trim the tree to eliminate the potential obstruction or design the solar power system to account for the tree as if it were full-grown and an actual obstruction that blocks the ray paths as modeled.

In some embodiments, the 360-degree panoramic scan may assess neighboring lots, adjacent buildings, and/or other information not located on the site. For example, the UAV may scan an adjacent vacant lot, connect to a network, and determine that the lot is zoned for commercial use. The system may then calculate that although the vacant lot does not presently interfere with the irradiance received at the site, future developments may impact the irradiance and solar exposure received at various locations on the roof and/or site. The system may follow a similar process for neighboring trees, predicting their future growth and reducing the expected irradiance at various locations of the site. In some embodiments, the system can determine the zoning for adjacent lots in real-time. For example, the system may utilize a network connection to determine whether a developer of an adjacent lot has submitted any plans for the lot (e.g., available city or county records). The system can utilize this information to make more accurate predictions about the potential impact the development of the adjacent lot may have on the site.

The system may automatically select and/or an operator may manually select a target distance for default scanning based on the resolution of a camera, desired level of detail, adjustability of the camera, and/or a fixed field of view of the camera. The camera may obtain images corresponding to specific dimensions (e.g., a known area) on the roof's surface. For example, the dimensions of the known area may correspond to a finite element of the heatmap model. A camera may have a fixed field of view or an adjustable (zoomable) field of view. The square footage and dimensions of the portion of the roof may be captured or calculated using a single image, depending on the field of view of the camera and the distance of the camera from the roof. A given field of view may determine the target distance. The correct field of view and distance measurements ensure that the captured images correctly correspond to the specified dimensions at the target location. As such, the system may store the field of view and distance measurements as metadata associated with each captured image. In some embodiments, the default square footage per image may be 50 square feet, 100 square feet, 200 square feet, etc. The images may be square or rectangular with any of a wide variety of aspect ratios.

In some embodiments, the UAV solar irradiance system may generate a shaded map (e.g., a heatmap or blackbody model) of the roof showing areas of the roof receiving varying levels of solar energy during a given time period. For example, a heatmap of the solar irradiance along the roof may be generated for a day, month, or year. The heatmap may comprise a series of finite elements (e.g., the polygons used to model the ray paths) that each represents a target location on the roof. The heatmap may consider the total or average irradiance at the target location based on the known angle of the roof and known locations of the sun at various times of the day and various days throughout a given week, month, year, etc. For example, a chimney, an AC unit, pipes, trees, the direction of the roof panels, and/or other factors may affect the amount of irradiance available at each specific location on the roof. Moreover, the location of the chimney, vent, skylight, etc. may impact the possible locations for solar panel installation. The system may divide the site into discrete finite elements that each receive different solar exposure assessments. For example, the model can average the flux over discrete sections of the roof. A completely obstructed area may receive an average of zero Watts/meter$^2$ (e.g., 0 W/m$^2$). In other largely unobstructed locations, the irradiance may have a higher average (e.g., to 1,367 W/m$^2$ or another amount).

In other embodiments, the heatmap may be graphically illustrated as varying levels of gray, where dark areas represent areas with less irradiance, and lighter areas represent areas with more irradiance. In still other embodiments, colors, or shades of particular colors, may be used to illustrate the solar irradiance received by various locations on the roof of a structure.

The heatmap may enable a user to quickly visualize the optimal location for solar panels at the site. In some embodiments, the system may use the finite element data to determine and recommend the optimal placement of solar panels. An operator may not immediately recognize the optimal location for solar panels because the average irradiance of the panel, rather than the highest discrete irradiance, may determine the optimal placement of the panels. Different heatmaps may be generated for peak irradiance, average irradiance, or even a weighted average irradiance relative to demand.

For example, if energy demand is known to be higher in the summer between the hours of 12 pm and 5 pm, the expected irradiance values at various locations on the roof during these times may be weighted higher than the irradiance values at the same locations during winter months or off-peak hours. Thus, a generated heatmap may illustrate average irradiance values over a period of time adjusted for the energy demand at the various time periods. In such an embodiment, a heatmap displayed for a user and/or used to calculate solar panel placement may graphically illustrate the optimal location for solar panel placement, taking into account existing obstructions, potential obstructions, time of day variations, day of year variations, and time-based energy demand.

Accordingly, an obstruction that prevents irradiance at a peak time (e.g., noon during a high-demand summer day) may have a greater impact on the generated heatmap and/or solar panel placement estimator than an obstruction that prevents irradiance at a low-demand time (e.g., 8 pm)—even if the actual decrease on received radiation is the same.

As previously noted, the effect on solar irradiation of an obstacle may vary with time. For example, a vacant lot can later be developed to include an obstructing structure. To account for potential obstacles, the operator and/or the system may make reasonable predictions. For example, zoning restrictions may regulate the type of structures available for a vacant lot. In some examples, the county or a builder may make available the plans for the vacant lot. Using this information, the heatmap may make future predictions about the expected solar exposure at the site. The ability to assess adjacent or neighboring lots for potential obstacles (e.g., obstacles not present but planned in the future), as well as for existing off-site obstacles, enables the system to capture information in the heatmap that a trained technician may have difficulty recognizing or modeling.

For example, a wide variety of obstacles may affect the heatmap due to the ray paths they will block at various times, as determined via the ray-path analysis of the three-dimensional modeling. Obstacles to solar irradiation may include but are not limited to trees, shrubs, satellite and other communication dishes and antennas, poles, chimneys, other buildings, orientation, gables, air conditioning/heating units, and/or other objects. Also, obstacles may change over time. A tree or shrub may grow. An undeveloped lot may be developed to include a building that obstructs solar exposure. The variety of obstacles, both present/current and future/potential, may generate a complex heatmap along the surface of a roof. Shadows cast by obstacles may interfere with one another. Even a trained, skilled technician may not foresee how shadows from obstacles may interfere with one another. For example, obstacles may overlap for some lengths of time and create different shadows at other times. The interference and combination of current and potential future shadows may further complicate the heatmap.

For example, the zoning and/or size of an adjacent proposed building may affect the future amount of energy flux or irradiance received at a target location. For example, a two-story building in a zoned residential neighborhood may not adversely impact the site on a roof. The heatmap, or FEM, may reflect little to no adjustment. The recommended placement of solar panels may not substantially deviate due to a small (e.g., two-story) building in a neighboring lot. In contrast, a large (e.g., four-story) building may substantially interfere with optimum solar panel placement. The heatmap may encode and/or display all this information in a graphical user interface. In some embodiments, a user may toggle, via the graphical user interface, certain effects on and off. For example, a user may prefer to view a heatmap based on all existing obstacles and omit the effects on the heatmap of potential obstacles. The operator and/or system may then use the heatmap (or data to generate the heatmap) to determine a suitable or optimal placement of the solar panels.

The proposed size and/or construction material of a neighboring structure may adversely affect the irradiance at a site. The shadow from the structure may occlude solar exposure and cast a shadow on the location of solar panels. For example, an adjacent property with a four-story apartment building may occlude more light than a two-story structure. A vacant lot may require further investigation to determine whether the lot is zoned for a two-story, three-story, or four-story building. The system may modify a solar panel layout design based on the zoning laws and ordinances and/or a proposed construction plan. For example, the heatmap may reflect the future adversely affected exposure for a part of the roof where the zoning of a vacant adjacent lot permits a four-story building. Although the lot is currently vacant, the heatmap may compute an expected shadow based on setback requirements, zoning laws and regulations, ordinances, building plans, and/or other construction requirements. Based on the altered heatmap, the UAV solar evaluation system may recommend locating the solar panels in locations that are less affected by the expected building.

Similarly, in the northern hemisphere, a building to the north of a structure with a reflective surface (e.g., large windows) may actually increase solar exposure on northfacing slopes of a building. Again, the ray-path modeling may include ray paths between locations on the roof of the structure and the modeled location of the sun that are reflected off of the neighboring structure. Accordingly, the system may estimate or measure an increase in solar irradiance caused by reflected sunlight from neighboring structures.

The UAV-based solar irradiance assessment system may utilize various user inputs to determine a solar panel layout. User-specified goals for daily, monthly, or annual solar collection may be used to determine the number of panels needed and an optimal or partially optimized placement for the panels. Alternatively, as a user digitally places solar panels on a displayed model of the roof, the system may show the user how many kilowatts will be generated per hour, day, week, month, year, lifetime, etc. For example, a 300-watt solar panel in one location on the roof may be expected to collect 100 watts early in the morning, 300 watts in the afternoon, and be shaded in the later afternoon and evening. The panel in such a location may be expected to generate 1.6 kW per day, for example. The same panel in a more optimized location may generate nearly the full 300 watts for most of the day for a total of around 2.8 kW per day.

Thus, in some embodiments, a user may utilize the graphical user interface to place panels with known specifications, and the system may inform the user of the total expected solar collection at a peak time, per day, per hour, per month, per year, etc. In other embodiments, a user may specify that they want to collect an average of 7.2 kW per day. The system can identify and display the number of panels and placement necessary to achieve a daily average of 7.2 kW on an annual basis or a monthly basis. In another embodiment, the user may specify that they desire no less than 7.2 kW on any given (sunny) day. This would likely require more panels to compensate for the lower angle of the sun during the winter months. In various embodiments, the system may provide, and display via the graphical user interface, solar layout design specifications that include the total number of panels, the number of panels connected in series, the number of panels connected in parallel, the gauge of wire needed, the number of branch connectors, the number of maximum power point tracking (MPPT) controllers, the number of inverters, the number of batteries, the number of transfer switches, etc.

In other embodiments, the system may recommend a number of panels based on a target payoff or break-even date at a given price per kilowatt-hour and price per kilowatt of installation. Solar panels placed in locations with the maximum sun exposure may generate sufficient solar power to cover the cost of installation very quickly (e.g., two years), while solar panels placed in partial shade may generate less solar power and take longer (e.g., eight years) to cover the cost of installation. A user may specify a desired break-even payoff period of, for example, five years or a desired profitability over a ten-year period. The system may generate a solar panel layout based on the desired financial goal as well as the solar irradiance mapping produced in conjunction with the UAV scanning.

In some embodiments, the UAV solar irradiance assessment model may include a graphical user interface that allows an operator to select a threshold for the panels to be installed. The operator may input a minimum irradiance for the system and an acceptable panel size. The system may generate recommended locations of the selected solar panels on the structure. In one embodiment, a user may toggle a box for acceptable sizes of the solar panels. For example, the operator may select a panel type from a drop-down menu or select specific panel sizes that are available (e.g., 2'×4', 3'×5', etc., or other size panels including non-rectangular shapes). In some embodiments, a user may select all available panel sizes and allow the system to return the best design to capture the highest level of solar exposure and/or highest level of solar exposure within financial constraints (e.g., a break-even or profitability goal). Once selected, the system may generate the ideal locations for installing the panels.

In addition, the system may recommend an angle of the panels relative to the roof and/or account for and recommend solar-tracking solar panel mounts (i.e., mechanically rotating solar panel mounts). In some embodiments, a user may specify limitations for aesthetic reasons. For instance, a user may want only low-profile solar panels or avoid solar tracking mounts.

The user may input threshold angles of the panels relative to the roof and/or a default range of angles may be presumed to be available. The heatmap generated by the system may account for these possible or expected angles. The angle relative to the roof of a solar panel may affect the heatmap. User specification of available or acceptable angles may be used to update a heatmap and/or expected output of a specific solar panel layout. For example, an angled panel may enable areas formerly in a shadow to receive greater sunlight. The operator and/or the system may establish practical limits to the acceptable angles. For example, the graphical user interface may ask the operator to set a limit to the recommended angle of the solar panels relative to the roof.

The solar exposure system may include a network of components and modules that interact to generate the heatmap and/or the optimum placement of solar panels on the roof. For example, the solar exposure system may include a non-transitory computer-readable medium for storing instructions. The system may store the instructions in memory, and a processor may implement various modules to accomplish calculations and tasks performed by the system. The processor may be located on the UAV or may be remotely connected through a network and/or network interface. The network interface may enable communications of one or more operations to the UAV pre-flight, post-flight, and/or during flight.

As an example, but not by way of limitation, one or more computer-readable storage mediums of local and/or remote systems may include: a scanning module, a navigation module, a risk zone generator, a tag reading module, an irradiance module, an obstacle module, an estimator module, and/or other modules to perform the operations and methods described herein. The system may include each module on the UAV, off the UAV, or in a system on and off the UAV and/or connected through a network. For example, the network may connect some of the modules located on the UAV with others connected remotely through the network.

The scanning module may include detailed scans of complex areas or locations where additional data is required. For example, the scanning module may determine the pitch of a roof, identify hazards, identify ray paths blocked by obstacles obstructing solar irradiation, locate potential future obstructions to solar irradiation, measure distances to such obstructions, and/or otherwise identify and scan detailed obstructions or target areas of the subject property. In some embodiments, the scanning module may determine the time of day, the angle of the sun, the sun's trajectory, and historical scans for correlating a scan to annual predictions of irradiance.

The scanning module may predict an expected length of time for which obstructions will occlude solar exposure, the total period of time for which a target location will receive solar exposure, and/or the total irradiance at the target location for a period of exposure time. For example, the scanning module may base the expected period of exposure on the scanned angle of irradiance, the measured level of irradiance at the target location, the distance measurement to any obstacles, and/or the length of time of any obstructions to the irradiance.

An obstacle module may calculate obstructed irradiance at the target location of a roof. For example, the obstacle module may identify a scanned obstacle, predict the length of time the obstacle may occlude solar exposure at the target location, and determine the extent of the solar exposure blocked by the obstacle. The calculation may determine solar irradiance as a power measurement (e.g., W or kW), as a flux measurement (e.g., $kW/m^2$), or as a length of time (e.g., seconds, minutes, hours, or days).

The solar exposure system may include an estimator module. The estimator module may use historical data to estimate cloudy, rainy, and/or snowy lengths of time that occlude solar exposure. The estimator module may compute a heatmap of the solar irradiation on the roof or at the subject site. The heatmap may identify optimal locations for the placement of solar panels and/or the optimal size of the solar panels. The estimator module may also indicate a recommended angle or orientation of the solar panels relative to the roof. The estimator module may determine optimal panel placement on the heatmap based on the recommended angle of the panels. The estimator module may calculate and return a recommended solar panel size, angle, and/or location of the solar panels to the graphical user interface.

In some embodiments, the system may utilize images and/or models provided by other systems (e.g., external or third-party systems). In such embodiments, ray-path modeling may be performed, according to any of the various embodiments described herein, to calculate the locations of shadows and/or solar irradiance values during a time period. Thus, image capture (e.g., via a UAV) and 3D modeling systems and subsystems may be omitted or externally implemented.

For example, systems and methods described herein may receive and render for display within a graphical user interface, a three-dimensional model of a structure, roof, surrounding obstacles, and/or other features. The system may model and display a ray path between each of a plurality of locations on the roof of the structure (e.g., based on mapped polygons, according to a random selection, or according to a pattern). The solar rays may be mapped to modeled locations of the sun at different times of day on various days of a month, multiple months, a year, or multiple years.

Based on a user selection via a user interface of the graphical user interface, the system may model ray paths between 100 locations on a roof of a structure to modeled locations of the sun every hour between 6 am and 10 pm (e.g., 17 times each day) for 180 days of the year (e.g., almost every other day). A higher resolution ray-path modeling may include 1,000 locations on the same roof of the structure, modeling every 30 minutes for an entire 24-hour cycle, and/or modeling each day of the year. As can be appreciated, even higher resolutions are possible with more locations on the roof of the structure (e.g., tens of thousands, hundreds of thousands, millions, etc.) and/or more frequency modeling (e.g., every second, every minute, every ten minutes, etc.).

The time required to model ray paths depends on the modeling resolution and the available computing resources. In some instances, an operator or customer may desire results (e.g., a report) within a specific amount of time or within a reasonable amount of time. It may, therefore, be desirable to use a reasonably low-resolution ray-path modeling that allows for results and reports within a reasonable amount of time via a reasonable amount of computing resources.

For instance, the user may provide inputs via the graphical user interface to cause the system to model ray paths from 1,000 locations on the roof of the structure (e.g., to provide a desired spatial resolution) to modeled locations of the sun at time intervals during a time period that provide an adequate temporal resolution. For example, ray paths may be modeled every two hours between 7 am and 9 pm every week during a one-year period of time. In such an embodiment, 1,000 ray paths would be modeled to locations of the sun 8 times each day on 52 different days during the year. Even with this lower resolution (sparse) modeling, 416,000 ray paths would be modeled within the three-dimensional model. Given available computing resources and/or expected delivery timelines, the spatial resolution and/or the temporal resolution may be increased or decreased.

As described above, the user may modify the spatial resolution via the graphical user interface by changing the density or number of locations on the roof of the structure, and the temporal resolution may be modified by changing one or more of: the time interval at which ray paths are modeled on a given day (e.g., every minute, every hour, every three hours, etc.); the time window during each day during which ray paths are modeled (e.g., 24-hours each day, 11 am-7 pm, etc.); the number of days ray paths are modeled during a time period (e.g., every day, every other day, every third day, once each week, once every two weeks, once a month, etc.); and the total time period during which ray paths are modeled (e.g., a one-month period, a three-month period, a six-month period, a twelve-month period, or even a multi-year period).

According to various embodiments, a non-transitory computer-readable medium may include instructions that, when executed by a processor, cause a system to model a ray path between each of a plurality of locations on the roof of a structure and modeled locations of the sun relative to the roof of the structure at a defined time interval during an extended time period (e.g., at different times during a time period). The instructions may further cause the system to distinguish between obstructed and unobstructed ray paths, as described herein. The instructions may then cause the system to calculate a solar irradiance value for each location on the roof during a time period (e.g., one year) as a function of the number of unobstructed ray paths associated with each respective location on the roof. As described herein, the solar irradiance value may further be a function of the angle of each modeled ray path relative to a normal associated with each location on the roof.

As described herein, the number of locations on the roof may vary to achieve a target spatial resolution. For example, locations may be selected that correspond to surface areas between 0.01 meters squared and 1.0 meters squared. As previously described, each ray path may be modeled as a line segment between a location on the roof of the structure and the modeled location of the sun at each given time.

According to various embodiments and variations of the embodiments described herein, relatively lower-resolution or sparse modeling of solar ray paths may result in erroneous outputs in which the effects of an occluding obstacle are missed. For example, if sampling for a given location occurs at 9 am and 11 am (e.g., corresponding to a two-hour sampling interval), it is possible that a tree or other obstacle may be missed that casts a shadow on the given location from 9:45 am until 10:30 am. The ray path at 9 am and the ray path at 11 am may both be unobstructed and the system may (erroneously) interpolate the solar irradiance as continuous between 9 am and 11 am. Sampling with a one-hour interval would reveal an unobstructed ray path at 9 am, an obstructed ray path at 10 am, and an unobstructed ray path at 11 am, which may provide more accurate data for solar irradiance calculations. Sampling with one-minute intervals would result in much more accurate solar irradiance estimations but would require significantly more computing power and/or time.

According to various embodiments of the systems and methods described herein, the user may select, via the graphical user interface, that the ray paths be modeled as divergent beam ray paths instead of line segments. A divergent beam ray path may be modeled as a cone or a pyramid with the apex at a location on the roof. The angle of divergence as the ray path extends from the location on the roof to the modeled location of the sun may be selected based on the sparsity of daily time interval sampling.

As an example, if the user selects a one-hour time interval (e.g., via the graphical user interface) for sampling ray paths from the various locations on the roof, depending on the time of year and latitude of the structure, the sun may be modeled as moving approximately 15 degrees each hour (e.g., approximately 900 arcminutes). A vent pipe, pole, or tree may only occlude a 5-degree portion of the sky relative to a given location on the roof. In embodiments in which the sun is modeled as a single point for ray-path modeling between the location on the roof and the sun, modeling with one-hour increments may result in the modeling missing the vent pipe, pole, or tree. In some embodiments, divergent beam ray paths may be modeled as cones or pyramids that diverge in order to detect objects or obstacles that would otherwise be missed due to sparse temporal modeling. The divergent beam ray path may be identified as obstructed if any portion or more than a threshold percentage of the divergent beam ray path intersects an object or obstacle between the location on the roof and the modeled location of the sun.

The angle of divergence may be selected to correspond to the sampling interval. For example, an angle of divergence may be selected such that diverging cones or pyramids from a given location on the roof at a first sampling time and a second, next interval sampling time overlap at a target distance. According to various embodiments, the graphical user interface allows the user to select from a wide variety of solar ray shapes for modeling the solar irradiance values on the roof of a structure and/or for rendering the solar ray paths for display. For example, a solar ray shape selection element of a filter options menu may allow a user to select the solar ray shape as one or more of a linear solar ray shape, a conical solar rays shape, a rectangular solar ray shape, a hexagonal solar ray shape, a triangular solar ray shape, a circular solar ray shape, an elliptical solar ray shape, including both diverging and non-diverging variations of each of said shapes.

In various embodiments, a system for divergent beam ray-path modeling may receive or otherwise utilize an existing 3D model of a roof of a structure and surrounding obstacles. The system may include a divergent beam ray-path modeling subsystem to model a divergent beam ray path from each location (e.g., hundreds, thousands, or tens of thousands of locations) on a roof of a structure to a modeled location of the sun at multiple, discrete times during a time period. The system may further include a beam ray-path analysis subsystem to identify (i) obstructed divergent beam ray paths that are obstructed by an obstacle and (ii) unobstructed divergent beam ray paths. The system may further include an irradiance calculation subsystem to calculate a solar irradiance value for each location on the roof of the structure during the time period based on the number of unobstructed divergent beam ray paths associated with each respective location during the time period.

In some embodiments, the system may include a modeling subsystem to identify the plurality of locations on the roof of the structure as a number of locations corresponding to a spatial sampling resolution, as described herein. In some embodiments, the system may also include an analemma resolution subsystem to identify the multiple, discrete times during the time period as a number of times each day and a number of days during the time period for which a divergent beam ray path is modeled from each location on the roof of the structure. In other embodiments, the spatial sampling resolution and/or the temporal sampling resolution may be specified by an external system, automatically according to default settings, and/or manually by an operator or other user of the system.

As previously described, each divergent beam ray path may be modeled as a cone or pyramid with an apex and an altitude. The apex of the cone or pyramid may be modeled at the location on the roof of the structure. The altitude may extend from the location on the roof of the structure to the modeled location of the sun at each given sampling time. For pyramid divergent beam ray paths, the base of the pyramid may be modeled as an n-sided polygon, where n is an integer. In various embodiments, each divergent beam ray path may be identified as "obstructed" only when the divergent beam ray path is fully or completely obstructed by an obstacle, when the divergent beam ray path is partially obstructed by the obstacle, or when the divergent beam ray path is obstructed by more than a threshold amount (e.g., percentage).

Some of the infrastructure that can be used with embodiments disclosed herein is already available, such as general-purpose computers, computer programming tools and techniques, digital storage media, and communications networks. A computer may include a processor, such as a microprocessor, microcontroller, logic circuitry, or the like. The processor may include a special-purpose processing device, such as an ASIC, a PAL, a PLA, a PLD, a CPLD, a Field Programmable Gate Array (FPGA), or another customized or programmable device. The computer may also include a computer-readable storage device, such as non-volatile memory, static RAM, dynamic RAM, ROM, CD-ROM, disk, tape, magnetic memory, optical memory, flash memory, or another computer-readable storage medium.

Suitable networks for configuration and/or use, as described herein, include any of a wide variety of network infrastructures. A network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Further, those of skill in the art will recognize that one or more of the specific details may be omitted, or other methods, components, or materials may be used. In some cases, operations are not shown or described in detail. Thus, the following detailed description of the embodiments of the systems and methods of the disclosure is not intended to limit the scope of the disclosure, as claimed, but is merely representative of possible embodiments.

FIG. 1 illustrates a UAV-based solar evaluation system 100. The UAV solar evaluation system 100 may include a processor 130, memory 140, a network interface 150, and a graphics processing unit 155 connected via a bus 120 to various subsystems 180-199 of a UAV and/or associated computing systems 170. Examples of the various subsystems 180-199 may include any number of systems, subsystems, and modules to implement the methods and techniques described herein. Examples of such subsystems are illustrated, including an imaging subsystem 180 with an electronic hardware camera, obstruction identification subsystem 182, irradiance calculation subsystem 184, slope calculation subsystem 186, future obstruction estimation subsystem 188, tree variety identification subsystem 190, graphical user interface generation subsystem 192, three-dimensional modeling subsystem 193, ray-path modeling subsystem 194, solar panel placement subsystem 196, divergent beam ray-path shape selection subsystem 198, and analemma resolution subsystem 199.

The ray-path modeling subsystem 194 may utilize captured images to generate or render a three-dimensional model that includes the structure, obstacles on the structure, and/or obstacles proximate to the structure. The level of detail, the accuracy of the scan, and the newness (e.g., a recent scan as opposed to old, outdated satellite images) of the scan all contribute to more accurate solar irradiance calculations.

In various embodiments, the ray-path modeling subsystem 194 may identify and conceptually divide the roof surfaces into a plurality of polygons. Each polygon may be approximated as a planar surface, the normal to which represents the ideal angle from which to receive solar radiation. National services and databases can be used to look up the maximum solar irradiation possible for a given geolocation (e.g., based on the longitude and latitude of the structure). Additionally, or alternatively, a maximum possible solar irradiation level may be measured at the location. Similarly, publicly available databases and calculators may be used to model the relative location of the sun at any given time, past or future.

The ray-path modeling subsystem 194 may model ray paths between each polygon on the roof and the modeled location of the sun. The ray-path modeling subsystem 194 may determine an angle between the normal to each polygon on the roof and the ray between the polygon and the modeled location of the sun. In some embodiments, the ray-path modeling subsystem 194 may approximate or estimate the solar irradiance as zero for each polygon for which the ray path between the polygon and the modeled location of the sun is at an angle in excess of the glancing angle.

In various embodiments, the ray-path modeling subsystem 194 may model ray-path tracing for other objects in the space that may obstruct a ray path between the modeled location of the sun and a polygon on the roof, depending on the modeled location of the sun for a given day and time. The system may model the ray path between each polygon on the roof surface and the modeled location of the sun at different times of the day and for different days each week.

The ray-path modeling subsystem 194 may model the number of polygons on the roof of the surface and a corresponding number of modeled ray paths to achieve a target balance between accuracy and processing speed. Increasing the number of polygons or other locations used to model the roof surface(s) may increase the resolution and/or accuracy of the solar irradiance calculations but increase the complexity of the calculations.

The ray-path modeling subsystem 194 may calculate the solar irradiance associated with each polygon in time increments selected by the user or at default time increments. For example, solar irradiation values may be calculated every second of every day of every year. As another example, to reduce the computational load, the system may calculate the solar irradiation values of each polygon every fifteen minutes of one day each week for a year.

The ray-path modeling subsystem 194 calculates the decrease in solar irradiation based on ray paths being blocked by obstructions and/or at an angle to the normal of each respective polygon for the various time increments. For various modeled locations of the sun, the ray paths to some polygons may be blocked by obstacles proximate to the house (e.g., trees or other buildings) or by obstacles on the roof of the house (e.g., swamp coolers, AC units, vent pipes, satellite dishes, other portions of the roof, etc.). Effectively, the ray paths that are blocked correspond to the shadows that would be present for different locations of the sun at various times of the day and various days during the year.

For instance, the ray-path modeling subsystem 194 may model the sun as being directly overhead at noon such that the ray paths are relatively unobstructed. However, at other times of the day, the ray-path modeling subsystem 194 may model the ray paths and identify ray paths blocked by, for example, vent pipes, other portions of the roof, or nearby trees. The ray-path modeling subsystem 194 may identify these blocked ray paths as shadows on the roof and at different times of the day. The modeled location of the sun may depend, at least in part, on the latitude of the structure, longitude of the structure, season, day of the year, time of day, etc.

The ray-path modeling subsystem 194 identifies ray paths between locations on the roof and the modeled location of the sun that are obstructed by an object at various time increments throughout a time period. The blocked ray paths correspond to shadows that will be cast on the locations of the roof at various times of day, always, and/or on various days of the year.

In the various embodiments, a UAV may capture images (optical or otherwise), and the UAV or a remote system may perform imaging processing and/or utilize computer vision techniques to identify planar sections of the roof, relative pitches thereof, objects on the roof, and/or objects and structures proximate the roof.

The ray-path modeling subsystem 194 may implement a polygonal modeling of the roof surface to facilitate dividing the roof surface into a discrete set of locations and facilitate the identification of a normal from each polygon surface corresponding to the ideal ray path for optimum solar irradiance. For example, the ray-path modeling subsystem 194 may conceptually divide the roof surface into a plurality of triangles, squares, hexagons, rectangles, or another polygonal shape.

In some embodiments, the ray-path modeling subsystem 194 may calculate the normal to the surface of the roof for a plurality of locations on the surface of the roof without necessarily dividing the roof into a plurality of polygons. For example, the thousands of points on the surface of the roof may be identified, and the solar irradiance ray-path tracing to various modeled locations of the sun at various time increments during a time period may be mapped. The solar irradiance to each location on the roof may be modeled based on the presence of an obstruction (i.e., blocking the ray path) and the angle of the ray path relative to the normal of the surface underlying each respective location.

In various embodiments, the graphical user interface generation subsystem 192 may use the data from the ray-path modeling subsystem 194 to display a heatmap that uses various shades of gray or different colors (e.g., blackbody temperature modeling) to illustrate the relative impact or effect of various obstacles and obstructions. White or red may be used to show unshaded portions of the roof. Darker gray shading or darker shades of blue may be used to show the impact or effect of shadows (ray-blocking objects) on the roof that have a significant or relatively higher light-blocking effect over a period of time. Lighter gray shading or various shades of red may be used to show the impact or effect of shadows cast by obstacles that have less of an overall light-blocking effect over a period of time.

The graphical user interface generation subsystem 192 may present a graphical user interface with slider or selection icons that allow a user to view the solar irradiation heatmap on the roof of a structure at various times during a multi-year time period. As the user moves, for example, the slider, to transition the image from a first day in a starting year to another day in a future year, the graphical user interface may augment the three-dimensional model to show tree growth, building construction, weather conditions (e.g., sunny days, cloudy days, snow, rain, etc.). The granularity of the slider or another selection icon in the graphical user interface may allow for average solar irradiance values to be displayed as a heatmap averaged over a period of minutes, hours, days, weeks, months, or years.

For instance, a slider with hourly granularity may allow the user to visualize an hour-by-hour change in solar irradiance as a heatmap on the surface of a roof every hour for any number of days, months, or years. Similarly, a selection element with daily or weekly granularity allows a user to visualize a daily or weekly change in solar irradiance as a heatmap on the surface of the roof during an extended time period.

In some embodiments, the graphical user interface may allow the user to visualize the snow on the roof. Average annual snowfalls, temperatures, and other weather information may be used to modify the three-dimensional model to show the effect of the snow on the heatmap. In other embodiments, as a user navigates through the hours, days, or weeks of a wintertime period, the graphical user interface may display snow on the roof of the structure for a number of days corresponding to the average weather patterns for the location of the structure.

The solar panel placement subsystem 196 may model the placement of solar panels on the roof based on the solar irradiance calculations. The divergent beam ray-path shape selection subsystem 198 may select a ray-path modeling using line segments, as described herein. In other embodiments, the divergent beam ray-path shape selection subsystem 198 (e.g., part of a divergent beam ray-path modeling subsystem) may cause the system to use cones and/or pyramids instead of line segments. The conical or pyramidal ray paths may be used to reduce the likelihood of object occlusion when sparse sampling is employed. The analemma resolution subsystem 199 allows for an automatic system selection or customized user selection of a modeling resolution for the solar ray-path modeling. Lower resolution solar ray-path modeling can be accomplished in less time and/or with fewer computing resources than relatively higher resolution solar ray-path modeling.

The analemma resolution subsystem 199 may allow for the selection of the number of analemmas to be used (corresponding to the number of samples taken each day) and the number of points in each analemma (corresponding to the number of sample days in a given time period). For time periods corresponding to a full year, the analemma may have a complete shape similar to that of a figure-eight. For partial year time periods, the analemma may be cut off or have a gap.

Figure 2:
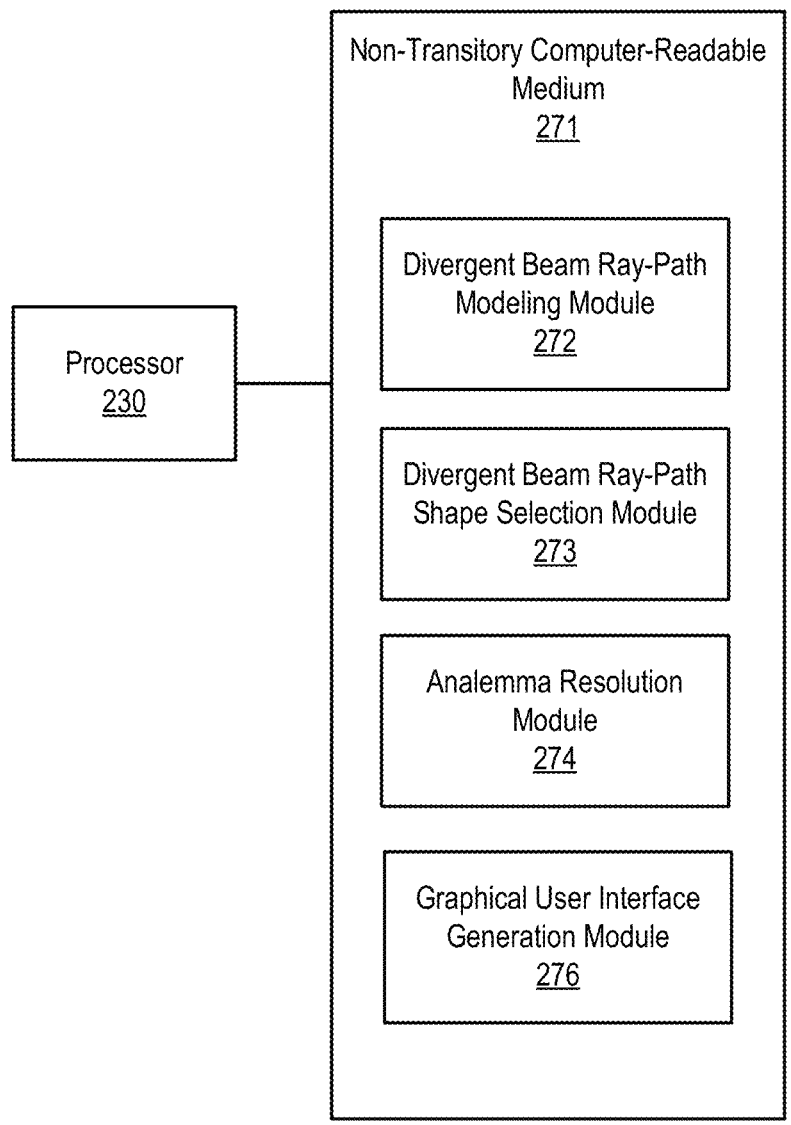
FIG. 2 illustrates a non-transitory computer-readable medium for ray-path modeling, according to one embodiment.

FIG. 2 illustrates a non-transitory computer-readable medium 271 for ray-path modeling, according to one embodiment. As illustrated, the non-transitory computer-readable medium 271 may be in communication with a processor 230 to execute instructions. The non-transitory computer-readable medium 271 includes instructions for a divergent beam ray-path modeling module 272, a divergent beam ray-path shape selection module 273, and an analemma resolution module 274. The divergent beam ray-path modeling module 272 may facilitate the modeling of a divergent beam ray path between each of a plurality of locations on the roof and modeled locations of the sun relative to the roof at each of a plurality of discrete times during a time period.

The divergent beam ray-path shape selection module 273 may determine whether the divergent beam ray paths are modeled as cones or pyramids. The analemma resolution module 274 may determine the daily sampling interval, the number of sampling days, and/or the total time period for sampling during which the divergent beam ray paths are modeled from each location on the roof to the modeled location of the sun at a given sample time.

A graphical user interface generation module 276 renders a graphical user interface for display on an electronic display panel (e.g., a monitor of a computer, a mobile computing device, a tablet computing device, a mobile telephone, a television, or the like). The rendered graphical user interface may include any of a wide variety of selection icons, drop-down menus, radio buttons, freeform text entry blocks, scripting code entry blocks, navigation controls, informational panels, three-dimensional model display window(s), export options, and the like, as described herein.

Figure 3:
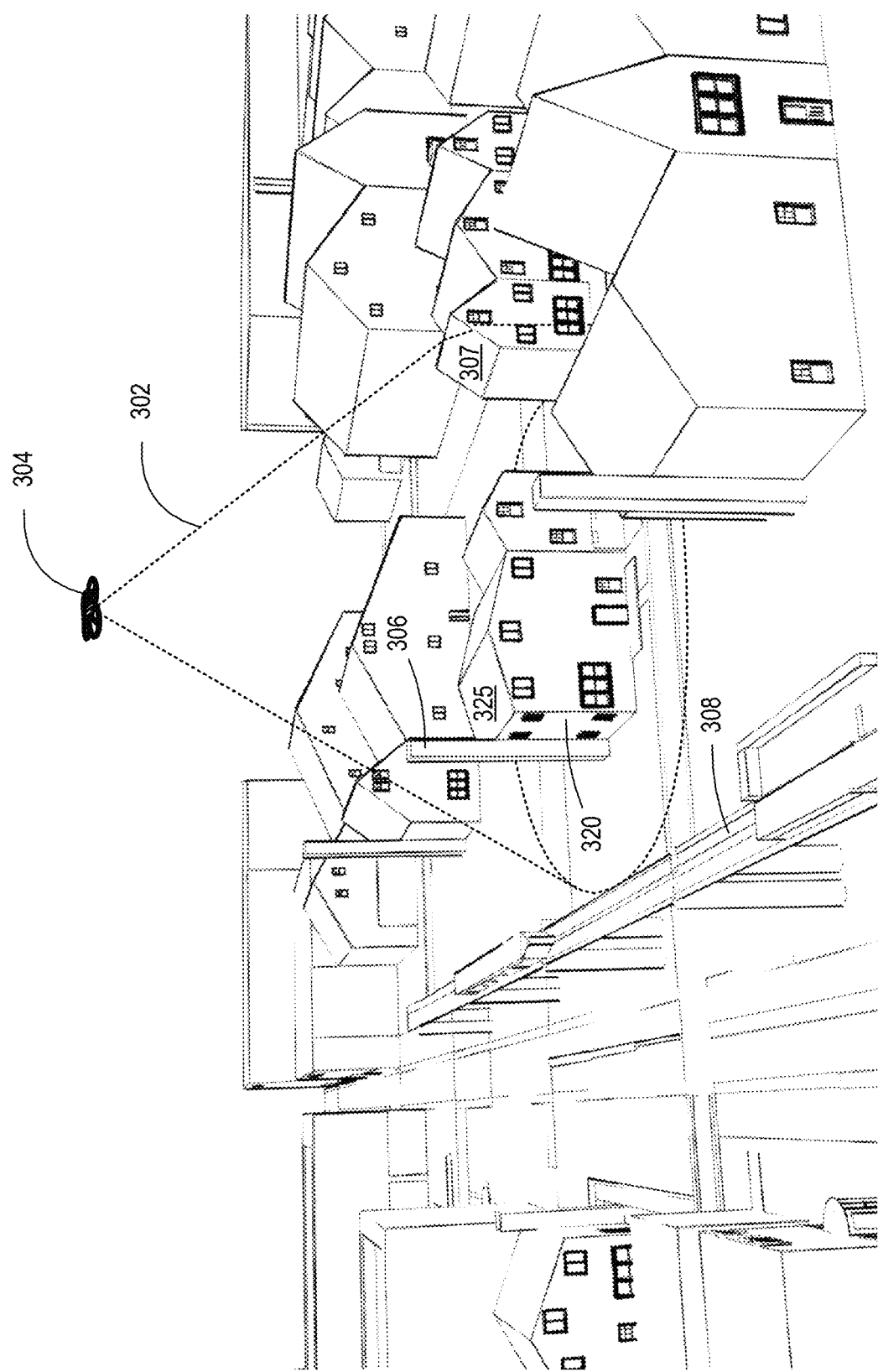
FIG. 3 illustrates an example of a UAV capturing a nadir scan of a structure.

FIG. 3 illustrates UAV 304 capturing a nadir image 302 of the subject property. The nadir image 302 may include the roof 325 of house 320 as well as obstructions on or caused by the neighboring property 307. Nadir image 302 may also capture other obstacles such as chimney 306 and wall 308. Nadir image 302 may identify obstacles on a neighboring property 307, such as buildings, trees, chimneys, and/or other structures that may interfere with the solar exposure received at roof 325. Nadir image 302 may be used to identify locations of future or potential obstructions and may transmit and/or record these areas for further study. In some embodiments, the solar exposure system may locate or retrieve pertinent information such as the zoning of vacant lots and/or construction plans.

The nadir image 302 may be captured with the camera pointing straight down such that the optical axis of the camera is normal to the gravitational pull of the earth, or the earth itself if the lot is relatively flat. The UAV 304 may capture additional surrounding-area images from the same location by positioning the optical axis of the camera at a different angle and rotating the UAV 304 360 degrees.

Figure 4:
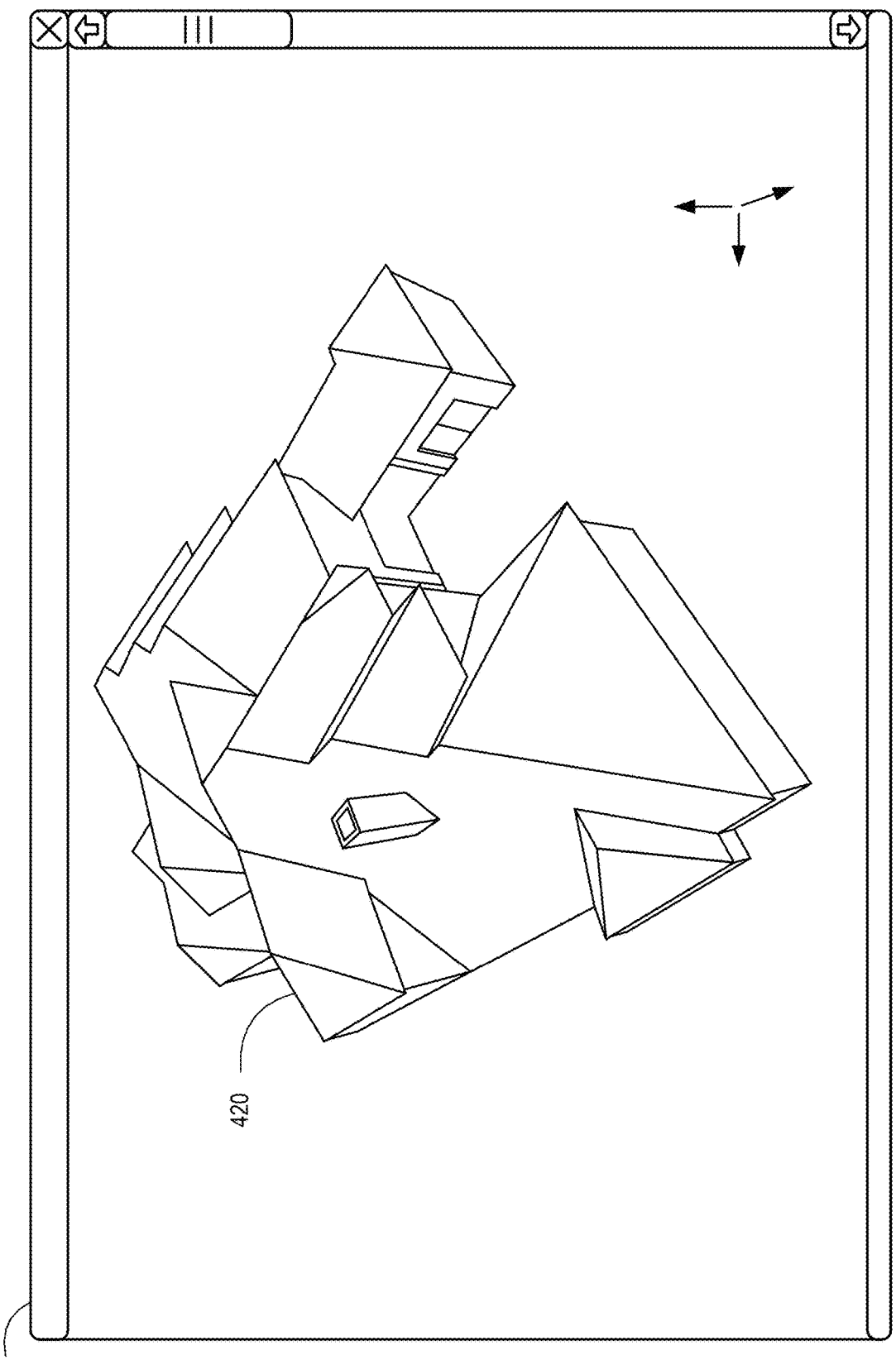
FIG. 4 illustrates a graphical user interface rendering a three-dimensional model of a house, according to one embodiment.

FIG. 4 illustrates a graphical user interface 450 rendering a three-dimensional model 420 of a house (e.g., the house 320 in FIG. 3). The three-dimensional model 420 is based on images captured by a UAV, another aerial vehicle, satellite images, terrestrial-based image capture devices, or a combination thereof. In some embodiments, the three-dimensional model 420 of the house (or a portion of the house, such as the rooftop of the house) may be provided by a third-party system or entity instead of being rendered using captured images.

Figure 5:
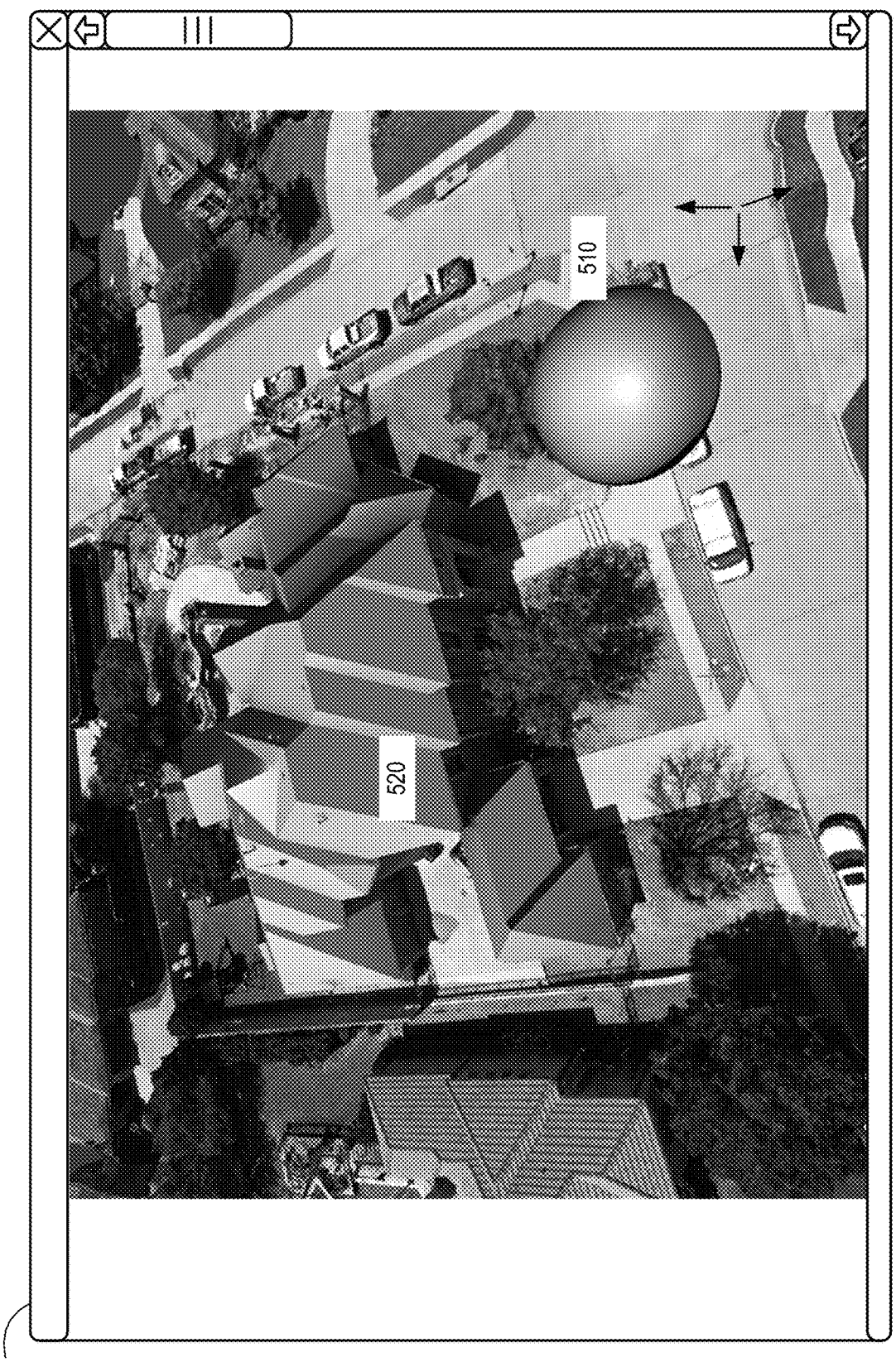
FIG. 5 illustrates a graphical user interface with a top view of the three-dimensional model of the house with a multi-faceted sphere for modeling solar irradiance, according to one embodiment.

FIG. 5 illustrates a graphical user interface 550 with a top view of the three-dimensional model of the house 520 with a multi-faceted sphere 510 for modeling solar irradiance. The sphere 510 includes polygonal facets that each have a normal at a different angle relative to the modeled location of the sun. The brightest white location is the only location at which the angle of incidence of the sun is parallel to the normal of the polygonal facet. Ray paths from all other facets to the modeled location of the sun are at an angle relative to the normal of the polygonal facet and, therefore, do not receive a maximum solar irradiance value. Edges of the sphere may have ray paths at angles in excess of the glancing angle and therefore be modeled as receiving little or no solar irradiance.

Each location on the surface of the roof of the house 520 may be mapped to one of the polygonal facets on the sphere. Absent any obstructions, each location on a given planar surface will have the same solar irradiance values for a given time period.

Figure 6:
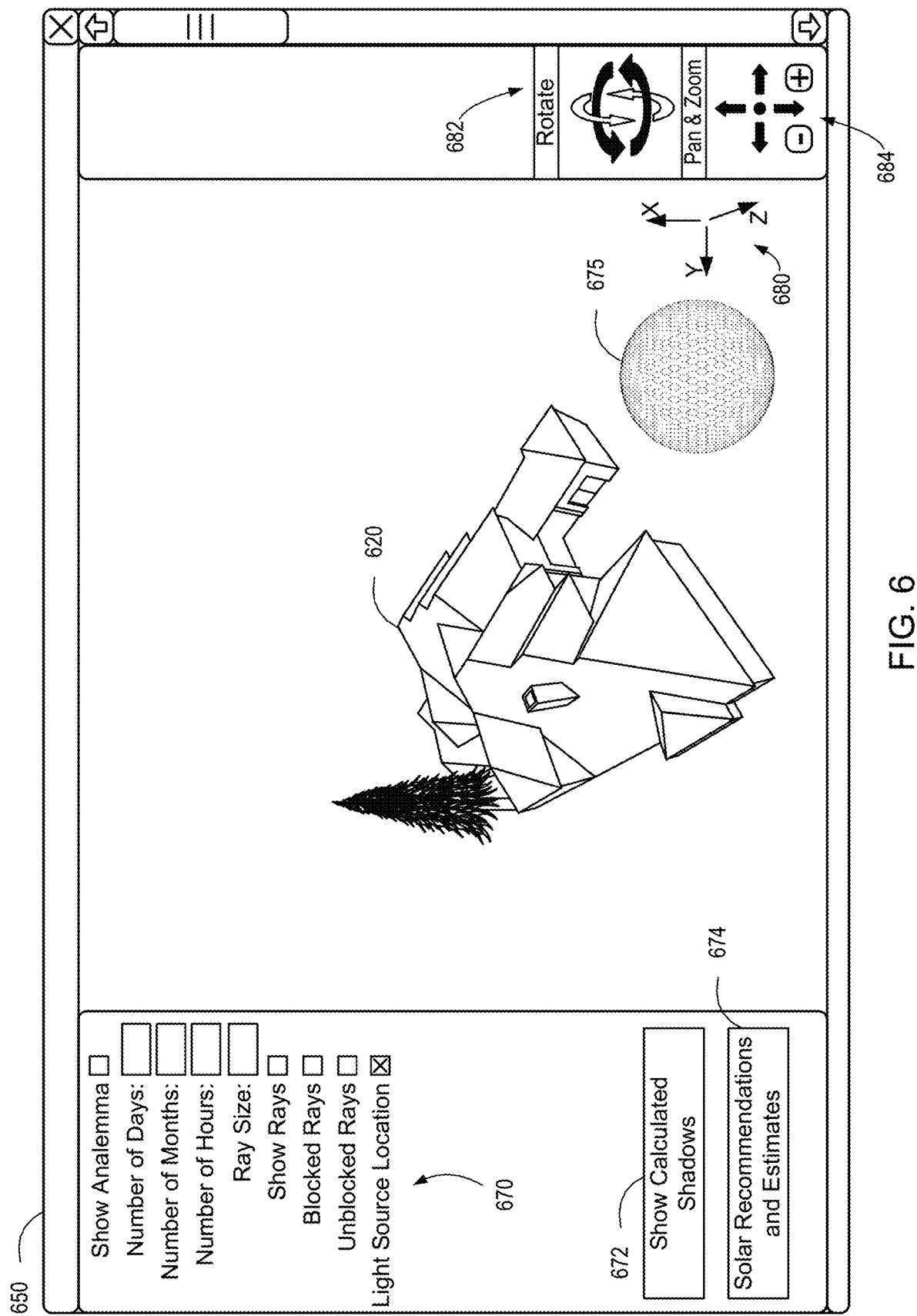
FIG. 6 illustrates a graphical user interface for visualizing the solar ray mapping of the structure with a displayed light source location, according to one embodiment.

FIG. 6 illustrates a graphical user interface 650 for visualizing the solar ray mapping of the structure 620 with a displayed light source location 675, according to one embodiment. In the illustrated example, the graphical user interface 650 includes filter options 670 to selectively show or hide various informational elements and to enter display specifications. The graphical user interface 650 allows a user to select the number of days for solar ray mapping, the number of months for solar ray mapping, and the number of hours (or time interval) for solar ray mapping. In some embodiments, the graphical user interface 650 allows the user to select between linear (segment) ray mapping, conical divergent beam ray mapping, pyramidal divergent beam ray mapping, or the like.

In some embodiments, the graphical user interface 650 may also allow the user to dynamically modify the rate of divergence or angle of divergence of divergent beam ray paths. The graphical user interface 650 may also allow the user to selectively visualize some or all the rays, rays mapped to a single location, rays mapped to a plurality of locations, or rays mapped to all locations. The graphical user interface 650 may also allow the user to selectively visualize only those rays that are blocked or partially blocked or only those rays that are unobstructed.

As illustrated, the graphical user interface 650 includes navigation controls as part of a navigation control interface 682 and 684 for rotating, panning, zooming, resetting, and/or otherwise modifying the visualization perspective of the structure, analemmas, obstacles, and mapped rays. The graphical user interface 650 includes coordinate markings 680 to help the user identify the current orientation of the displayed structure 620. The graphical user interface 650 also includes buttons or links to show calculated shadows 672 (e.g., by overlaying a heatmap) and to provide solar recommendations and estimates 674.

Figure 7A:
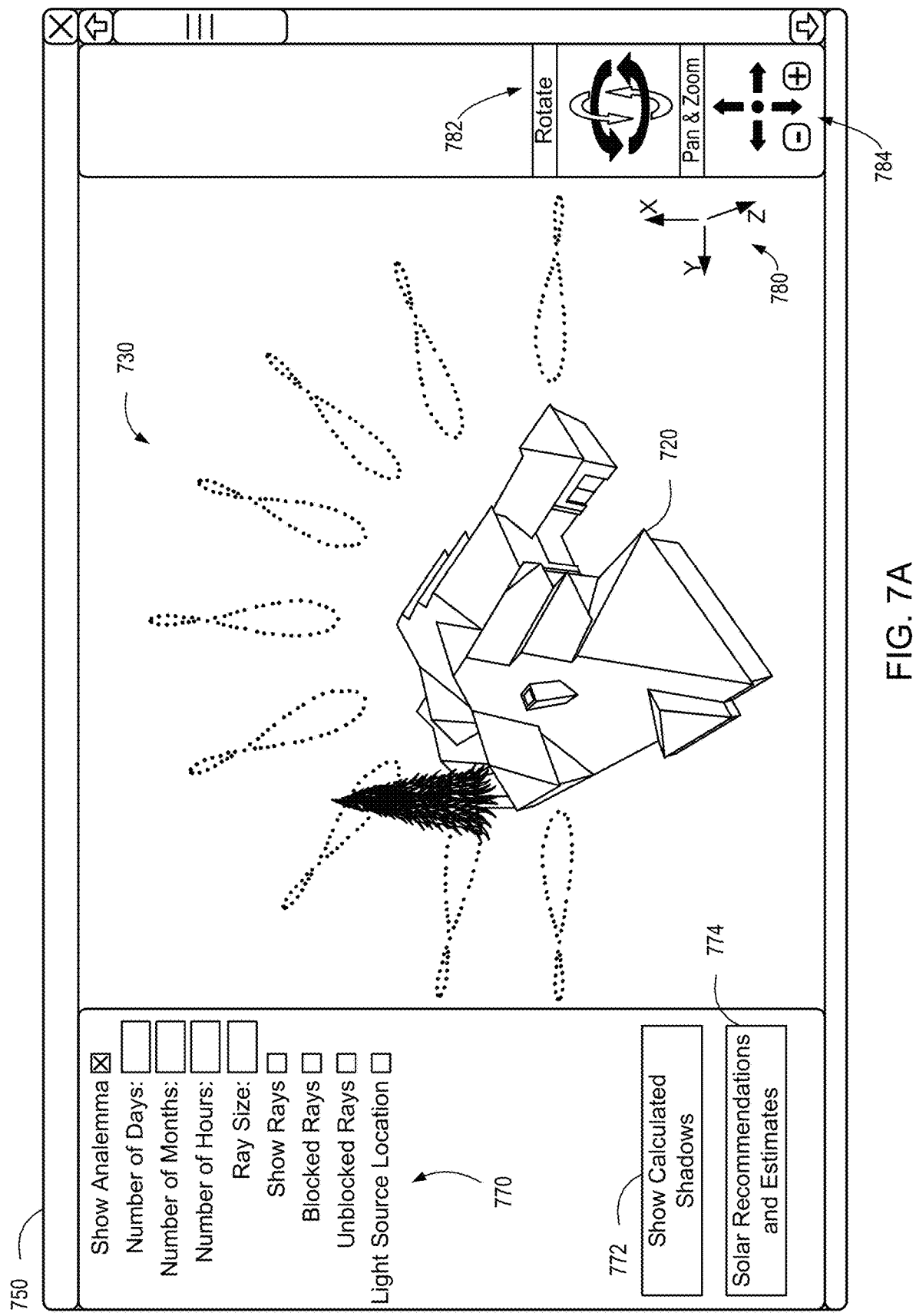
FIG. 7A illustrates a graphical user interface for visualizing the solar ray mapping of the structure with analemmas selected for display, according to one embodiment.

FIG. 7A illustrates a graphical user interface 750 for visualizing the solar ray mapping of the structure 720 with analemmas 730 selected for display within the filter options menu 770, according to one embodiment. As illustrated, the graphical user interface 750 includes various filter options within the filter options menu 770 to selectively show or hide the analemmas 730 (e.g., using drop-down menus, toggle elements, free-entry text fields, numerical fields, radio buttons, etc.). The graphical user interface 750 allows a user to select the number of days for solar ray mapping, the number of months for solar ray mapping, and the number of hours (or time interval) for solar ray mapping. In some embodiments, the graphical user interface 750 also allows the user to select between linear (segment) ray mapping, conical divergent beam ray mapping, pyramidal divergent beam ray mapping, or the like.

In some embodiments, the graphical user interface 750 allows the user to dynamically modify the rate of divergence or angle of divergence of divergent beam ray paths. The graphical user interface 750 may also allow the user to selectively visualize some or all the rays, rays mapped to a single location, rays mapped to a plurality of locations, or rays mapped to all locations. The graphical user interface 750 may also allow the user to selectively visualize only those rays that are blocked or partially blocked or only those rays that are unobstructed.

As illustrated, the graphical user interface 750 includes navigation controls 782 and 784 for rotating, panning, zooming, resetting, and/or otherwise modifying the visualization perspective of the structure, analemmas, obstacles, and mapped rays. The graphical user interface 750 includes coordinate markings 780 to help the user identify the current orientation of the displayed structure 720. The graphical user interface 750 also includes buttons or links to show calculated shadows 772 (e.g., by overlaying a heatmap) and to provide solar recommendations and estimates 774.

Figure 7B:
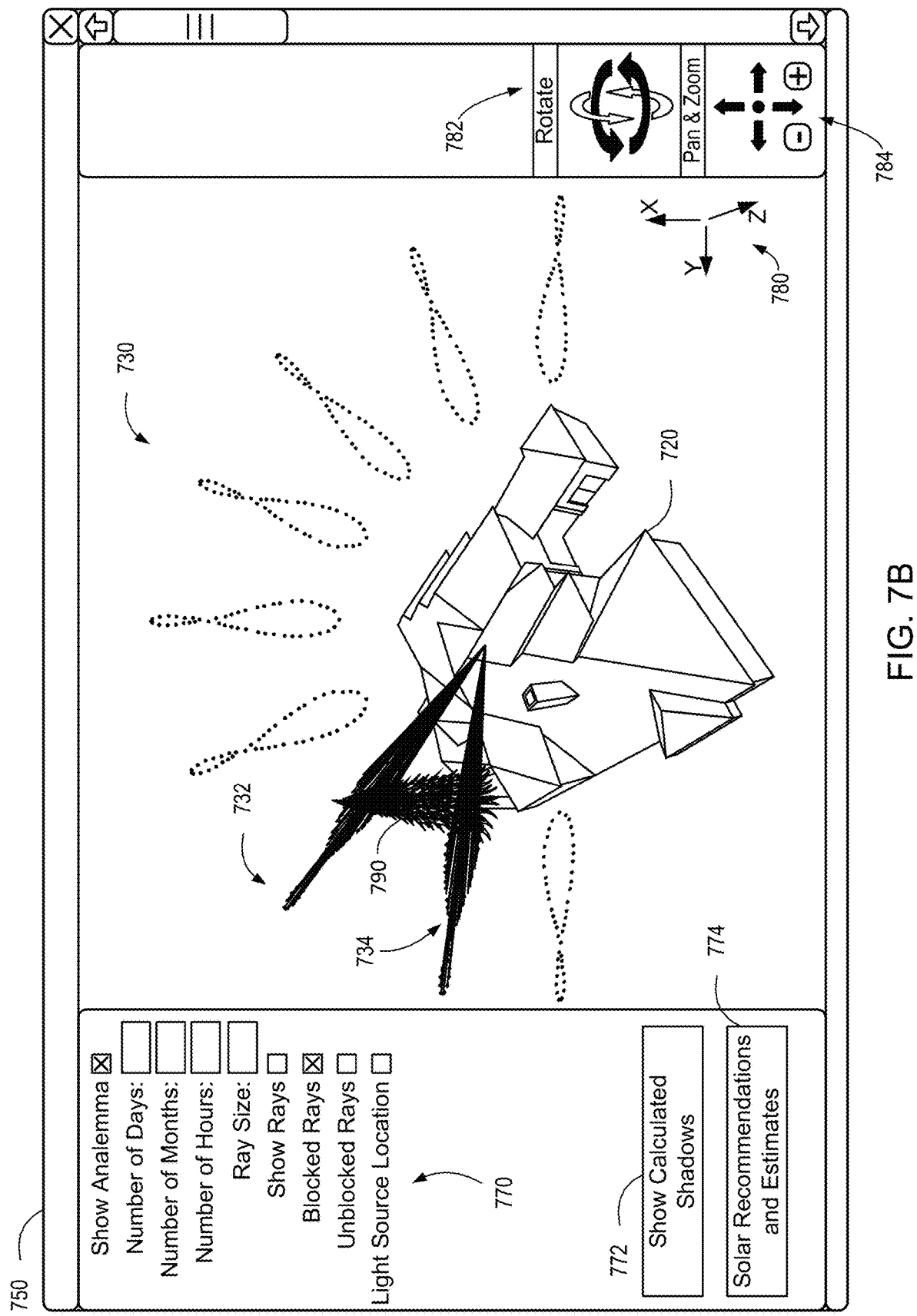
FIG. 7B illustrates the graphical user interface for visualizing the solar ray mapping of the structure with analemmas and blocked rays selected for display, according to one embodiment.

FIG. 7B illustrates the graphical user interface 750 for visualizing the solar ray mapping of the structure 720 with show analemma and blocked rays selected for display within the filter options menu 770, according to one embodiment. Based on the user selection, the displayed three-dimensional model of the structure 720 includes the analemmas 730 and the blocked solar rays 732 and 734 that are blocked by the tree 790.

Figure 7C:
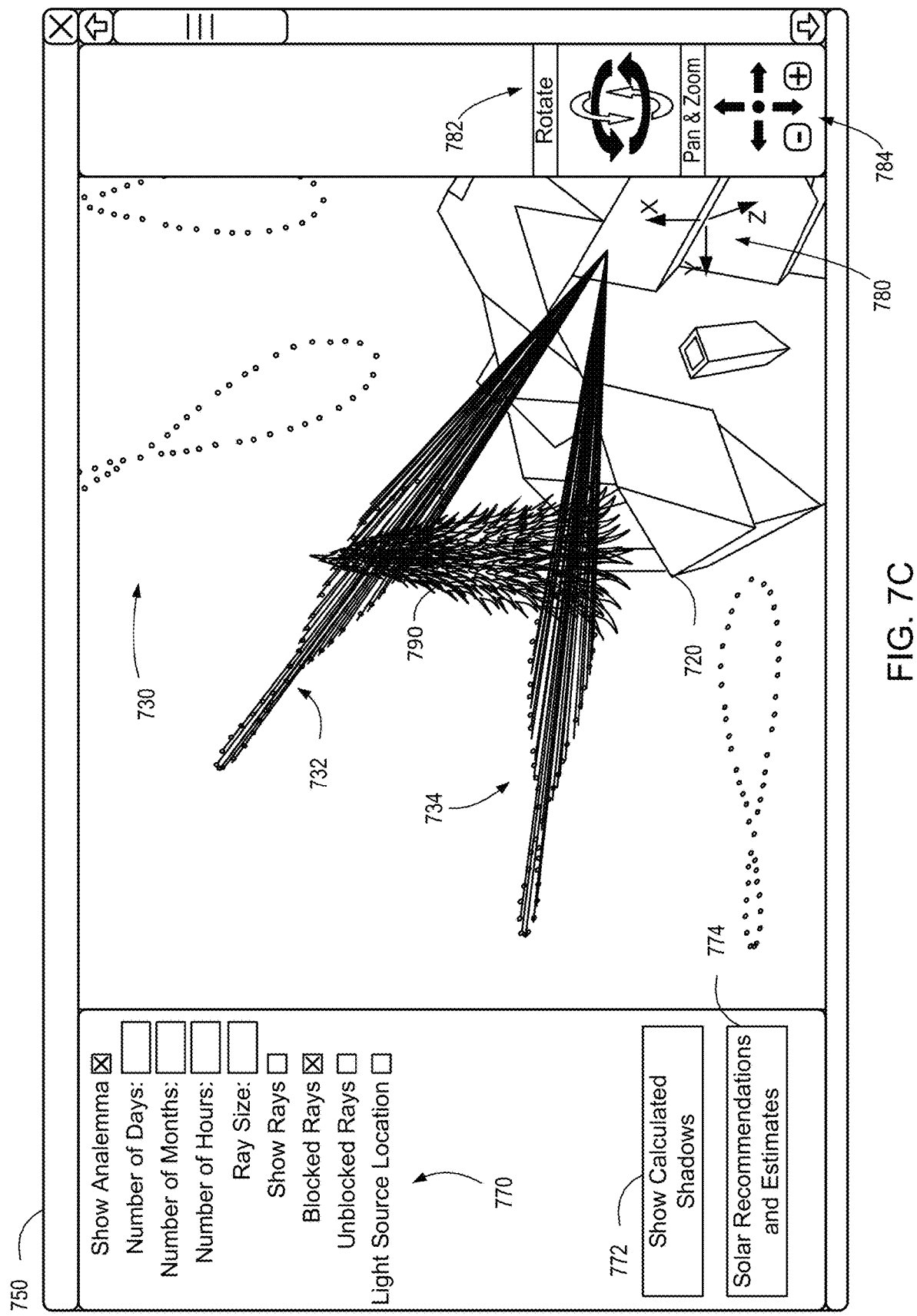
FIG. 7C illustrates the graphical user interface for visualizing the solar ray mapping of the structure zoomed in on the blocked rays selected for display, according to one embodiment.

FIG. 7C illustrates another example of the graphical user interface 750 for visualizing the solar ray mapping. In the illustrated example, the user has utilized the pan and zoom features of the navigation controls 784 to zoom in on the blocked solar rays 732 and 734 blocked by the tree 790.

Figure 7D:
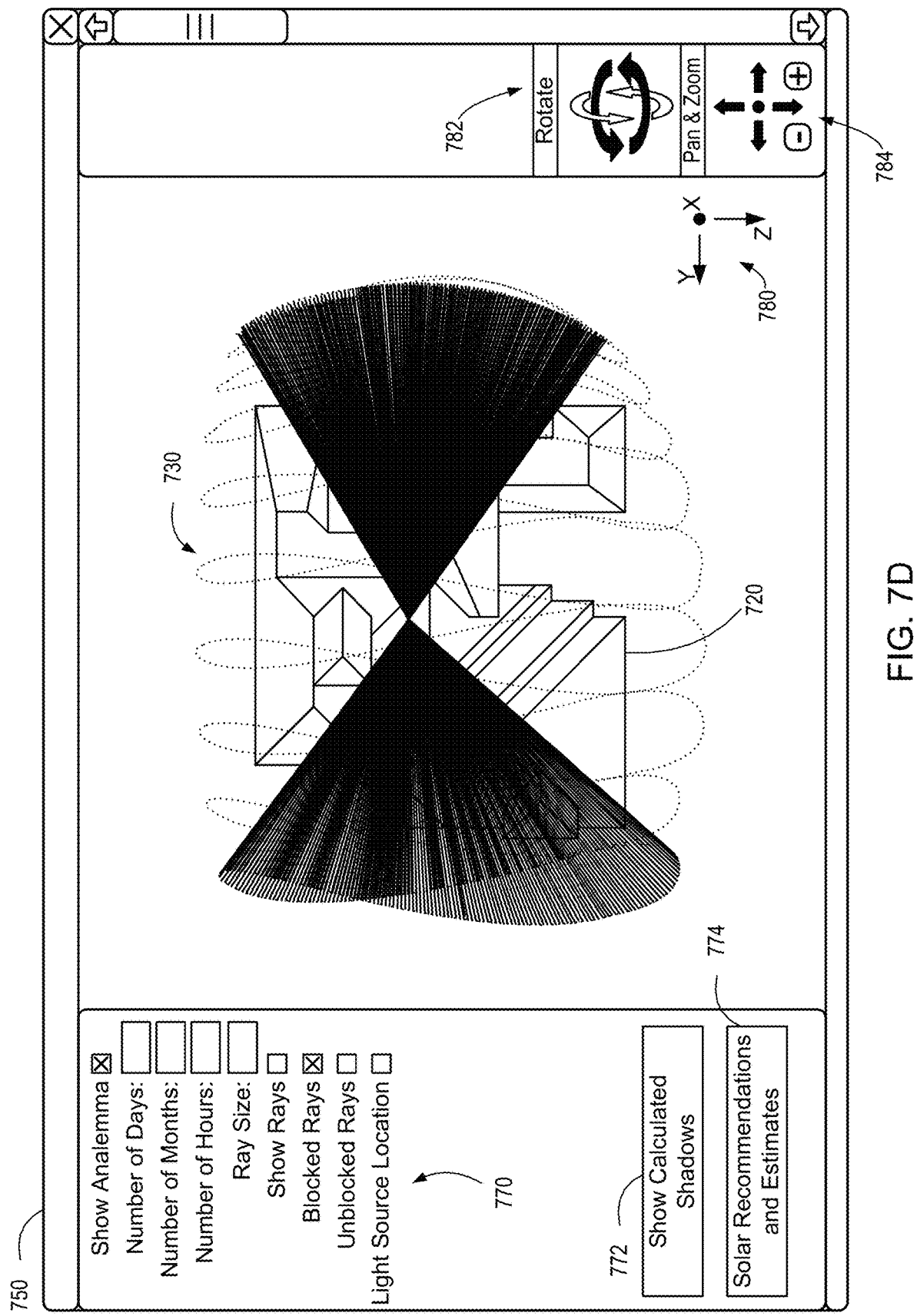
FIG. 7D illustrates the graphical user interface for visualizing obstructed solar rays mapped to analemmas from nadir perspective, according to one embodiment.

FIG. 7D illustrates another example of the graphical user interface 750 with a top-down view of solar rays mapped to analemmas 730 from a nadir perspective, according to one embodiment. In the illustrated example, the user has utilized the rotate and pan features of the navigation controls 782 and 784. The user-selected view is identified by the orientation coordinate marker 780.

Figure 8A:
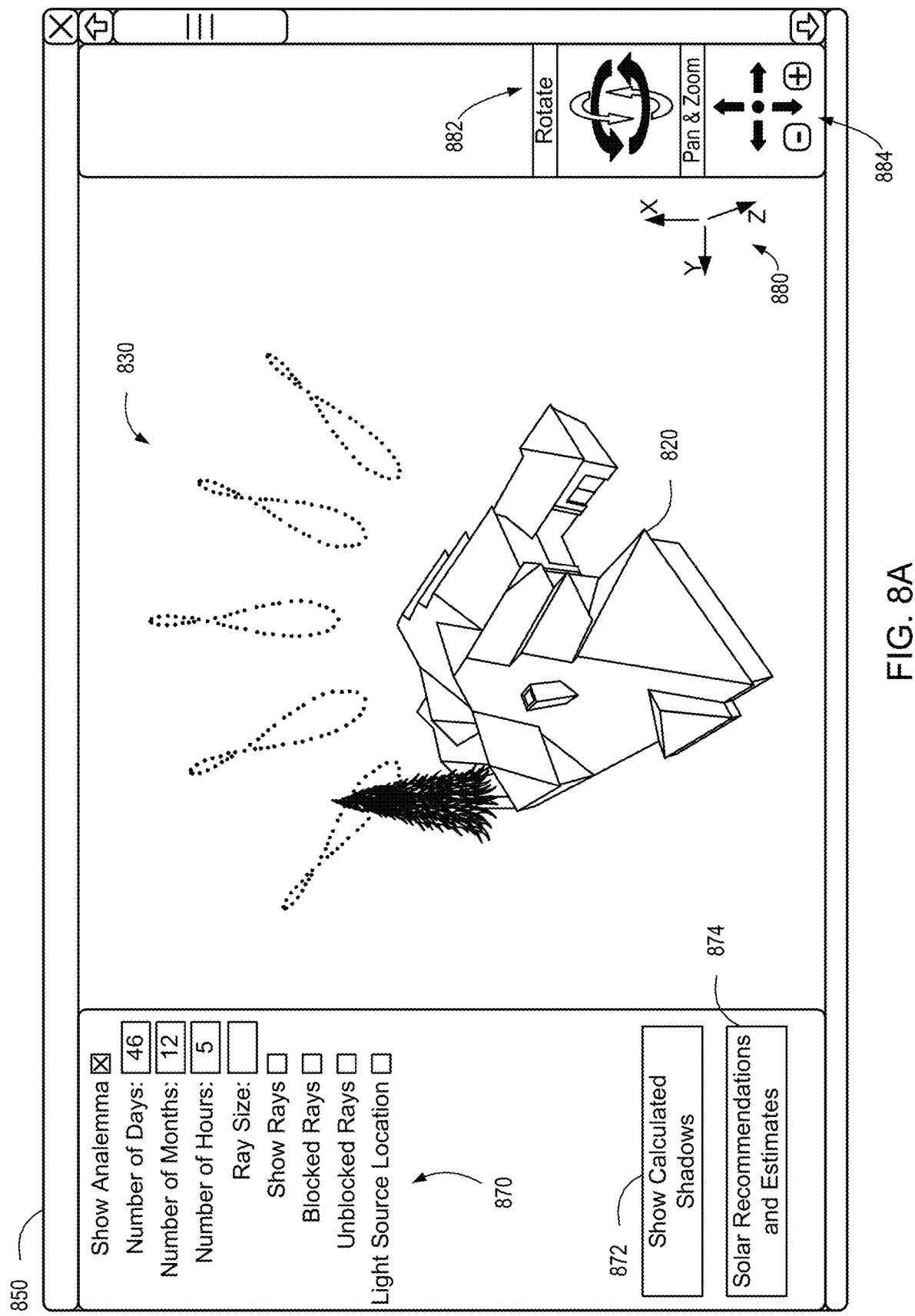
FIG. 8A illustrates a graphical user interface for visualizing analemmas based on a first user selection, according to one embodiment.

FIG. 8A illustrates a graphical user interface 850 for visualizing analemmas based on a user selection of days, months, and hours, according to one embodiment. In the illustrated example, the default or user inputs have been provided via the filter options menu to show the analemma based on calculations for 46 days, 12 months, and 5 hours. Accordingly, the displayed three-dimensional model of the structure 820 includes 5 displayed analemma 830 (corresponding to the selected number of hours), on 46 different days (the number of dots in each analemma) evenly distributed during a 12-month time period (corresponding to the selected number of months).

Similar to previously described embodiments, the graphical user interface 850 includes various filter options within the filter options menu 870 to selectively show or hide the analemmas 830. The graphical user interface 850 allows a user to select the number of days for solar ray mapping, the number of months for solar ray mapping, and the number of hours (or time interval) for solar ray mapping. In some embodiments, the graphical user interface 850 also allows the user to select between linear (segment) ray mapping, conical divergent beam ray mapping, pyramidal divergent beam ray mapping, or the like.

In some embodiments, the graphical user interface 850 allows the user to dynamically modify the rate of divergence or angle of divergence of divergent beam ray paths. The graphical user interface 850 may also allow the user to selectively visualize some or all the rays, rays mapped to a single location, rays mapped to a plurality of locations, or rays mapped to all locations. The graphical user interface 850 may also allow the user to selectively visualize only those rays that are blocked or partially blocked or only those rays that are unobstructed.

As illustrated, the graphical user interface 850 includes navigation controls 882 and 884 for rotating, panning, zooming, resetting, and/or otherwise modifying the visualization perspective of the structure, analemmas, obstacles, and mapped rays. The graphical user interface 850 includes coordinate markings 880 to help the user identify the current orientation of the displayed structure 820. The graphical user interface 850 also includes buttons or links to show calculated shadows 872 (e.g., by overlaying a heatmap) and to provide solar recommendations and estimates 874.

Figure 8B:
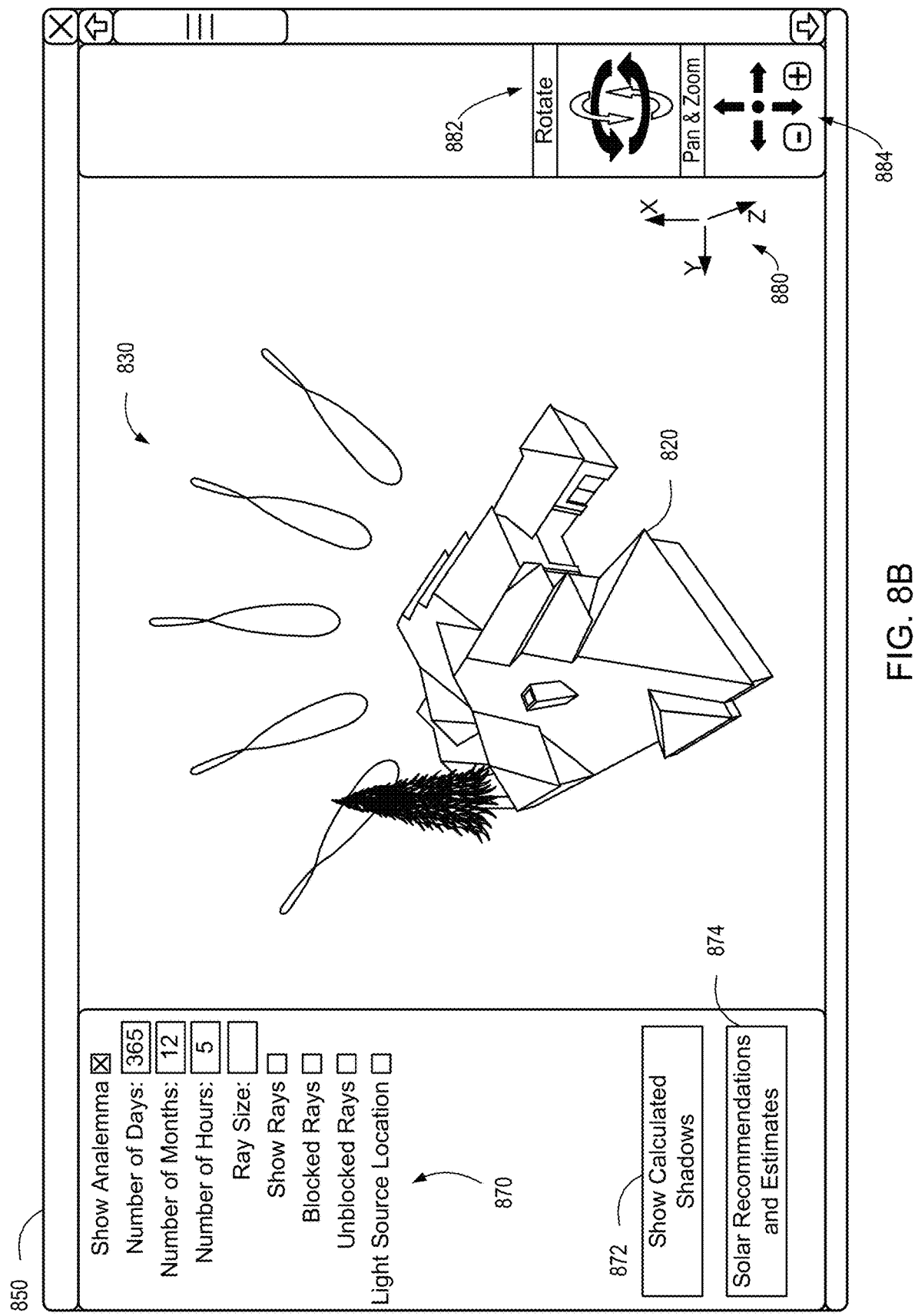
FIG. 8B illustrates the graphical user interface for visualizing analemmas based on a second user selection, according to one embodiment.

FIG. 8B illustrates another example of the graphical user interface 850 with a different user selection for the resolution of the solar ray mapping. In some embodiments, the user selection of the resolution for the solar ray mapping directly affects the calculations for the solar ray mapping on the structure 820. In other embodiments, the system performs the solar ray mapping with a default resolution (e.g., a higher resolution) and the user-selected resolution only affects the visual presentation of the analemmas, blocked solar rays, unblocked solar rays, heat map, etc. that are presented in the model window with the rendered three-dimensional model of the structure 820.

In the illustrated example, the user has selected a display of analemmas for 5 hours of the day with a resolution of 365 days during a complete 12-month solar cycle. The resulting five analemmas 830 appear as a continuous line since each analemma includes 365 "dots." In some embodiments, the system interprets the user selection of 5 hours to automatically be the 5 hours with the highest solar resolution. For example, the system may include analemmas for a particular structure 820 corresponding to the solar irradiance at 11 am, 12 pm, 1 pm, 2 pm, and 3 pm. In another example, the system may include the selected number of analemmas (number of hours) spaced equally between sunrise and sunset (e.g., between the latest possible sunrise and the earliest possible sunset during the selected months or number of months).

In some embodiments, the filer menu option may include additional options or an "advanced options" menu item that allows the user to specify the solar ray mapping with additional specificity and/or granularity. For example, the user may specify the exact time to display each of a plurality of analemmas, the exact months to include, specific time increments between the number of days, months, hours, and/or other display specificity selections.

Figure 8C:
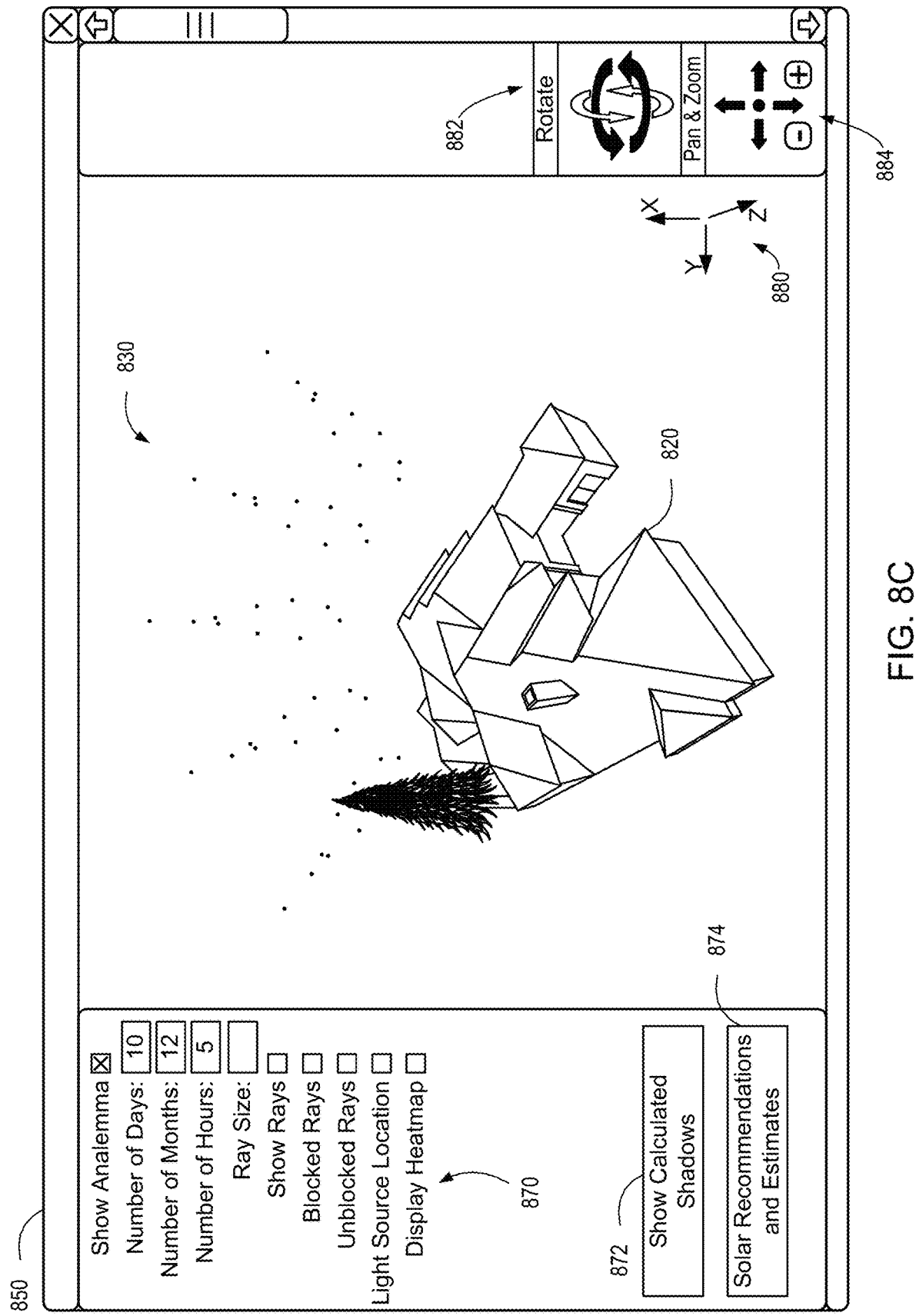
FIG. 8C illustrates the graphical user interface for visualizing analemmas based on a third user selection, according to one embodiment.

FIG. 8C illustrates another example of a graphical user interface 850 for visualizing analemmas with a user selection of 10 days for displaying the analemmas, according to one embodiment. The user selection includes the same 12-month time period for 5 hours each day. In the illustrated example, the analemma a rendered relatively sparse since only 10 days (or dots) are included in each analemma. The user may select a sparse rendering of the analemma (and optionally include the mapped solar rays, blocked solar ray, light source location, or even a heatmap on the surface of the roof of the structure 820 via the filter options menu 870) to avoid obscuring the rendered three-dimensional model of the structure 820.

Figure 8D:
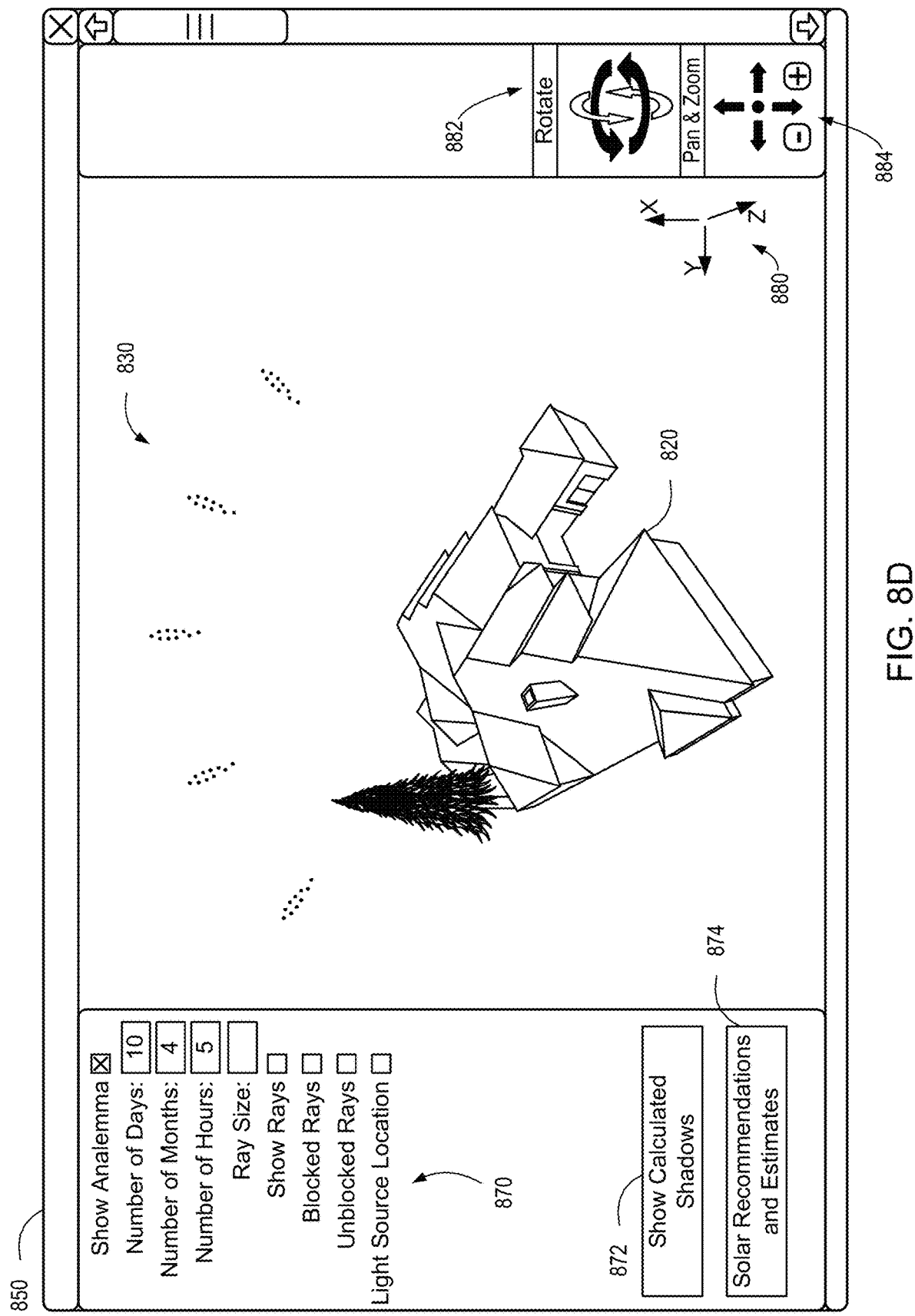
FIG. 8D illustrates the graphical user interface for visualizing analemmas based on a fourth user selection, according to one embodiment.

FIG. 8D illustrates another example of a graphical user interface 850 for visualizing analemmas based on a user selection of 10 days and 4 months, according to one embodiment. In the illustrated example, the sparse solar ray mapping only includes the summer months, when the solar radiation is the highest. Accordingly, the bottom portion of each of the analemmas 830 is missing since no days are mapped during the winter months. The summer months include mapped locations of the sun on 10 different days, as represented by the 10 dots forming the top half of each analemma 830.

Figure 8E:
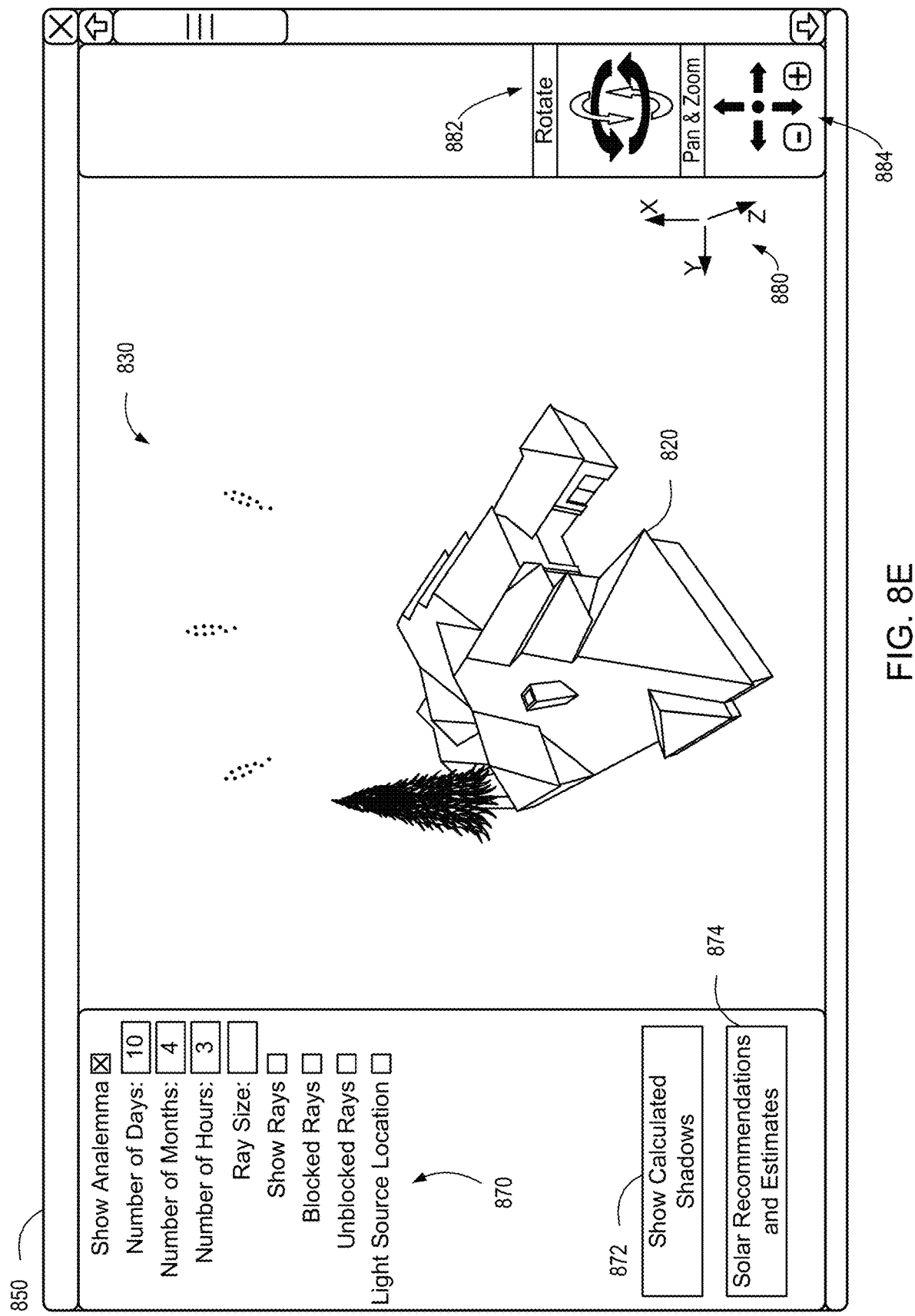
FIG. 8E illustrates the graphical user interface for visualizing analemmas based on a fifth user selection, according to one embodiment.

FIG. 8E illustrates another example of a graphical user interface for visualizing analemmas 830 based on a user selection of 10 days, 4 months, and 3 hours for displaying the analemmas, according to one embodiment. As illustrated, the graphical user interface 850 includes the top portion of each analemma 830 for 3 hours on 10 days of 4 summer months.

Figure 8F:
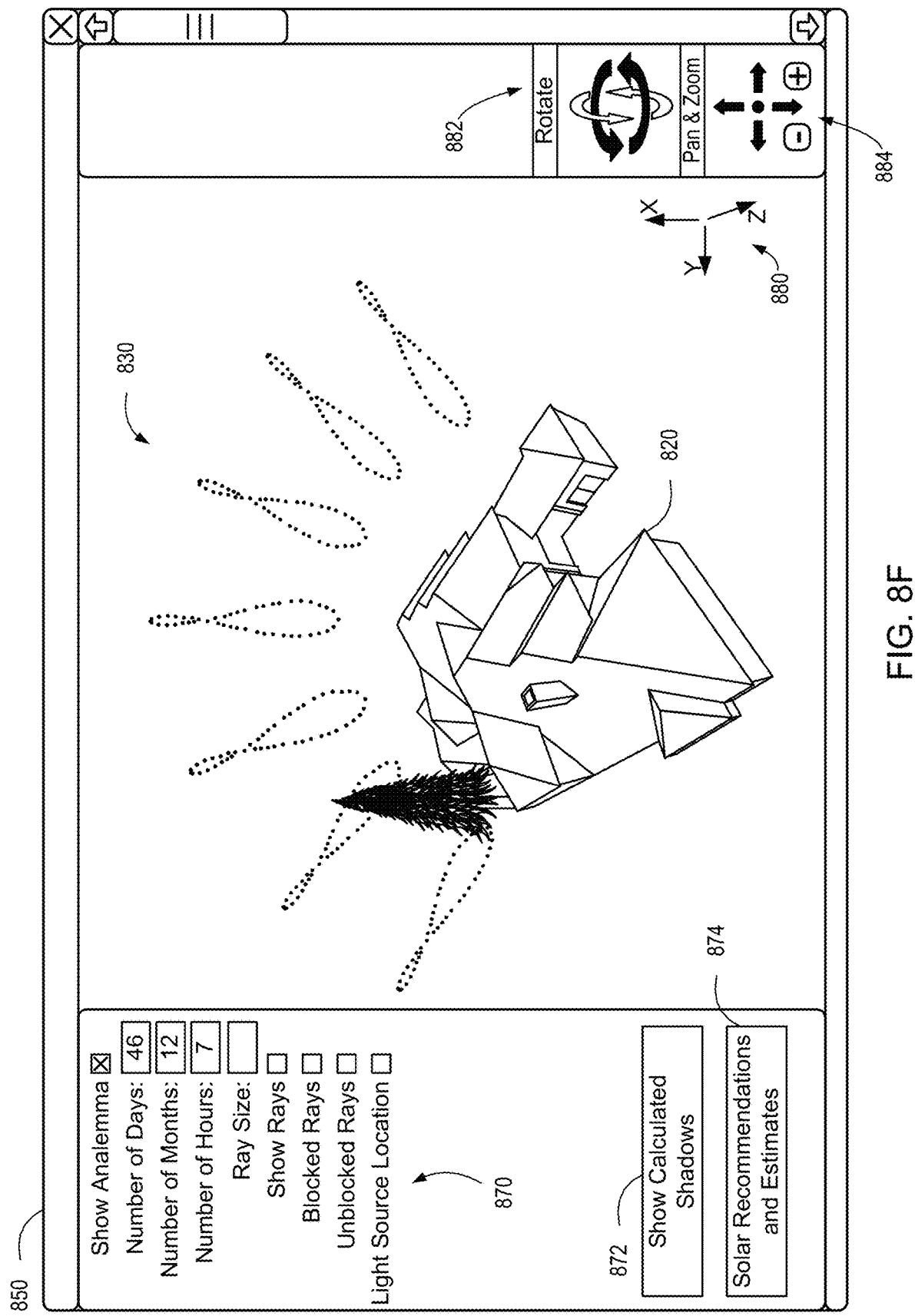
FIG. 8F illustrates the graphical user interface for visualizing analemmas based on a sixth user selection, according to one embodiment.

FIG. 8F illustrates another example of a graphical user interface with rendered analemmas 830 and a three-dimensional model of the structure 820 based on a user selection of 46 days, 12 months, and 7 hours, according to one embodiment.

Figure 9A:
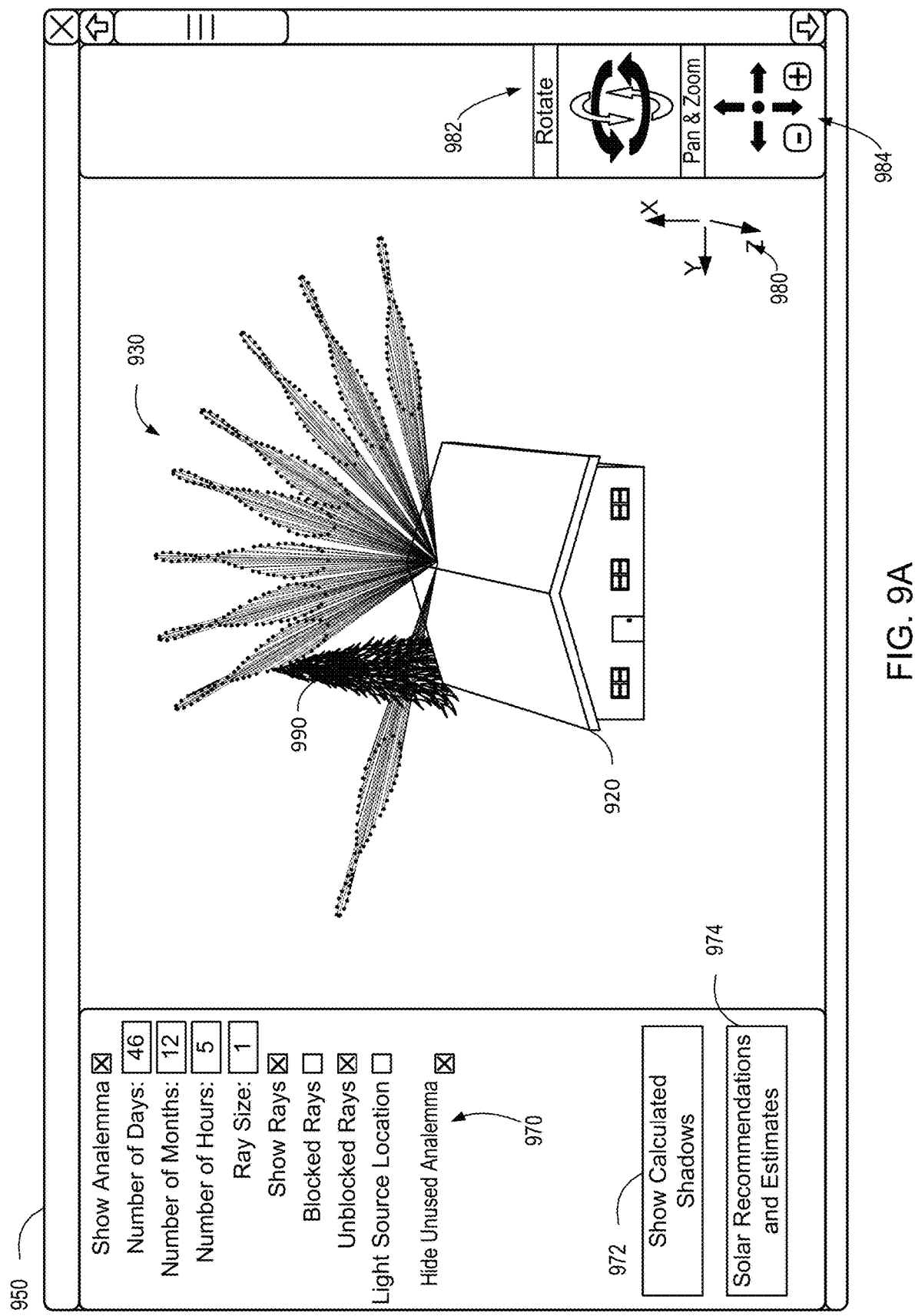
FIG. 9A illustrates the graphical user interface with a user selection that includes a display of solar rays mapped to points on analemmas that are not blocked by a tree, according to one embodiment.

FIG. 9A illustrates the graphical user interface 950 with a user selection made via the filter options menu 970. The user selection made via the graphical user interface 950 causes the system to render a three-dimensional model of a structure 920 and a nearby obstacle 990 (future obstacle or existing obstacle). The rendered display also includes analemma 930 based on a selection of 46 days, 12 months, and 5 hours. A ray size of "1" is also selected for the display of unblocked solar rays mapped from the analemma 930 to one or more locations on the structure 920.

Similar to other embodiments described herein, the graphical user interface 950 includes various filter options within the filter options menu 970 to selectively show or hide the analemmas 930. The graphical user interface 950 allows a user to select the number of days for solar ray mapping, the number of months for solar ray mapping, and the number of hours (or time interval) for solar ray mapping. In some embodiments, the graphical user interface 950 also allows the user to select between linear (segment) ray mapping, conical divergent beam ray mapping, pyramidal divergent beam ray mapping, or the like.

In some embodiments, the graphical user interface 950 allows the user to dynamically modify the rate of divergence or angle of divergence of divergent beam ray paths. The graphical user interface 950 may also allow the user to selectively visualize some or all the rays, rays mapped to a single location, rays mapped to a plurality of locations, or rays mapped to all locations. The graphical user interface 950 may also allow the user to selectively visualize only those rays that are blocked or partially blocked or only those rays that are unobstructed.

As illustrated, the graphical user interface 950 includes navigation controls 982 and 984 for rotating, panning, zooming, resetting, and/or otherwise modifying the visualization perspective of the structure, analemmas, obstacles, and mapped rays. The graphical user interface 950 includes coordinate markings 980 to help the user identify the current orientation of the displayed structure 920. The graphical user interface 950 also includes buttons or links to show calculated shadows 972 (e.g., by overlaying a heatmap) and to provide solar recommendations and estimates 974.

Figure 9B:
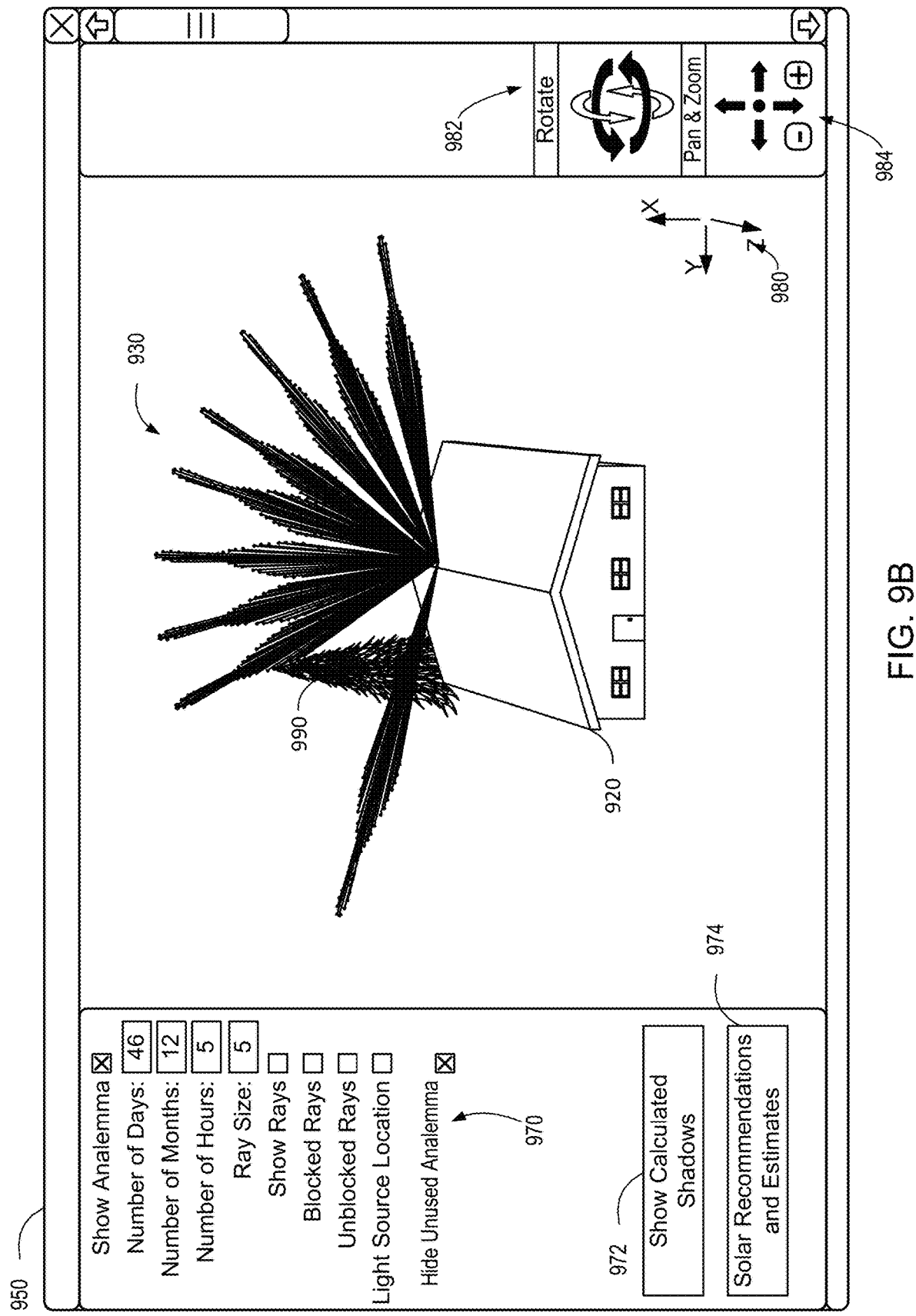
FIG. 9B illustrates the graphical user interface with the same user selection of FIG. 9A, but with an increased ray size, according to one embodiment.

FIG. 9B illustrates the graphical user interface with the same user selection of FIG. 9A, but with an increased ray size, according to one embodiment. As illustrated, the increased ray size of "5" results in thicker rays rendered between each of the analemma 930 and the structure 920.

Figure 9C:
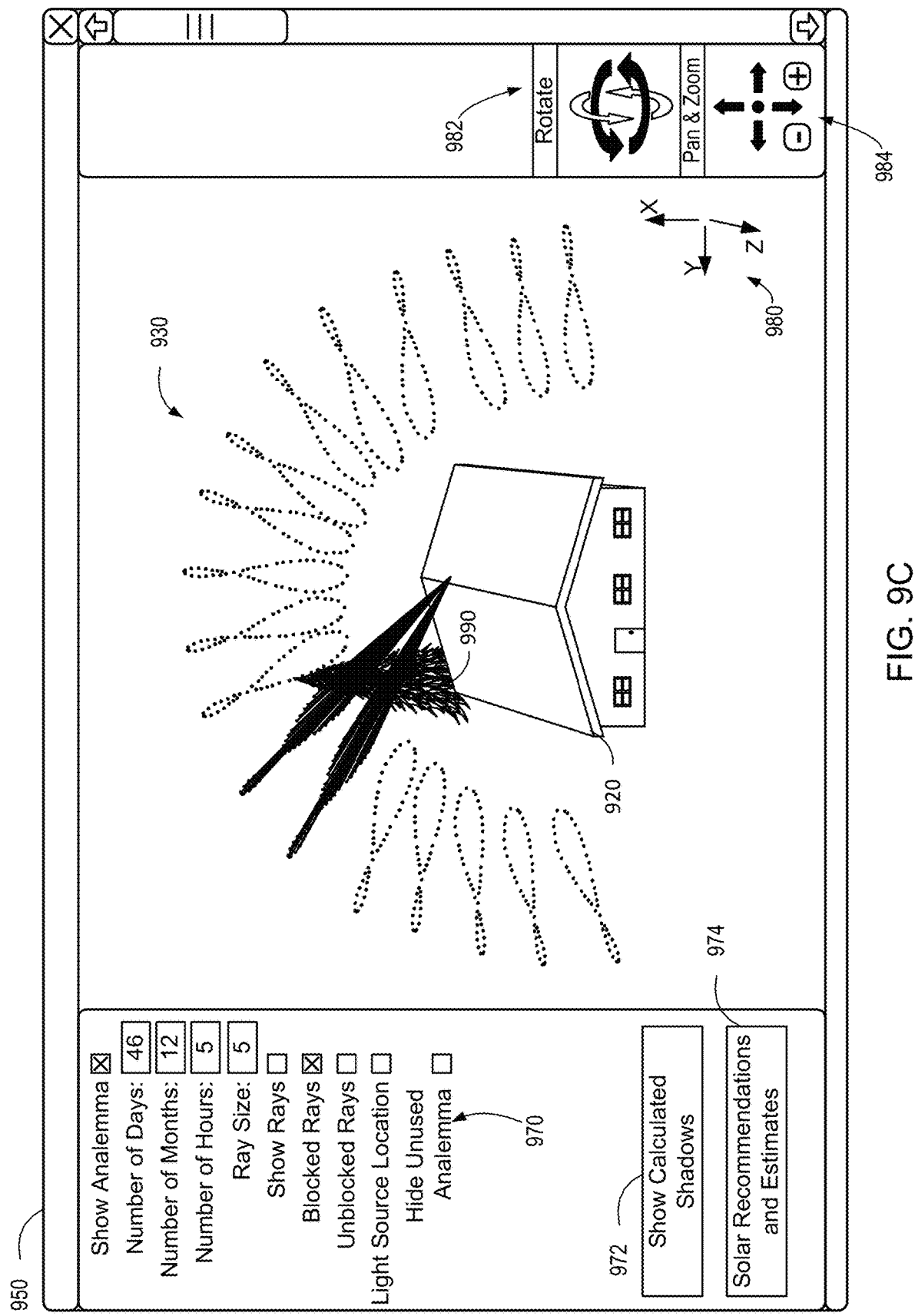
FIG. 9C illustrates solar rays mapped to points on analemmas that are blocked by the tree, according to one embodiment.

FIG. 9C illustrates solar rays mapped to points on analemmas that are blocked by the tree, based on the user selections within the filter options menu 970. As illustrated, all the analemma 930 are rendered in the model display window with the structure 920 based on the user selection. However, only the solar ray paths blocked by the tree 990 are rendered.

Figure 10A:
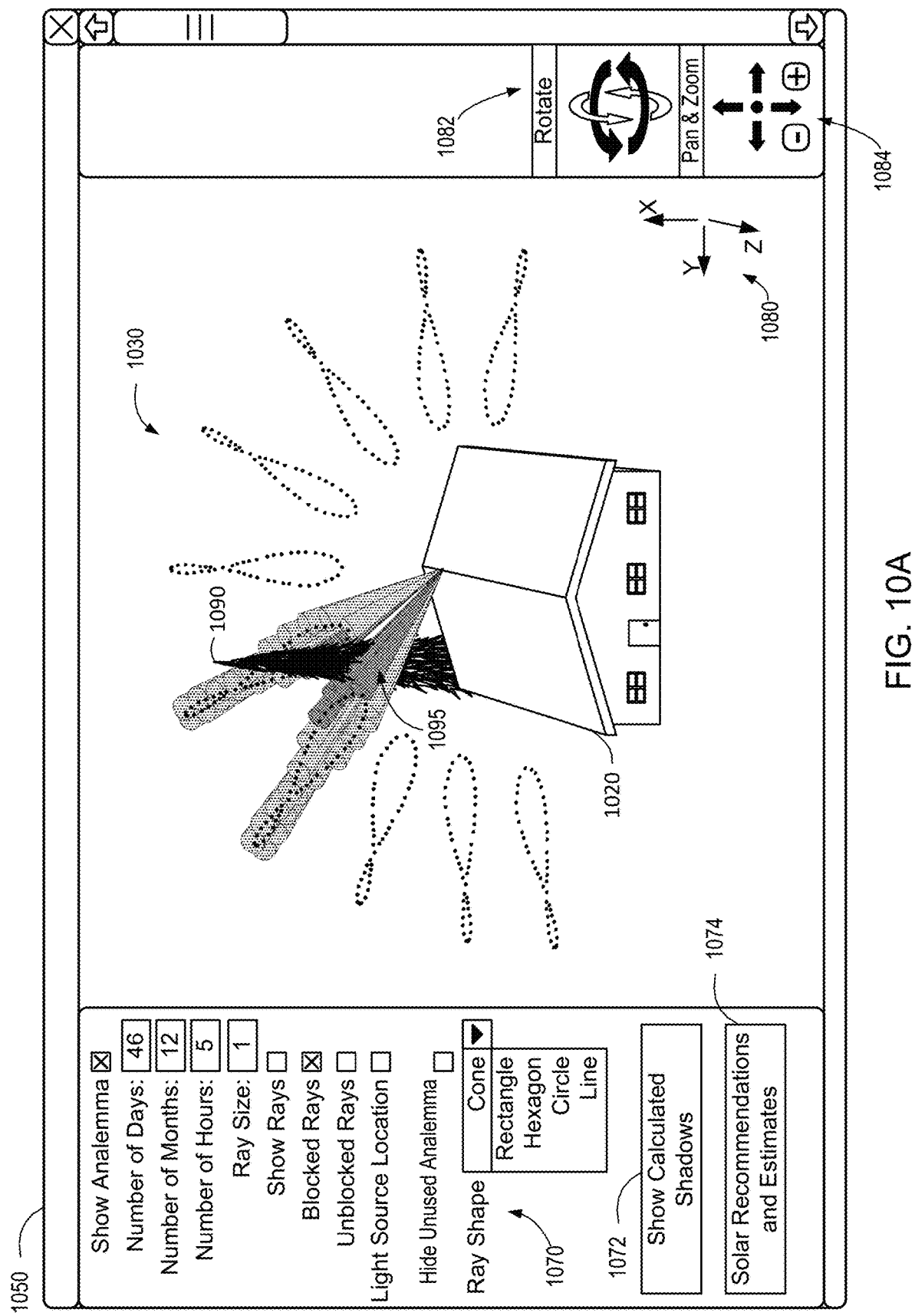
FIG. 10A illustrates the graphical user interface with a model of a roof with divergent beam solar ray paths mapped using conical beams to avoid object occlusion in the relatively sparse solar ray mapping, according to one embodiment.

FIG. 10A illustrates the graphical user interface with a model of a roof of a structure 1020 with divergent beam solar ray paths 1095 that are blocked by the tree 1090. The user selections within the filter options menu 1070 include solar ray mapping for 5 hours each day on 46 days over the course of 12 months. However, only the blocked rays are rendered based on the user selection. For rendering purposes and for purposes of determining if a given solar ray is blocked, divergent conical ray shapes are used based on the user selection. As illustrated, the user may select from a variety of predefined ray shapes. Each different ray shape may provide unique visualizations that facilitate an improved user-understanding of the solar ray mapping, shadowed regions of the roof of the structure 1020, and the like. The illustrated graphical user interface 1050 allows the user to customize the visualization for faster, easier, and more accurate understanding. Furthermore, the illustrated graphical user interface 1050 allows the user to visually modify the solar ray mapping resolution used to calculate the solar irradiance exposure and/or solar panel placement. Accordingly, the illustrated graphical user interface provides a more efficient process for understanding, visually demonstrating, and modifying underlying calculations than previously possible.

As in other embodiments, the graphical user interface 1050 includes various filter options within the filter options menu 1070 to selectively show or hide the analemmas 1030. The graphical user interface 1050 allows a user to select the number of days for solar ray mapping, the number of months for solar ray mapping, and the number of hours (or time interval) for solar ray mapping. In some embodiments, the graphical user interface 1050 also allows the user to select between linear (segment) ray mapping, conical divergent beam ray mapping, pyramidal divergent beam ray mapping, or the like.

In some embodiments, the graphical user interface 1050 allows the user to dynamically modify the rate of divergence or angle of divergence of divergent beam ray paths. The graphical user interface 1050 may also allow the user to selectively visualize some or all the rays, rays mapped to a single location, rays mapped to a plurality of locations, or rays mapped to all locations. The graphical user interface 1050 may also allow the user to selectively visualize only those rays that are blocked or partially blocked or only those rays that are unobstructed.

As illustrated, the graphical user interface 1050 includes navigation controls 1082 and 1084 for rotating, panning, zooming, resetting, and/or otherwise modifying the visualization perspective of the structure, analemmas, obstacles, and mapped rays. The graphical user interface 1050 includes coordinate markings 1080 to help the user identify the current orientation of the displayed structure 1020. The graphical user interface 1050 also includes buttons or links to show calculated shadows via a selectable calculate shadows element 1072 (e.g., by overlaying a heatmap) and to provide solar recommendations and estimates 1074.

Figure 10B:
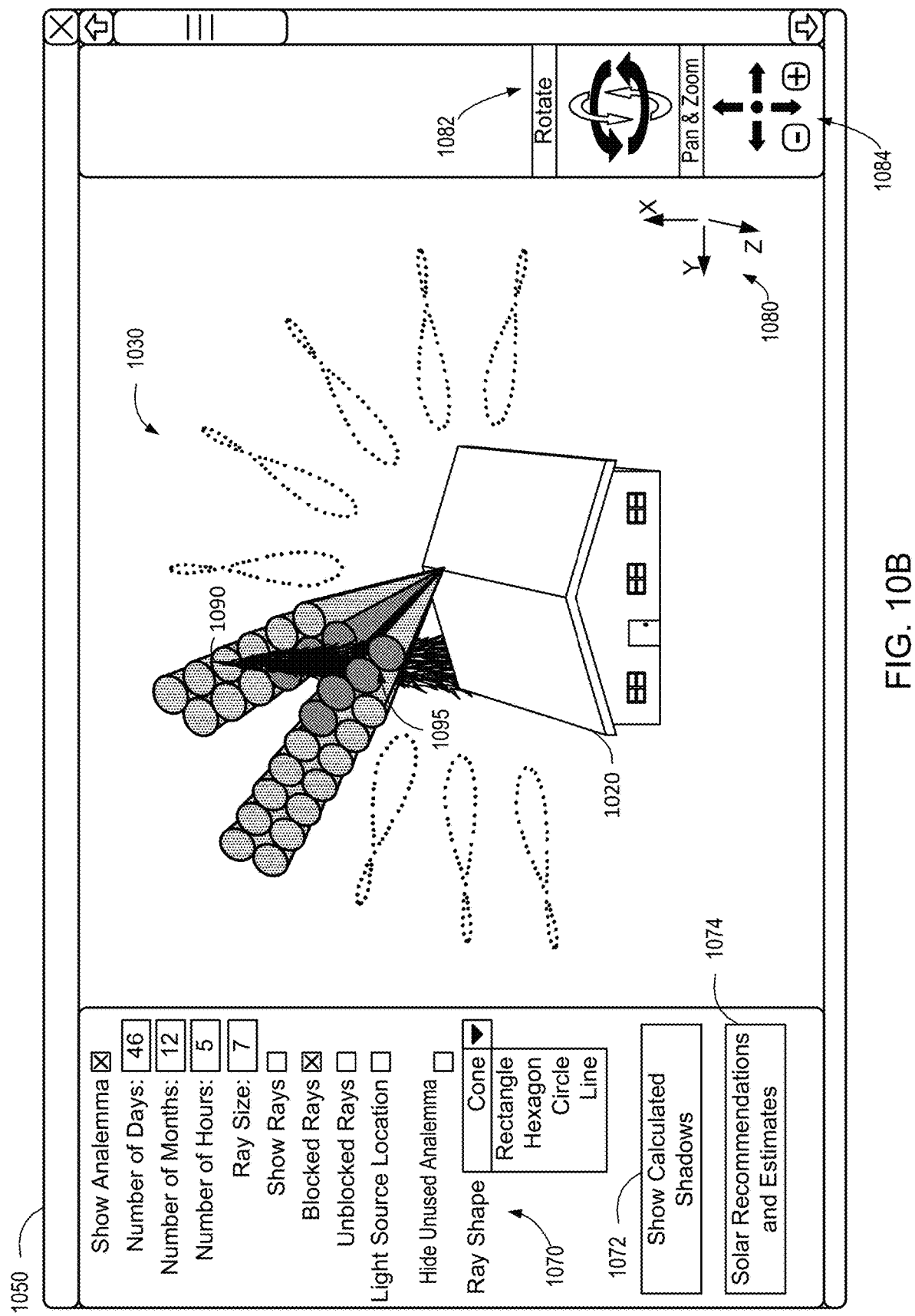
FIG. 10B illustrates the graphical user interface with the same user selection of FIG. 10A, but with an increased "ray size" for the cones, according to one embodiment.

FIG. 10B illustrates the graphical user interface 1050 with the same user selection of FIG. 10A, but with an increased "ray size" for the cones, according to one embodiment. The rendering within the model window of the graphical user interface includes the solar ray paths modeled as conical beams 1095 having a wider angle of divergence of the roof of the structure 1020.

In some embodiments, a user may specify a minimum number of arcseconds for object detection. Objects occupying a smaller field of view relative to each location on the roof of the structure 1020 may be missed. Objects occupying a larger field of view than the threshold width in arcseconds (or other width specification convertible to arcseconds) will be identified as "blocking" the solar ray path. The system may then specify one or both of the daily time sampling intervals and/or the rate of divergence of the divergent beam solar rays to ensure that objects larger than the threshold width are detected, and the shadowing effects of such objects are factored into the solar irradiance calculation.

In many of the illustrated examples, the divergent solar ray paths are modeled between a single location on the roof of the structure 1020 and modeled locations of the sun in the analemmas. However, as described herein, the graphical user interface 1050 may utilize an underlying modeling system that models the divergent solar ray paths to any number of locations on the roof of the structure 2300 according to a target spatial resolution. The rendering within the graphical user interface 1050 may render ray paths to only a single point on the roof of the structure. In other embodiments, the user may specify (e.g., via a selection within the filter options menu 1070) any number of points on the roof of the structure for which solar ray paths are illustrated. In some embodiments, the user may select to display solar ray paths to one or more points on each planar face of the roof of the structure.

In another embodiment, the graphical user interface 1050 may allow for quick switching between points on the roof. For example, the user may toggle between renderings of solar rays mapped to one point on each planar face of the roof of the structure 1020 or between renderings of solar rays mapped to one point on each region of the roof of the structure 1020 that is identified as having a solar irradiance value different from neighboring regions on the roof of the structure 1020, where the difference in solar irradiance between adjacent regions is greater than a difference threshold value. Neighboring regions of the roof of the structure that experience differences in solar irradiance values less than the difference threshold value may be modeled as a single, unified region.

Figure 10C:
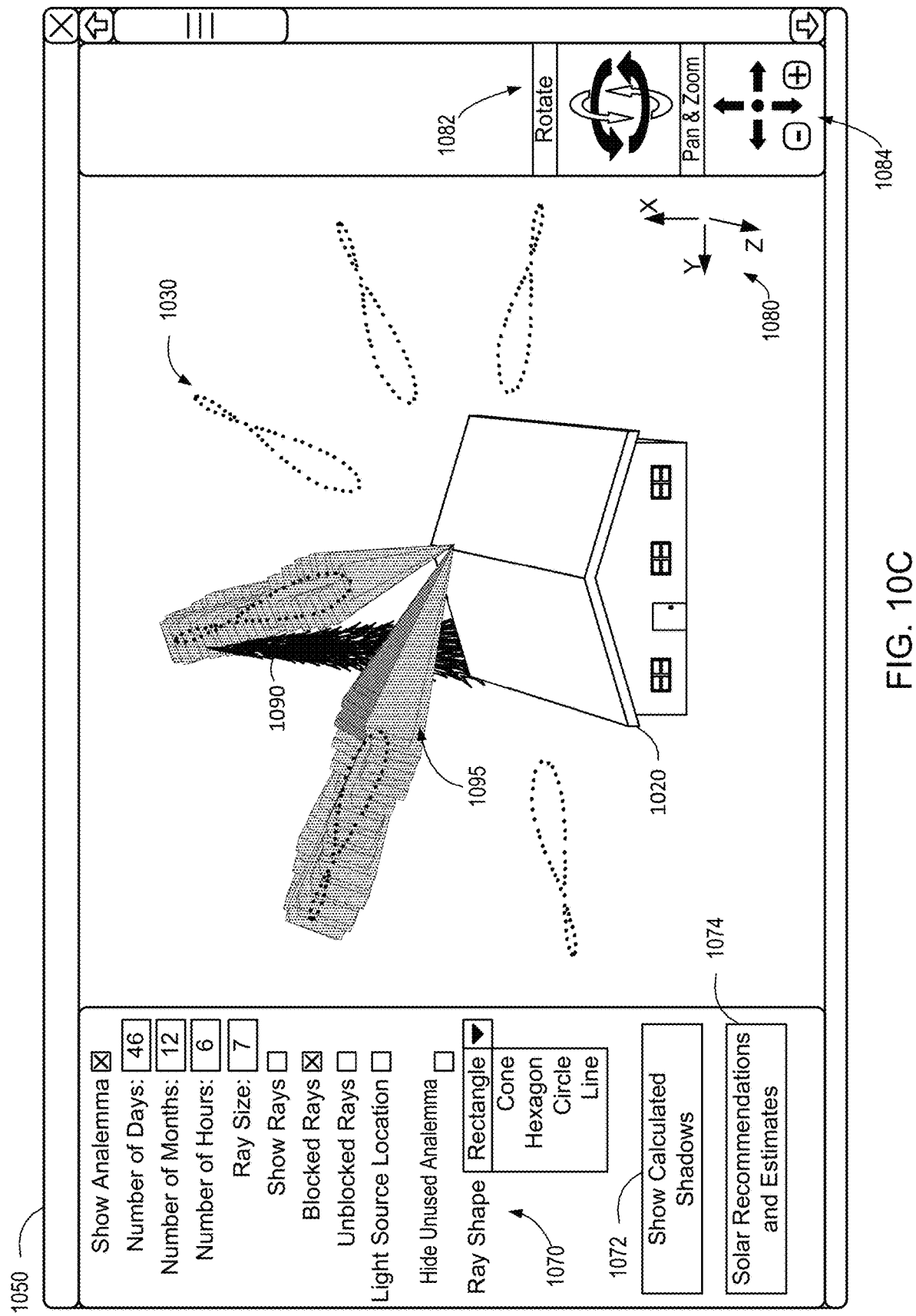
FIG. 10C illustrates the graphical user interface with a user selection of rectangular rays for the solar ray mapping, according to one embodiment.
Figure 11:
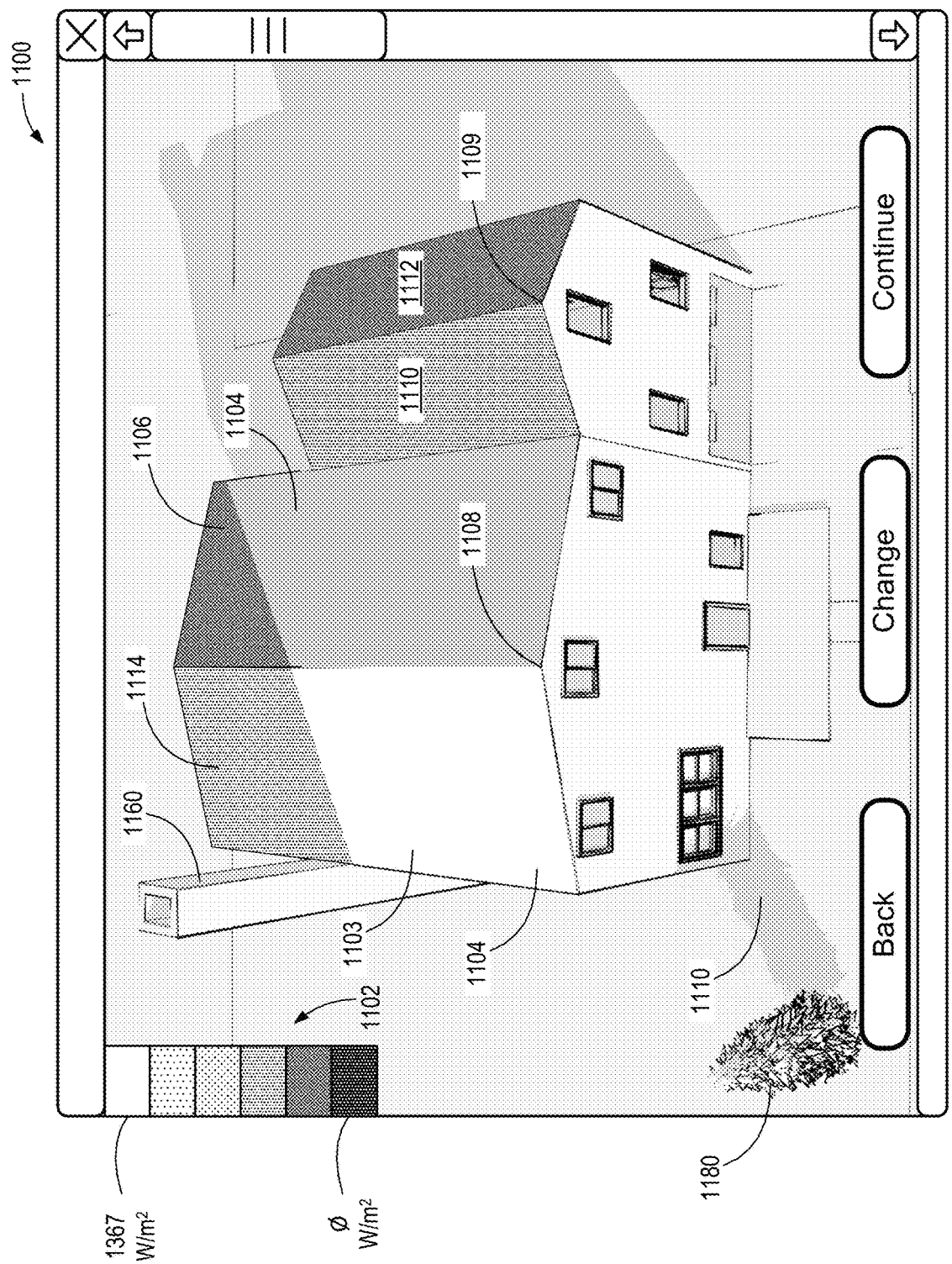
FIG. 11 illustrates a graphical user interface showing a three-dimensional model of the structure and surrounding area, according to one embodiment.

FIG. 10C illustrates the graphical user interface 1050 with a user selection of rectangular rays made via the filter options menu 1070, according to one embodiment. As described herein, the show calculated shadows element 1072 may be selected by the user to switch the rendered graphical user interface from the analemma and solar ray mapping view to a heatmap view of the roof of the structure 1020 (e.g., as illustrated in FIG. 11). In some embodiments, the graphical user interface allows the user to visualize the heatmap (e.g., as illustrated in FIG. 11) on the roof of the structure 1020 at the same time as the analemmas 1030 and solar rays 1095.

FIG. 11 illustrates a graphical user interface 1100 showing a three-dimensional model of the structure 1103 and surrounding area. The graphical user interface 1100 includes a heatmap of the solar irradiance at various locations of the structure. The heatmap includes a legend 1102 identifying white area 1104 as corresponding to the area with the highest solar irradiance and dark area 1106 as corresponding to the region with the least solar irradiance. The legend 1102 also indicates that the heatmap varies in solar irradiance from 1367 W/m$^2$ (e.g., at white area 1104) in the most irradiant portions to zero W/m$^2$ (e.g., at dark area 1106) in the most obstructed portions. The system may round the irradiance down to zero for any region with insufficient light to activate a solar panel. FIG. 11 also illustrates how gables 1108 and 1109 can affect the solar irradiance at various locations along the roof of the structure 1103.

For example, the solar irradiance at a location along a section of roof in the shadow 1110 is slightly less than the solar irradiance at white area 1104 due to the obstruction of gable 1108. At a location along a section of roof 1112, both gables 1108 and 1109 may partially occlude solar exposure. Direct obstructions, such as chimney 1160, may play an expanded role in the solar exposure throughout the day. The shadow from the chimney 1160 is rendered as an averaged shadow 1114 throughout the day. Thus, the averaged shadow 1114 is shown having an area larger than the area of any actual shadow cast by chimney 1160 at any point in time during the day. The graphical user interface 1100 also includes a rendering of a tree 1180 and its averaged shadow 1110.

Figure 12:
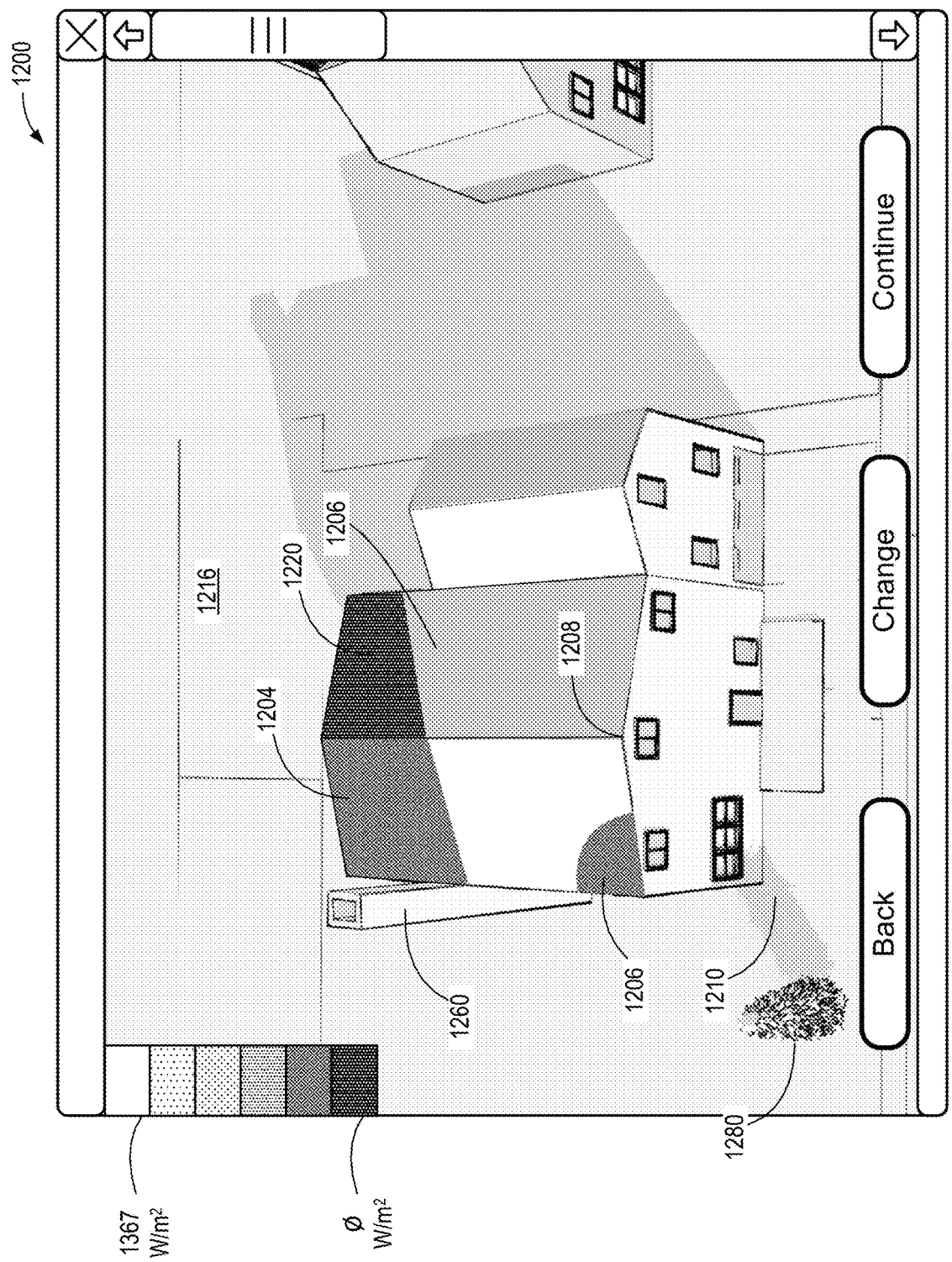
FIG. 12 illustrates a graphical user interface showing a heatmap that accounts for future obstacles, according to one embodiment.

FIG. 12 illustrates a graphical user interface 1200 showing a heatmap that accounts for future obstacles. A vacant lot 1216 and the tree 1280 do not appear to be obstacles at the present time but may become obstacles at some future time. The graphical user interface may include toggles allowing the user to visualize the present-day heatmap (e.g., in FIG. 11) and modeled heatmaps at future time periods (e.g., on a specific date or in 5 years, 10 years, 30 years, etc.). For example, the zone 1220 considers the combined effect of the chimney 1260, the gable 1208, and a future building built on the vacant lot 1216.

The zone 1204 represents the locations on the roof from which the ray paths are blocked by the actual chimney 1260 and the three-dimensionally modeled building that could be constructed within the zoning requirements on the vacant lot 1216. The zone 1206 illustrates the effects of the shadow 1210 cast by the future growth of the tree 1280. The rendered three-dimensional model may include the tree 1280 in its current state but model it larger over time or rendered as being larger to correspond to the expected future shadow 1206. The ray paths blocked over time are averaged to develop an accurate prediction of the solar irradiance average in zone 1206 over a selected time period. For example, the system may evaluate the ray paths blocked by more mature tree 1280 to predict a shadow 1210 at a future time (e.g., in five years). Thus, the system may render the graphical user interface 1200 to account for and combine both present obstacles (e.g., the chimney 1260 and the gables 1208) and future obstacles (e.g., the vacant lot 1216 and the tree 1280) into a single heatmap.

In some embodiments, the system may estimate that every tree will grow a certain amount per year. In other embodiments, the system may use a standard growth rate model based on the current height of the tree (e.g., very small trees may be expected to grow at a relatively high rate per year, while very tall trees may be expected to grow at a relatively slower rate per year). In some embodiments, the system may include or connect with a tree variety identification subsystem. The system may thereby identify the variety of a detected tree and estimate a mature-sized tree. The estimated mature-sized tree may then be used to identify future or potential shadows on the structure.

In some embodiments, the tree variety identification subsystem may identify a tree variety based on the shape of branches, current height of the tree, current width of the tree, bark texture, bark pattern, bark color, foliage color, foliage shape, foliage size, needle size, needle clusters, fruit of the tree, flowers on the tree, cones produced by the tree, etc.

Figure 13:
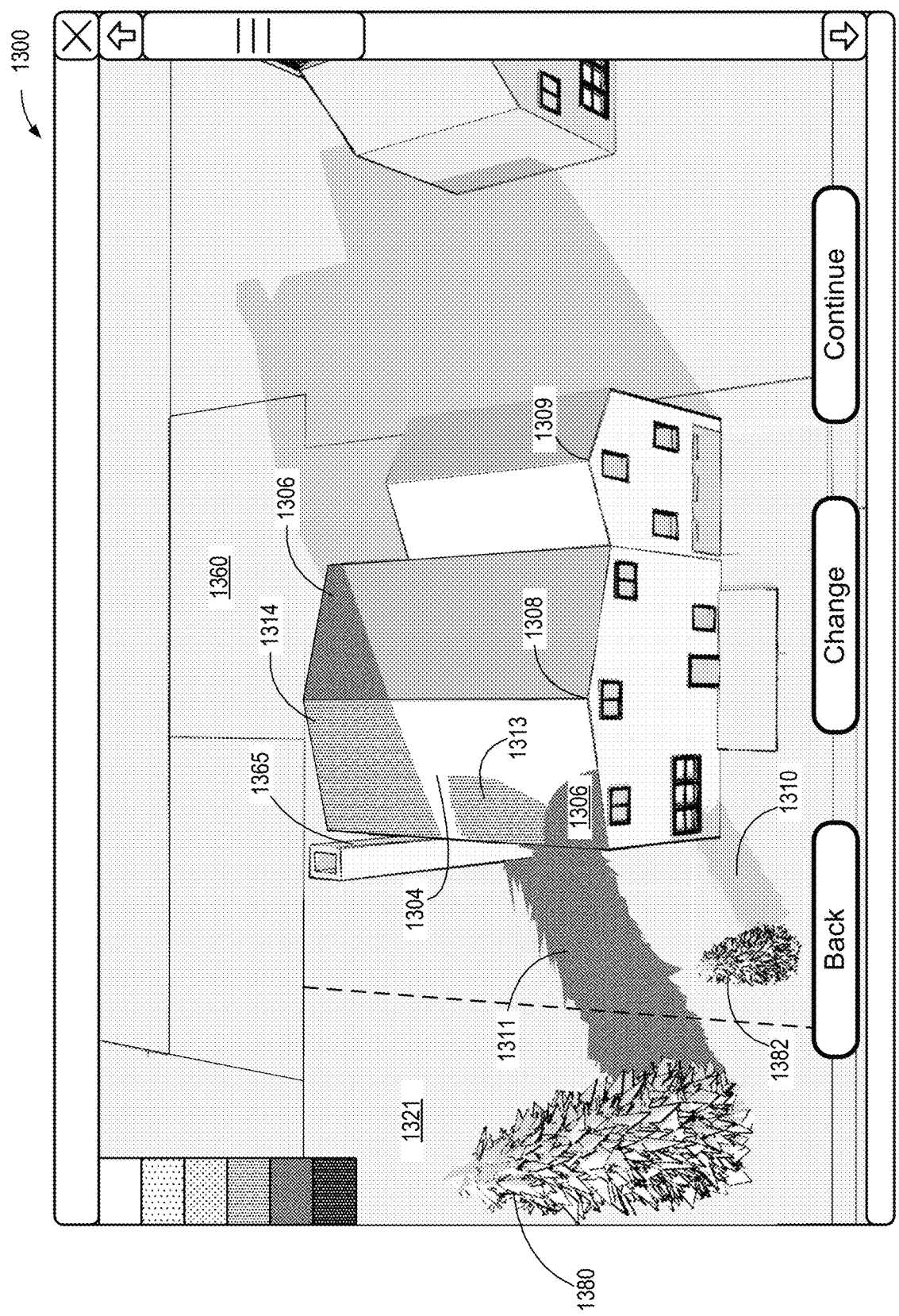
FIG. 13 illustrates a graphical user interface with a spatial heatmap for visualization of how obstacles on an adjacent lot affect solar irradiance, according to one embodiment.

FIG. 13 illustrates a graphical user interface 1300 with a spatial heatmap for visualization of how obstacles on an adjacent lot affect solar irradiance, according to one embodiment. As in FIG. 12, the heatmap may include present obstacles (e.g., the chimney 1365 and the gables 1308 and 1309), future obstacles (e.g., the shadow 1310 from the mature tree 1382 illustrated as the zone 1306), and may include obstacles from neighboring adjacent lots 1321 and 1360. For example, the neighbor's tree 1380 casts a shadow 1311 on the zone 1313 of the roof of the structure 1304. In addition, the vacant lot 1360 may create a future shadow in the zone 1314.

Figure 14:
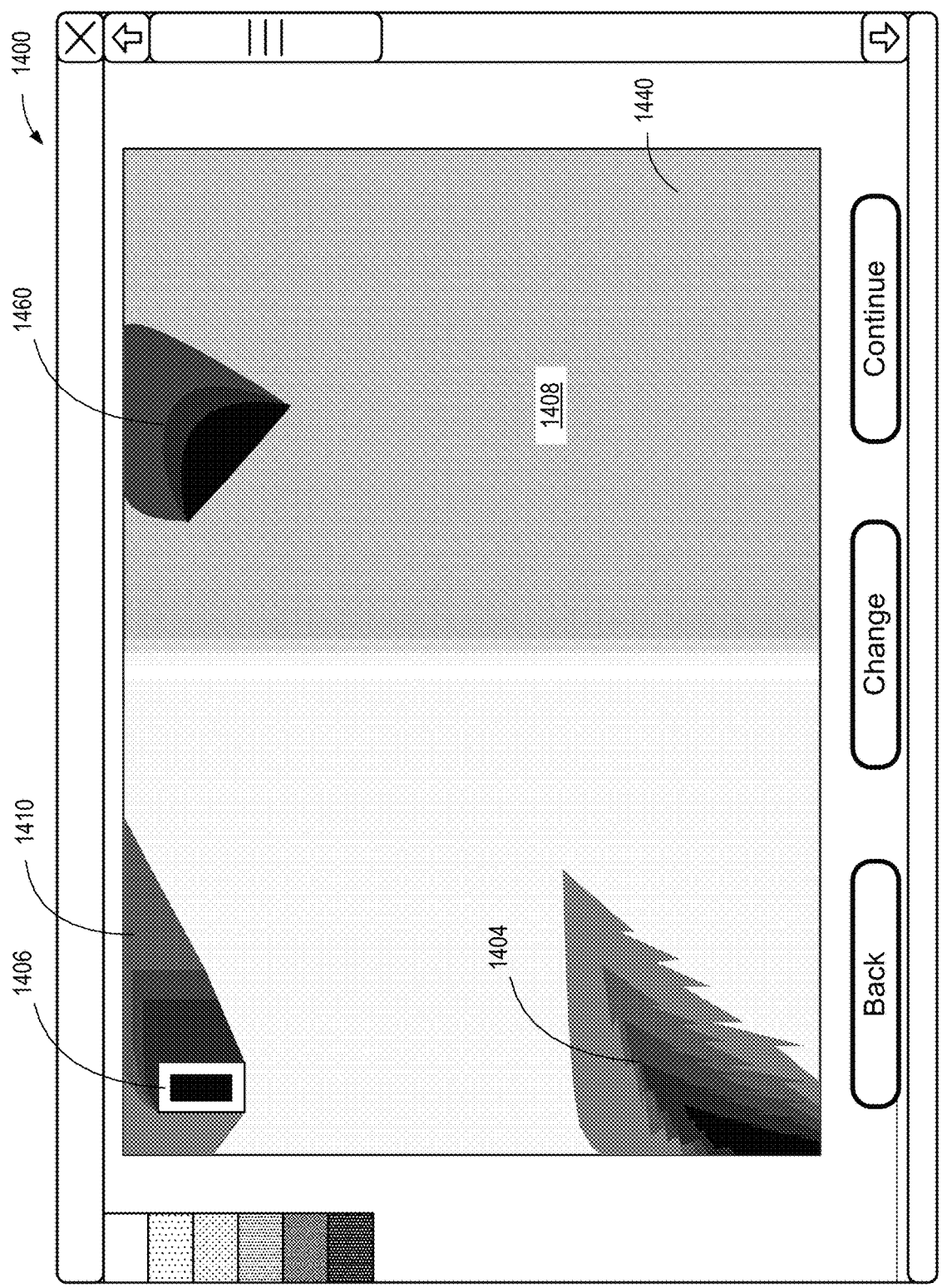
FIG. 14 illustrates a graphical user interface with a spatial heatmap of an isolated section of the roof showing temporally averaged solar irradiance values affected by obstructions, according to one embodiment.

FIG. 14 illustrates a graphical user interface 1400 with a spatial heatmap of an isolated section of the roof showing temporally averaged solar irradiance values affected by obstructions, according to one embodiment. For clarity, FIG. 14 removes several features of the roof 1440 to display an isolated heatmap with shadowed regions 1410, 1404, 1460, and 1408. The zoomed-in view of the illustrated graphical user interface 1400 may be arrived at in response to user navigation of and zooming via navigation controls (not illustrated in FIG. 14, but similar to those illustrated in other figures described herein). Examples of obstacles identified and used for calculating the heatmap include, but are not limited to, the chimney 1406, trees, satellite dishes, satellite antenna, power lines, power poles, cellular towers, chimneys, buildings, attic vents, plumbing vents, the orientation of the roof, the structure of the roof, gables, and other obstacles that obstruct solar irradiation. The heatmap provides a visual tool for a user to determine the placement for solar panels and/or the system may auto-generate placement recommendations/options. Even if part of the panel may, at times, become obstructed, the system may determine that placement in a partially obstructed location satisfies system or user-defined parameters.

Figure 15:
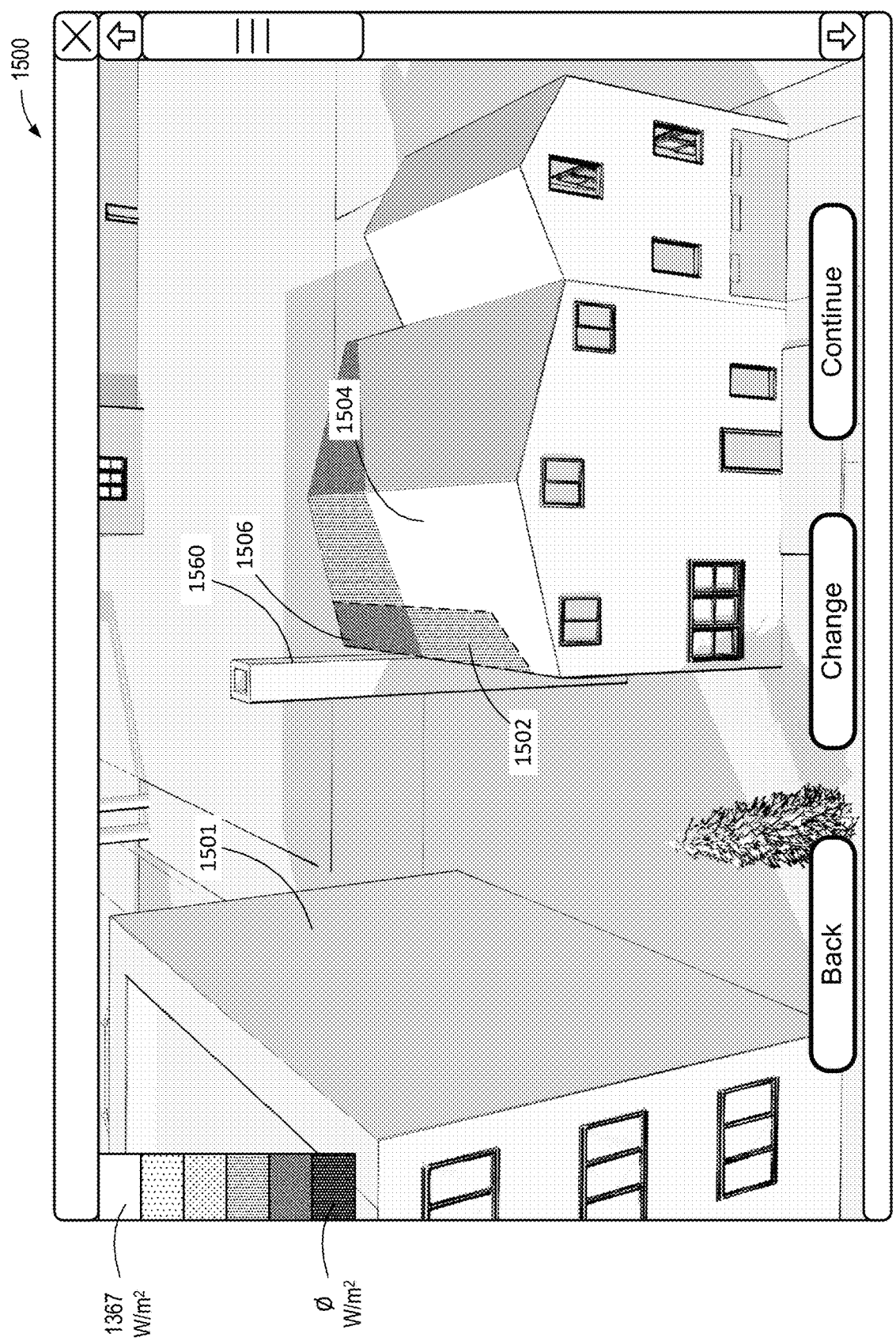
FIG. 15 illustrates a graphical user interface displaying a heatmap of the effects of a neighboring three-story building on a roof of a structure, according to one embodiment.

FIG. 15 illustrates a graphical user interface 1500 that includes a heatmap of a roof 1504 showing the effects of a neighboring three-story building 1501. For example, the three-story building 1501 casts a shadow 1502 on roof 1504. Shadow 1506 combines the effects of shadow 1502 cast by three-story building 1501 as well as the shadow cast by chimney 1560.

Figure 16:
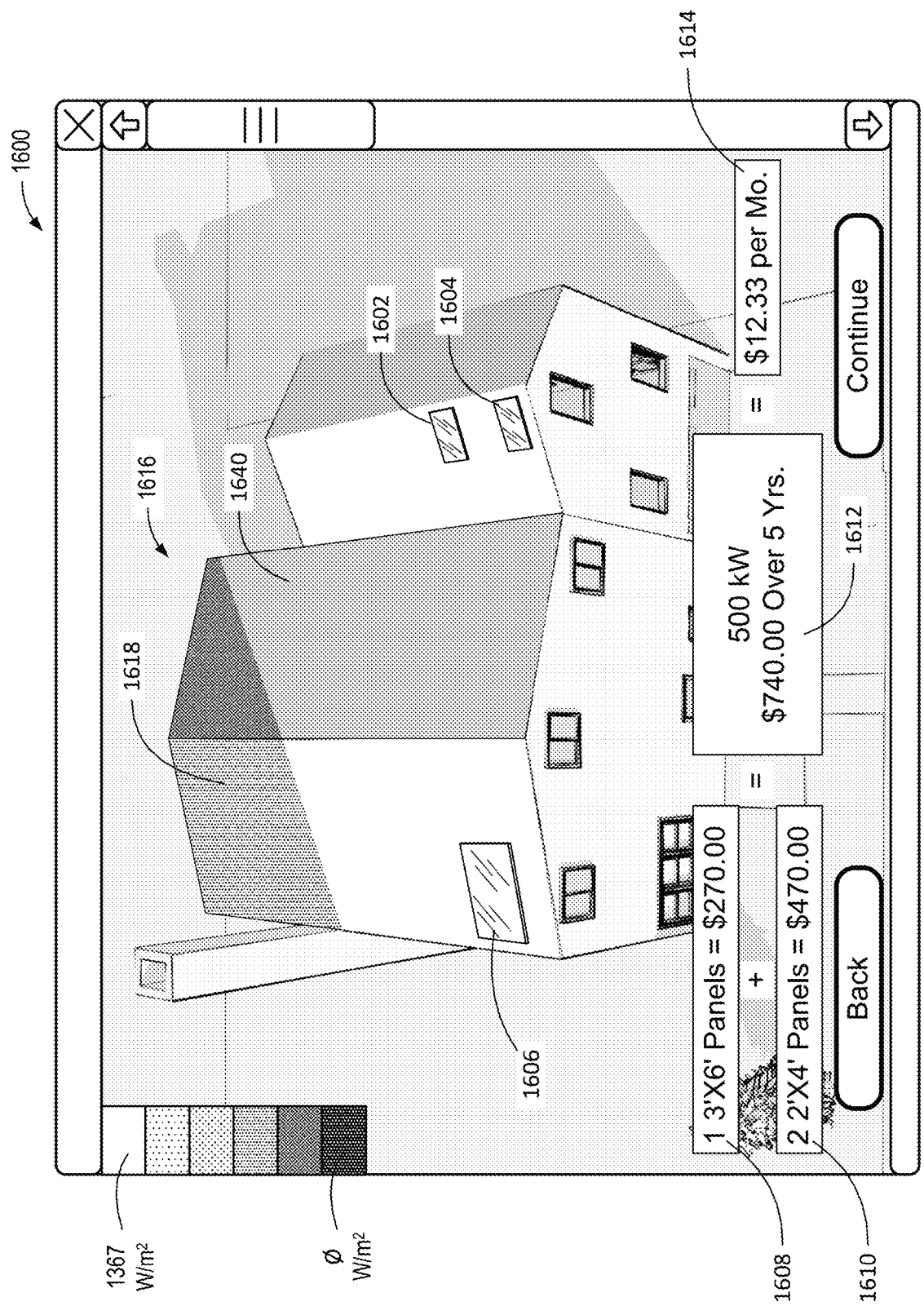
FIG. 16 illustrates a graphical user interface of a solar irradiance assessment system, according to one embodiment.

FIG. 16 illustrates a graphical user interface 1600 of a solar irradiance assessment system. The solar irradiance assessment system may recommend locations for placement of solar panels 1602, 1604, and 1606 for solar panels based on a user-input size of solar panels, e.g., inputs 1608 and 1610. The user inputs 1608 and 1610 may include the size and quantity of panels, the threshold limit 1612 of the system, the cost per period 1614 for the system, and/or other user-defined data. The solar irradiance assessment system may recommend the placement of a particular size panel (e.g., 3'×6' panel) in a specific location 1606 on the roof 1640. The solar irradiance assessment system may recommend the placement of multiple solar panels 1602, 1604, and 1606. The system may generate a heatmap 1616 and/or "stay-out" regions 1618 for the panels based on one or more obstacles (e.g., chimney 306). The recommended placement of solar panels 1602, 1604, and 1606 may depend on user inputs such as the cost, size, number, threshold limit 1612, the cost per period 1614, and/or other user inputs.

The heatmap 1616 may identify stay-out regions 1618 for solar panel placement. The heatmap 1616 may represent an average solar distribution of irradiance for a period of time, such as a year. The system may base the estimated distribution of solar irradiance on historical irradiance data. For example, the system may use the solar irradiance of the past year (or an average of the last five, ten, twenty, or another number of years) to determine recommended panel sizes and/or locations of solar panels 1602, 1604, and 1606. Heatmap 1616 may provide a graphical recommendation of panel placement, as illustrated. Heatmap 1616 may provide numerical irradiance data for the system to calculate panel placement.

For example, if the operator sets a 500-kW threshold limit 1612 over a period of five years (e.g., 100 kW/year), the system may generate a heatmap 1616 and recommend one or more suitable panel placements (e.g., locations of solar panels 1602, 1604, and 1606). The system may determine a quantity and location for solar panels to allow for a purchaser to fully offset an installation cost (e.g., based on saved electricity or electricity sold to another entity) within a prescribed time period (e.g., 7 years) at expected or current energy rates.

FIG. 17 illustrates an example of a graphical user interface of a system enabling an operator to select sizes, quantities, power, and/or prices of a plurality of solar panels for installation. The interface 1700 allows the user to select a panel size 1702 and quantity 1704, and the system will generate the watts produced 1705 and the price of the panels 1706. For example, the operator may select a specific size panel 1702 and a quantity 1704 of each panel. The system may auto-populate the watts produced 1705 and the price of the selected panels 1706. In some embodiments, the operator may select all available panel sizes. This selection may permit the system to return a recommended optimal design to maximize solar exposure. The system may generate the quantity 1704, size 1702, a cost per month 1716, and/or locations of the panels.

In some embodiments, the system may total the quantity of panels 1708, the total watts generated 1710, and the total price 1712. The user may input a desired payoff period 1714, and the system may generate a cost per month 1716. A person having ordinary skill in the art would recognize other variations on user inputs and system outputs.

Figure 18:
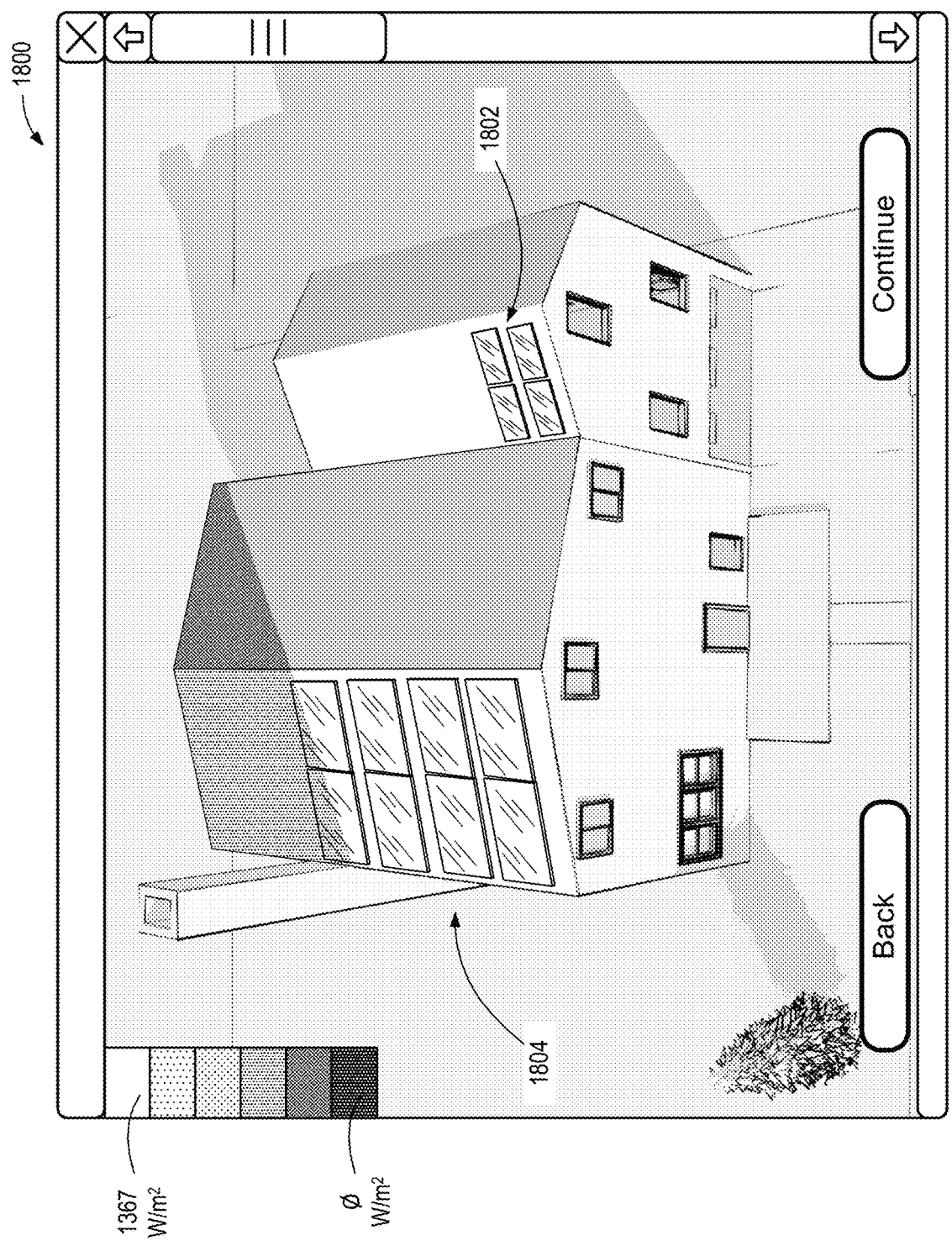
FIG. 18 illustrates a graphical user interface for a solar placement system with the placement of panels of various sizes based on user input, according to one embodiment.

FIG. 18 illustrates a graphical user interface 1800 for a solar placement system with the placement of panels of various sizes based on user input. The user may specify a total desired output, and the system may generate an optimized or suitable panel placement recommendation. Alternatively, the system may provide total output values, payoff values, estimated costs, etc. as an operator virtually places solar panels on the roof with the overlaid irradiation values (e.g., via a drag and drop operation) at locations 1802 and 1804. The system accounts for the decreased irradiance expected for solar panels placed within shadowed areas, as described herein.

This disclosure has been made with reference to various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present disclosure should, therefore, be understood to encompass at least the claims presented herein.

What is claimed is:

1. A non-transitory computer-readable medium with instructions stored thereon that, when executed by a processor of a computing device, cause the computing device to perform operations for rendering a graphical user interface, the operations comprising:

rendering, for display on an electronic display of a computing device, a three-dimensional model of a structure within a model display window of the graphical user interface;

rendering, for display on the electronic display, a filter options menu to allow for user input of at least one display filter option;

receiving a user selection, via the filter options menu, to display analemma for modeled ray paths between a location on a roof of the structure and modeled locations of a sun relative to the roof of the structure at each of a plurality of different times during a time period;

rendering, for display on the electronic display, analemma of modeled ray paths within the model display window proximate to the three-dimensional model of the structure;

rendering a navigation control interface in a control window proximate to the model display window of the graphical user interface;

receiving a user input via the navigation control interface to modify a perspective of the rendered three-dimensional model of the structure within the model display window; and rendering, in response to the received user input:
a modified perspective of the three-dimensional model of the structure, and
a modified perspective of the analemma relative to the three-dimensional model of the structure.

2. The non-transitory computer-readable medium of claim 1, wherein the operations further comprise:
receiving a user input via the filter options menu selecting:
a number of days for modeling the analemma, and
a number of hours for modeling the analemma,
wherein rendering the analemma of modeled ray paths within the model display window proximate to the three-dimensional model of the structure comprises rendering a number of analemmas equal to the selected number of hours with a number of points in each analemma equal to the selected number of days.

3. The non-transitory computer-readable medium of claim 2, wherein the operations further comprise:
receiving a user input via the filter options menu selecting a number of months for modeling the analemma,
wherein rendering the analemma of modeled ray paths within the model display window proximate to the three-dimensional model of the structure comprises rendering a number of analemmas equal to the selected number of hours with a number of points in each analemma equal to the selected number of days, where each point within each analemma corresponds to a location of the sun during one of the selected months.

4. The non-transitory computer-readable medium of claim 1, wherein the operations further comprise:
receiving a user selection, via the filter options menu, to display a location of a light source used for modeling the ray paths; and
rendering, for display on the electronic display, a multifaceted sphere at a location used for modeling the ray paths corresponding to at least one of the rendered analemma.

5. A non-transitory computer-readable medium with instructions stored thereon that, when executed by a processor of a computing device, cause the computing device to perform operations for rendering a graphical user interface, the operations comprising:

rendering, for display on an electronic display of a computing device, a three-dimensional model of a structure within a model display window of the graphical user interface;

rendering, for display on the electronic display, a filter options menu to allow for user input of at least one display filter option;

receiving a user selection, via the filter options menu, to display analemma for modeled ray paths between a location on a roof of the structure and modeled locations of a sun relative to the roof of the structure at each of a plurality of different times during a time period;

rendering, for display on the electronic display, analemma of modeled ray paths within the model display window proximate to the three-dimensional model of the structure;

receiving a user input via the filter options menu to display rays between the analemma and a location on the roof of the structure; and rendering, for display on the electronic display, rays mapped between points of each of the rendered analemma and the location on the roof of the structure.

6. The non-transitory computer-readable medium of claim 5, wherein the operations further comprise:
receiving a user input via the filter options menu to display the rays as cones; and
rendering, for display on the electronic display, the rays mapped between points of each of the rendered analemma and the location on the roof of the structure as cones diverging from the location on the roof of the structure toward a corresponding point of each of the rendered analemmas.

7. The non-transitory computer-readable medium of claim 5, wherein the operations further comprise:
receiving a user input via the filter options menu to display the rays as rectangular pyramids; and
rendering, for display on the electronic display, the rays mapped between points of each of the rendered analemma and the location on the roof of the structure as rectangular pyramids diverging from the location on the roof of the structure toward a corresponding point of each of the rendered analemmas.

8. The non-transitory computer-readable medium of claim 5, wherein unblocked rays are shown in a first color and blocked rays are shown in a second color.

9. A non-transitory computer-readable medium with instructions stored thereon that, when executed by a processor of a computing device, cause the computing device to perform operations for rendering a graphical user interface, the operations comprising:

rendering, for display on an electronic display of a computing device, a three-dimensional model of a structure within a model display window of the graphical user interface;

rendering, for display on the electronic display, a filter options menu to allow for user input of at least one display filter option;

receiving a user selection, via the filter options menu, to display analemma for modeled ray paths between a location on a roof of the structure and modeled locations of a sun relative to the roof of the structure at each of a plurality of different times during a time period;

rendering, for display on the electronic display, analemma of modeled ray paths within the model display window proximate to the three-dimensional model of the structure;

receiving a user input via the filter options menu to display only those rays between the analemma and a location on the roof of the structure that are blocked; and rendering, for display on the electronic display, blocked rays mapped between points of each of the rendered analemma and the location on the roof of the structure.

10. A non-transitory computer-readable medium with instructions stored thereon that, when executed by a processor of a computing device, cause the computing device to perform operations for rendering a graphical user interface, the operations comprising:

rendering, for display on an electronic display of a computing device, a three-dimensional model of a structure within a model display window of the graphical user interface;

rendering, for display on the electronic display, a filter options menu to allow for user input of at least one display filter option;

receiving a user selection, via the filter options menu, to display analemma for modeled ray paths between a location on a roof of the structure and modeled locations of a sun relative to the roof of the structure at each of a plurality of different times during a time period;

rendering, for display on the electronic display, analemma of modeled ray paths within the model display window proximate to the three-dimensional model of the structure;

receiving a user input via the filter options menu to display only unobstructed rays between the analemma and a location on the roof of the structure; and rendering, for display on the electronic display, the unobstructed rays mapped between points of each of the rendered analemma and the location on the roof of the structure.

11. A system for divergent beam ray-path modeling, comprising:

a divergent beam ray-path modeling subsystem to model a divergent beam ray path from each of a plurality of locations on a roof of a structure to a modeled location of a sun at multiple, discrete times during a time period;

a beam path analysis subsystem to:
identify obstructed divergent beam ray paths that are obstructed by an obstacle, and
identify unobstructed divergent beam ray paths;

a graphical user interface subsystem to render a graphical user interface for display on an electronic display of a computing device that includes:
a three-dimensional model of the structure, and
solar rays extending between at least one location on the roof of the structure and a plurality of the modeled locations of the sun; and an irradiance calculation subsystem to calculate a solar irradiance value for each location on the roof of the structure during the time period based on the identified unobstructed divergent beam ray paths associated with each respective location during the time period, wherein the graphical user interface subsystem is further configured to render a heatmap of solar irradiance values as an overlay on the roof of the structure.

12. The system of claim 11, wherein the graphical user interface includes user input fields for a user to specify:
a spatial sampling resolution, and
a beam path modeling resolution that includes a number of times each day for beam path modeling, a number of days for beam path modeling, and a time period for beam path modeling.

13. The system of claim 12, further comprising:
a modeling subsystem to identify the plurality of locations on the roof of the structure as a number of locations corresponding to the user-specified spatial sampling resolution; and
an analemma resolution subsystem to identify the multiple, discrete times during the time period based on the user-specified beam path modeling resolution.

14. The system of claim 11, wherein the modeling subsystem is configured to model the roof of the structure as a plurality of polygons, wherein each location on the roof of the structure corresponds to one of the polygons, wherein the polygons comprise one or more of: triangles, rectangles, rhombi, and hexagons.

15. A system for divergent beam ray-path modeling, comprising:
a divergent beam ray-path modeling subsystem to model a divergent beam ray path from each of a plurality of locations on a roof of a structure to a modeled location of a sun at multiple, discrete times during a time period;
a beam path analysis subsystem to:
identify obstructed divergent beam ray paths that are obstructed by an obstacle, and
identify unobstructed divergent beam ray paths; and
a graphical user interface subsystem to render a graphical user interface for display on an electronic display of a computing device that includes:
a three-dimensional model of the structure,
solar rays extending between at least one location on the roof of the structure and a plurality of the modeled locations of the sun,
a plurality of analemma as points corresponding to the plurality of the modeled locations of the sun, and
a filter options menu that includes:
a first toggle element to allow a user to selectively toggle the display of the plurality of analemma on and off, and
a second toggle element to allow the user to selectively toggle the display of the solar rays on and off.

16. The system of claim 11, wherein the graphical user interface subsystem is configured to render a filter options menu that includes:
a solar ray shape selection element to allow a user to select between at least two different shapes of solar rays, wherein at least one of the selectable solar ray shapes is: a linear solar ray shape, a conical solar ray shape, a rectangular solar array shape, a hexagonal solar ray shape, a triangular solar ray shape, a circular solar ray shape, or an elliptical solar ray shape.

17. A non-transitory computer-readable medium with instructions stored thereon that, when executed by a processor of a computing device, cause the computing device to:
model a divergent beam ray path between each of a plurality of locations on a roof and modeled locations of a sun relative to the roof at each of a plurality of discrete times during a time period;
identify divergent beam ray paths that are obstructed by an obstacle positioned between the roof and the respective modeled locations of the sun;
identify unobstructed divergent beam ray paths;
calculate a solar irradiance value for each location on the roof during the time period based, at least in part, on the identified unobstructed divergent beam ray paths associated with each respective location on the roof during the time period; and render a graphical user interface, for display via an electronic display, to selectively allow a user to view a heatmap of solar irradiance values overlaid on a three-dimensional model of the roof, and that includes one or more of:
(i) analemma representing at least some of the modeled locations of the sun relative to the roof, and
(ii) solar ray paths extending between at least one point on the roof and a plurality of the modeled locations of the sun relative to the roof.

* * * * *